United States Patent
Brockmann et al.

(10) Patent No.: US 12,382,128 B2
(45) Date of Patent: Aug. 5, 2025

(54) SYSTEMS AND METHODS OF ALTERNATIVE NETWORKED APPLICATION SERVICES

(71) Applicant: ActiveVideo Networks, LLC, San Jose, CA (US)

(72) Inventors: Ronald A. Brockmann, Los Gatos, CA (US); Maarten Hoeben, Acquapendente (IT); Gerrit Willem Hiddink, Amersfoort (NL); Serban Ungureanu, Amsterdam (NL); Andrew Gall, Haarlem (NL); Philipp Beyer, hilversum (NL)

(73) Assignee: ActiveVideo Networks, LLC, San Jose, CA (US)

( * ) Notice: Subject to any disclaimer, the term of this patent is extended or adjusted under 35 U.S.C. 154(b) by 62 days.

(21) Appl. No.: 18/446,055

(22) Filed: Aug. 8, 2023

(65) Prior Publication Data
US 2023/0388578 A1    Nov. 30, 2023

Related U.S. Application Data

(63) Continuation of application No. PCT/US2022/016720, filed on Feb. 17, 2022.
(Continued)

(51) Int. Cl.
*H04N 21/431* (2011.01)
*H04N 21/472* (2011.01)

(52) U.S. Cl.
CPC ... *H04N 21/4316* (2013.01); *H04N 21/47217* (2013.01)

(58) Field of Classification Search
CPC ......... H04N 21/4316; H04N 21/47217; H04N 21/2393; H04N 21/4435; H04N 21/482;
(Continued)

(56) References Cited

U.S. PATENT DOCUMENTS

| | | | |
|---|---|---|---|
| 11,128,903 B2 * | 9/2021 | Brockmann | H04N 21/47202 |
| 2008/0005676 A1 * | 1/2008 | Evans | H04N 21/43615 |
| | | | 715/740 |

(Continued)

FOREIGN PATENT DOCUMENTS

WO    WO-2019006185 A1 *   1/2019   ........... H04N 21/222

OTHER PUBLICATIONS

ActiveVideo Networks, Inc., International Search Report and Written Opinion, PCT/US22/16720, Jul. 19, 2022, 16 pgs.

*Primary Examiner* — John R Schnurr
(74) *Attorney, Agent, or Firm* — Chernoff, Vilhauer, McClung & Stenzel, LLP

(57) ABSTRACT

The server system receives, from a respective remote physical client device, a digest of a segment of video content received by the respective remote physical client device, the segment of video content including a plurality of frames of video content. In response to receiving the digest, the server system sends a playback command to the respective remote physical device to playback one or more of the plurality of frames of video content in the segment. The plurality of frames of video content in the segment have a frame rate. The server system determines a graphical processing unit (GPU) overlay instruction for overlaying content of a frame buffer with a respective portion of the segment of video content and sends, asynchronously from the frame rate of the plurality of frames of video content, the GPU overlay instruction to the respective remote physical client device.

15 Claims, 34 Drawing Sheets

Related U.S. Application Data

(60) Provisional application No. 63/152,277, filed on Feb. 22, 2021.

(58) Field of Classification Search
CPC ........... H04N 21/8173; H04N 21/8456; H04N 21/8153
See application file for complete search history.

(56) References Cited

U.S. PATENT DOCUMENTS

| | | |
|---|---|---|
| 2010/0135643 A1 | 6/2010 | Fleming |
| 2012/0185905 A1* | 7/2012 | Kelley ............... H04N 21/8153 |
| | | 348/E9.055 |
| 2017/0270077 A1* | 9/2017 | Morard ............ H04N 21/44012 |
| 2018/0184178 A1* | 6/2018 | Hoeben ................ G06F 16/986 |

* cited by examiner

1100

1102 — At a server system hosting one or more virtual client devices, each virtual client device corresponding to a remote physical client device that plays back video content received from a content server:

1104 — Receiving, from a respective remote physical client device, a digest of a segment of video content received by the respective remote physical client device, the segment of video content including a plurality of frames of video content.

1106 — In response to receiving the digest:

1108 — Sending a playback command to the respective remote physical device to playback one or more of the plurality of frames of video content in the segment, wherein the plurality of frames of video content in the segment have a frame rate.

1110 — Determining a graphical processing unit (GPU) overlay instruction for overlaying content of a frame buffer with a respective portion of the segment of video content.

1112 — Sending, asynchronously from the frame rate of the plurality of frames of video content, the GPU overlay instruction to the respective remote physical client device.

Figure 11

SYSTEMS AND METHODS OF ALTERNATIVE NETWORKED APPLICATION SERVICES

RELATED APPLICATIONS

This application is a continuation of International Application No. PCT/US2022/016720, filed Feb. 17, 2022, which claims priority to U.S. Provisional Patent Application No. 63/152,277, entitled "Systems and Methods of Alternative Networked Application Services," filed on Feb. 22, 2021, each of which is hereby incorporated by reference in its entirety.

This application is a related to U.S. patent application Ser. No. 16/890,957, entitled "Orchestrated Control for Displaying Media," filed on Jun. 2, 2020, which claims priority to U.S. Provisional Application No. 62/868,310, filed on Jun. 28, 2019, each of which is hereby incorporated by reference in its entirety. This application is also related to U.S. patent application Ser. No. 16/721,125, entitled "Systems and Methods of Orchestrated Networked Application Services," filed on Dec. 19, 2019, which is a continuation of International Application No. PCT/US18/40118, filed Jun. 28, 2018, which claims priority to U.S. Provisional Application No. 62/526,954, filed Jun. 29, 2017, each of which is hereby incorporated by reference in its entirety.

FIELD OF ART

The present invention relates generally to controlling display of media by a client, and more particularly to controlling, by a server, media displayed by a client based on information received by the server from the client.

BACKGROUND

Many new interactive TV and video-on-demand (VOD) services are currently becoming available from services delivered by way of the Internet. Typically, these new services interact with a common web browser on a laptop, tablet, or smartphone or require a third-party application to run a dedicated client device such as a third-party Internet set-top box or smart TV. There is a need to interact with these services while reducing reliance on specialized client devices. However, relative to a common web browser or third-party application on a laptop, tablet or smartphone, a generic legacy TV set-top has limited resources in terms of processing power, graphical capabilities and memory, and is therefore typically not able to support most of these new interactive TV and VOD services due to such limitations.

SUMMARY

Some embodiments of the present disclosure provide a virtualized application service system in which interactive TV and VOD services provided by applications running on a server. Virtualizing these interactive TV and VOD applications on the server allows thin-client devices, including legacy set-top boxes, to appear as though the interactive and VOD applications are running locally. The present disclosure provides solutions to numerous problems that arise in the context of virtualizing application services for interactive TV and VOD applications, which together improve user experience and improve the efficiency of the server-client system by reducing bandwidth and memory requirements.

In accordance with some embodiments, a method performed at a server computing device for remotely processing a media stream is provided. The server system hosts one or more virtual machines (e.g., and/or one or more containers), each associated with a respective client device of one or more client devices for playback of media streams. The method comprises receiving, from a respective remote physical client device, a digest of a segment of video content received by the respective remote physical client device, the segment of video content including a plurality of frames of video content. The method further comprises, in response to receiving the digest, sending a playback command to the respective remote physical device to playback one or more of the plurality of frames of video content in the segment, wherein the plurality of frames of video content in the segment have a frame rate. The method further comprises determining a graphical processing unit (GPU) overlay instruction for overlaying content of a frame buffer with a respective portion of the segment of video content. The method further comprises sending, asynchronously from the frame rate of the plurality of frames of video content, the GPU overlay instruction to the respective remote physical client device.

In some embodiments, a computer readable storage medium storing one or more programs for execution by one or more processors of an electronic device is provided. The one or more programs include instructions for performing any of the methods described above.

In some embodiments, an electronic device (e.g., a server system) is provided. The server system comprises one or more processors and memory storing one or more programs for execution by the one or more processors, the one or more programs including instructions for performing any of the methods described above.

It will be recognized that, in various embodiments, operations described with regard to the client may apply to a server and vice versa.

BRIEF DESCRIPTION OF THE DRAWINGS

FIG. 11 is a flowchart for a method of sending GPU overlay instructions to a client device, in accordance with some embodiments.

DETAILED DESCRIPTION

Figure 1:
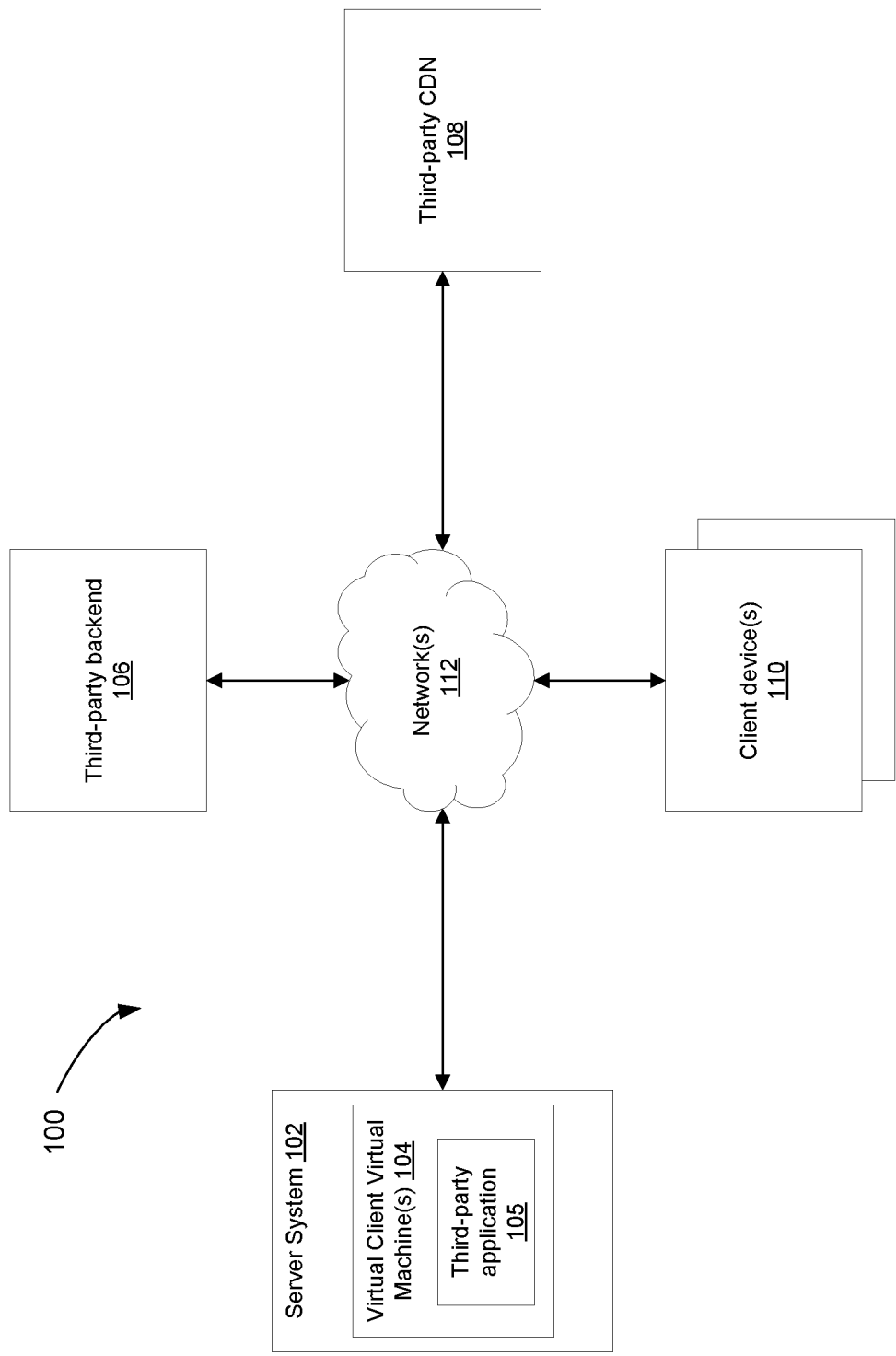
FIG. 1 is a top-level diagram illustrating a content delivery system, in accordance with some embodiments.

In accordance with some embodiments, computer systems provide an environment for third-party applications in which applications can run unmodified in a server environment in the third-party's domain (e.g., in a manner that is transparent to third-party applications that run on a client device).

Various embodiments described herein are directed to improvements of application server systems. In such systems, the user interacts with various interactive TV and VOD applications in a central facility such as a cable TV headend on a remote basis; with the user's interactions sent to the headend and video images transmitted back to the user's set-top. In this way, the user perceives the application as though it were running locally inside the set-top box. This mode of operation serves applications to the user with a typically high-level of interactivity measured by the responsiveness of the overall system. This responsiveness is achieved by operating the system within the confines of the cable TV network with high-bandwidth and low-latency between the client set-top box (STB) in the home and the server system in the headend.

A super-structure that combines application services from a headend with Internet-delivered services and third-party applications is provided. In some embodiments, translations of protocols allow various client devices, including by way of example and without limitation, a legacy STB, an Internet set-top, a smart TV, a tablet, or a smartphone, to interact with—and consume content from—any source within or outside of the cable TV network. In some embodiments, the structure further operates completely apart from a cable TV network and coordinate services from the Internet at large.

In some embodiments, the applications include user interface elements rendered via a graphics API (e.g., OpenGL) with full-screen video and/or partial-screen video (e.g., managed via a video playback API such as OpenMAX and/or managed via video decoding and rendering Android APIs). The applications are meant to be ported, installed and run locally on the client device. Instead, in some embodiments, methods are provided for running the application as, or similar to, unmodified Virtual Client Virtual Machines (VCVM) (e.g., and/or as containers) running on application servers in a different domain than the client's or central facility's domain. By virtualizing the used APIs, such as OpenGL and OpenMAX, application functionality can be separated from the rendering functionality. In some embodiments, the combining of disparate elements takes place in the client device under control of a respective smart-graphics-&-media-proxy (SGMP) at the application server. For example, in the client device, video is mixed with graphics by means of a graphics API, such as OpenGL, which treats the video as a texture layer to mix appropriately with other texture layers whether graphical or full motion. This is, compared to the complexity of a full client application, a relatively simple and low resource intensive process. Hence the thinned and application independent functionality running on the client device is referred to as Thin Client.

In some embodiments, multiple applications from multiple services are combined by the system to be active concurrently for a single user and presented to the user as a single, seamlessly integrated application. For example, while a user is watching a show in a VOD application, a sports match (e.g., in which a user has indicated an interest) begins. A Program Guide application that is provided by an application that is distinct from the VOD application (and possibly running on another server which might not be related to VOD application), temporarily displays, over the VOD application, an indication (e.g., a small overlaid notification) that the sports broadcast of interest is about to begin.

Various embodiments of a remote virtualization system and process that enables users of a plurality of various client devices to interact with video and graphic-rich interactive applications running in a remote server environment are provided. The resulting user experience is essentially equivalent to running these applications on the local client device, even when these devices require access to remote server resources such as various graphics rendering and other resources.

FIG. 1 is a top-level diagram illustrating a content delivery system, in accordance with some embodiments. System 100 includes server system 102 that is hosting one or more virtual client machines (VCVM(s)) 104. Each VCVM executes one or more third-party application(s) 105. System 100 further includes third-party backend 106, third-party content distribution network (CDN) 108, and client device 110. Server system 102, third-party backend 106, third-party CDN 108, and client device 110 communicate with each other via one or more network(s) 112.

In some embodiments, a respective VCVM 104 (e.g., a Linux container) is associated with one or more client devices 110. In some embodiments, the third-party application 105 and the third-party CDN 108 are associated with the same media providing service. In some embodiments, the third-party application 105 is configured to control playback of content provided by the third party CDN 108 (e.g., the third-party application 105 is a virtualized application that would normally be execute on the client device 110). For example, the client device 110 displays content provided by third-party CDN 108 while the third-party application 105 is executing on VCVM 104. In this way, client device 110 offloads execution of the third-party application to the server system 102, reducing the processing power and/or memory required by the client device 110. As such, instead of client device 110 controlling playback of media content that is retrieved from third-party CDN 108, server system 102 controls playback by issuing playback commands to client device 110.

In some embodiments, third-party backend 106 stores third-party backend data. In some embodiments, third-party backend 106 is in communication (e.g., via network(s) 112) with the third-party application 105 that is executing on virtual client virtual machine (VCVM) 104. In some embodiments, a plurality of third-party applications 105 (e.g., each third-party application associated with a content provider) execute on a same VCVM (e.g., a user is provided access to a plurality of third-applications that are executed on VCVM 104).

In some embodiments, third-party backend 106 receives requests (e.g., from third-party application 105 executing on VCVM 104) and issues responses in accordance with third-party backend data. For example, the user selects a title from the user interface to watch, and in response to the selection, the third-party application 105 queries either the backend 106 or the CDN 108 to find out how to get the actual media content. In response to the query, third-party backend 106 performs a lookup to determine where (e.g., a directory or server) the first media content item is stored, and third-party backend 106 issues a response to the third-party application 105 that identifies where to retrieve the first media content item from the identified location of storage (e.g., at third-party CDN 108). Using this information, the third-party application 105 uses the network API to download the media content. In some embodiments third-party backend 106 receives other types of queries (e.g., queries that do not require obtaining media assets, such as to initiate or end a user session). For example, third-party backend 106 issues responses to third-party application 105 upon receiving requests for user authentication, user profile information, recently viewed content, and/or identification of content (e.g., content catalogues) that are available to the user.

In some embodiments, third-party CDN 108 stores third-party content, including media content such as video assets and/or image assets. A media asset may contain a single representation for either audio or video, or combinations of various representations of audio and video. In some embodiments, a media asset includes a single representation of audio and a single representation of video in separate assets so the third-party application can select and request a respective asset that is applicable for the current conditions (e.g., bitrate) and/or based on user preference (e.g., audio in a certain language). Each media asset (e.g., audio and/or video asset) may be subdivided in multiple segments (e.g., referred to herein as media stream segments) that can be individually and progressively downloaded from the CDN 108. In some embodiments, as explained above, the third-party backend 106 issues a response to the third-party application 105 (e.g., or a third-party application proxy at the server system, as described below with reference to FIG. 7), and the third-party application 105 forwards instructions (e.g., the command) to client 110 (e.g., to retrieve the first media content item (e.g., media assets for the first media content item) from third-party CDN 108) and/or executes the command at the third-party application 105. In order for server system 102 to accurately control playback of media content at client device 110, server system 102 needs information about how much of the media asset the client device 110 has retrieved (e.g., which media stream segments the client device has retrieved) from CDN 108 (e.g., and/or current playback information regarding what the client device is currently playing back). In addition, one goal in virtualizing third-party application 105 is to avoid the need to modify third-party application 105 as compared to a version of the application that would run on client device 110. Often, applications that control presentation of video and other media content are configured to have access to the video or other media content. But, having been virtualized, it would be extremely inefficient to send the video or other media content to both the server system 102 and the client device 110 (where it is ultimately displayed).

Accordingly, in some embodiments, upon receiving a media stream segment (e.g., corresponding to a portion of the media asset from third-party CDN 108), client device 110 generates a digest of the media stream segment (e.g., a file that includes information, such as metadata, from the media stream segment, but from which video/image content from the media stream segment has been removed or discarded, as described with reference to FIG. 2) and sends the digest to server system 102. The digest includes identifying information (e.g., header information, number of frames, etc.) about the media stream segment the client device 110 retrieved from CDN 108. Thus, server system 102 (e.g., and VCVM 104) receives the identifying information in the digest, processes the identifying information to generate a reconstructed media stream (e.g., by adding dummy video data), and provides the reconstructed media stream to third-party application 105 executing on VCVM 104. Third-party application recognizes the reconstructed media stream (e.g., is "tricked" into processing the reconstructed media stream as if it were the original media stream retrieved from CDN 108), and issues a playback command to initiate playback of the media stream segment (e.g., after the application confirms that the full media stream segment has been retrieved). The command to initiate playback is transmitted from third-party application 105 to client device 110.

In response to receiving the command to initiate playback, client device 110 displays the unmodified media stream segment that was retrieved (e.g., downloaded) from CDN 108. Thus, client device 110 displays original content from CDN 108 based on a playback command controlled by the third-party application 105 executing on the server system 102. In some embodiments, third-party application 105 that is executing on the server system does not receive the original (e.g., unmodified) content from the CDN. Instead, third-party application 105 processes a segment reconstructed from the digest (e.g., a media stream segment without the video data) and issues the playback command based on the reconstructed digest. This reduces the amount of bandwidth sent between the server system and client device by allowing the client device 110 to directly download the media content from CDN 108, store the media content at the client, and send a digest (e.g., that has a smaller data size than the original media content) to the server system 102 such that the third-party application 105 executes without awareness that the VCVM 104 is separate from client device 110. Because client device 110 does not have to download or execute third-party application, client device 110 may be a "thin-client" that has limited processing power and/or memory.

Figure 2:
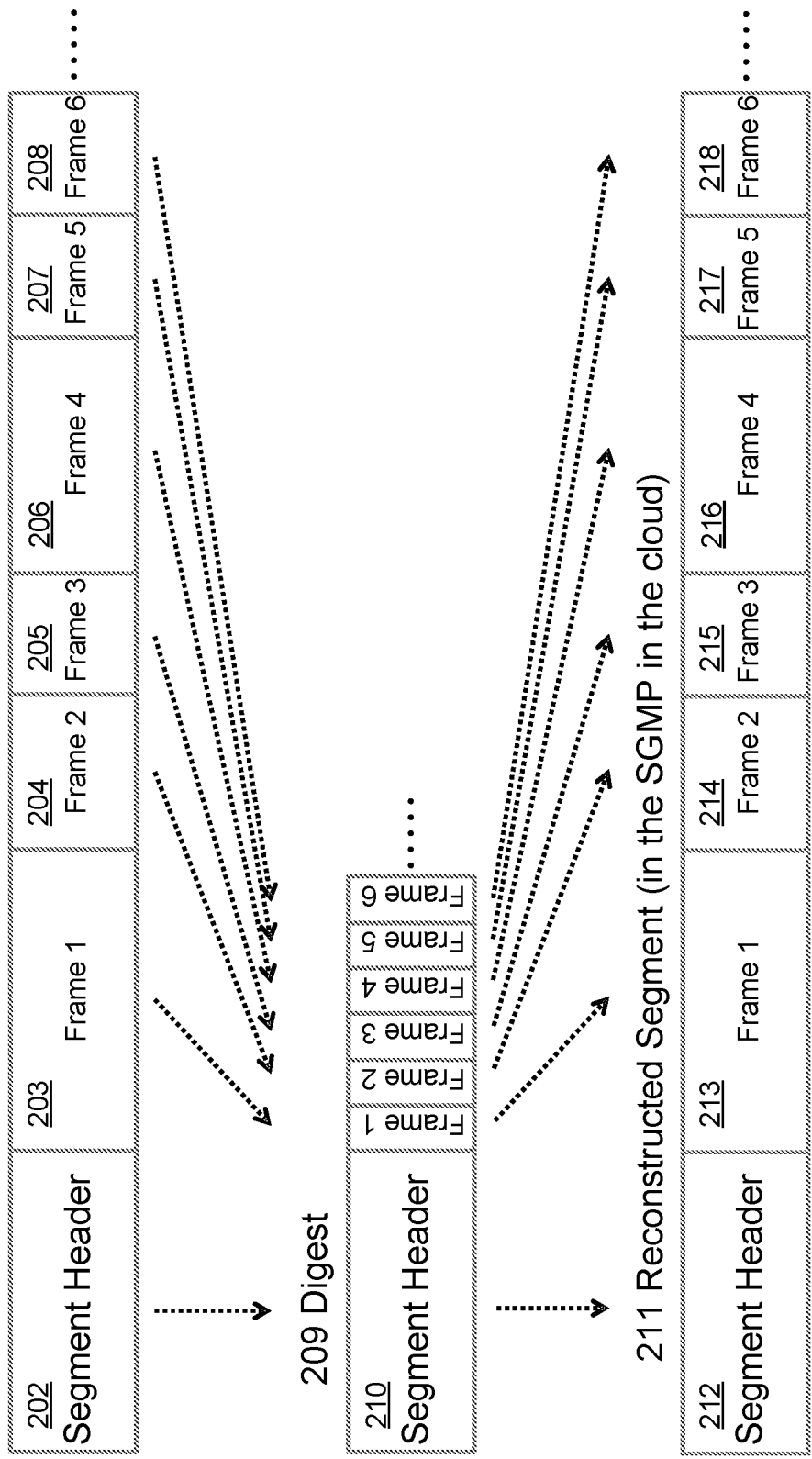
FIG. 2 is a diagram that illustrates the transformation of a video segment into a digest segment and its reconstruction into a reconstructed segment, in accordance with some embodiments.

FIG. 2 illustrates an example of generation of a digest 209 and a reconstructed segment 211. In some embodiments, a video stream comprises a plurality of media stream segments. The media stream segments are stored at CDN 108. In some embodiments, original segment 201 is obtained by client device 110. For example, client device 110 retrieves original segment 201 from the third-party CDN 108 (e.g., in response to the client receiving a command to retrieve the original segment 201).

Original Segment 201 depicts a hypothetical segment, such as an ISO base-media file-format (BMFF) segment as used in MPEG-dynamic-adaptive-streaming over HTTP (MPEG-DASH). Such a segment comprises a segment header 202 (e.g., which also corresponds to segment headers 210 and 212) and several frames, in this example, 203 to 208. It should be appreciated that the bulk of the segment data typically is the DRM-protected frame data. In some embodiments, the digest segment of the segment 209 is formed by removing the DRM-protected frame data and only including in the digest segment 209 the unmodified segment header (e.g., segment header 210 corresponds to unmodified segment header 202) and/or frame headers (such as picture headers and slice headers), including any codec specific headers, such as sequence headers, that are required to make an accurate reconstruction of the sequence of frames into reconstructed segment 211.

In some embodiments, after client device 110 receives original segment 201 (e.g., from CDN 108), the client device 110 stores the original segment (e.g., in a buffer of the client device 110). In some embodiments, the client device 110 generates digest segment 209 and sends the digest segment 209 to server system 102. The server system 102 reconstructs the digest segment 209 into reconstructed segment 211 and provides reconstructed segment 211 to third-party application 105. Upon receiving reconstructed segment 211, third-party application 105 processes the reconstructed segment 211 (e.g., as if third-party application 105 had received original segment 201) and generates a playback command (e.g., a playback command that references and/or identifies original segment 201). The server system 102 sends the playback command to client device 110. In response to receiving the playback command, client device 110 initiates playback of original segment 201. In some embodiments, this process is repeated for each media stream segment that the client retrieves from CDN 108.

In some embodiments, instead of the client device 110 generating digest segment 209, client device forwards original segment 201 to server system 102 (e.g., and/or third party CDN 108 sends original segment 201 directly to server system 102), and the server system generates digest segment 209 (e.g., and stores the digest segment 209 in a cache at the server system). Then, in some embodiments, in response to a second client device requesting playback for the same media asset, the server system 102 retrieves the digest segment for the requested media segment, reconstructs the digest segment, and provides the reconstructed segment to the third-party application 105 (e.g., that corresponds to a user session of the second client device).

Figure 3:
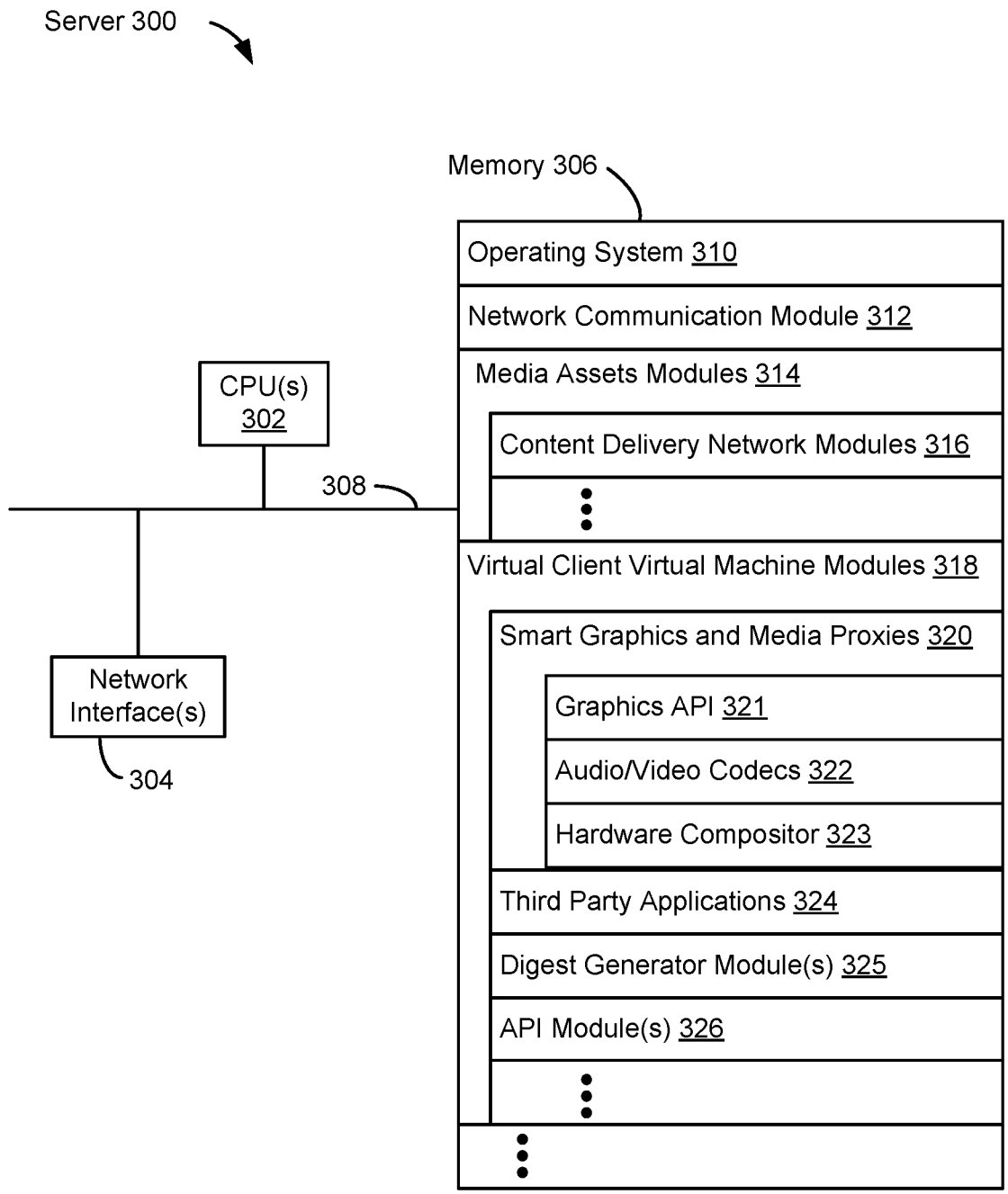
FIG. 3 is a block diagram of a server system, in accordance with some embodiments.

FIG. 3 is a block diagram illustrating an exemplary server computer system 300 in accordance with some implementations. In some embodiments, server computer system 300 is an application server system (e.g., server system 102) that executes virtual client virtual machine 104. The server computer system 300 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306, optionally, includes one or more storage devices remotely located from one or more CPUs 302. Memory 306, or, alternatively, the non-volatile solid-state memory device(s) within memory 306, includes a non-transitory computer-readable storage medium. In some implementations, memory 306, or the non-transitory computer-readable storage medium of memory 306, stores the following programs, modules and data structures, or a subset or superset thereof:

an operating system 310 that includes procedures for handling various basic system services and for performing hardware dependent tasks;

a network communication module 312 that is used for connecting the server computer system 300 to other computing devices via one or more network interfaces 304 (wired or wireless) connected to one or more networks such as the Internet, other WANs, LANs, PANs, MANs, VPNs, peer-to-peer networks, content delivery networks, ad-hoc connections, and so on;

one or more media assets modules 314 for enabling the server computer system 300 to perform various functions, the media assets modules 314 including, but not limited to:

content delivery network modules 316 for retrieving and/or processing media content received, for example, from CDN 108;

one or more virtual client virtual machine modules 318 for executing one or more VCVM(s) 104; in some implementations, the one or more virtual client virtual machine modules 318 include:

smart graphics and media proxies 320 for tracking graphical states of client devices and/or processing graphics content, including one or more of:

graphics API 321 for generating and/or sending GPU overlay instructions (e.g., openGL primitives) to a client device;

audio/video codecs 322 for determining and/or sending playback commands to a client device;

hardware compositor 323 (e.g., a virtualized hardware compositor) for generating and/or sending compositing instructions to a client device;

third party applications 324 for execution on the VCVM(s) 104 (e.g., applications 324 include third-party applications as described above);

digest generator module(s) 325 for generating digest segments based on media stream segments; and API module(s) 326 for calling and/or using APIs, including for example, a Network API and an API of the third-party application (e.g., media playback API) to process playback of the media streams and/or digest segments.

In some implementations, the server computer system 300 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Although FIG. 3 illustrates the server computer system 300 in accordance with some implementations, FIG. 3 is intended more as a functional description of the various features that may be present in one or more media content servers than as a structural schematic of the implementations described herein. In practice, items shown separately could be combined and some items could be separated. For example, some items shown separately in FIG. 3 could be implemented on single servers and single items could be implemented by one or more servers. The actual number of servers used to implement server computer system 300, and how features are allocated among them, will vary from one implementation to another and, optionally, depends in part on the amount of data traffic that the server system handles during peak usage periods as well as during average usage periods.

Figure 4:
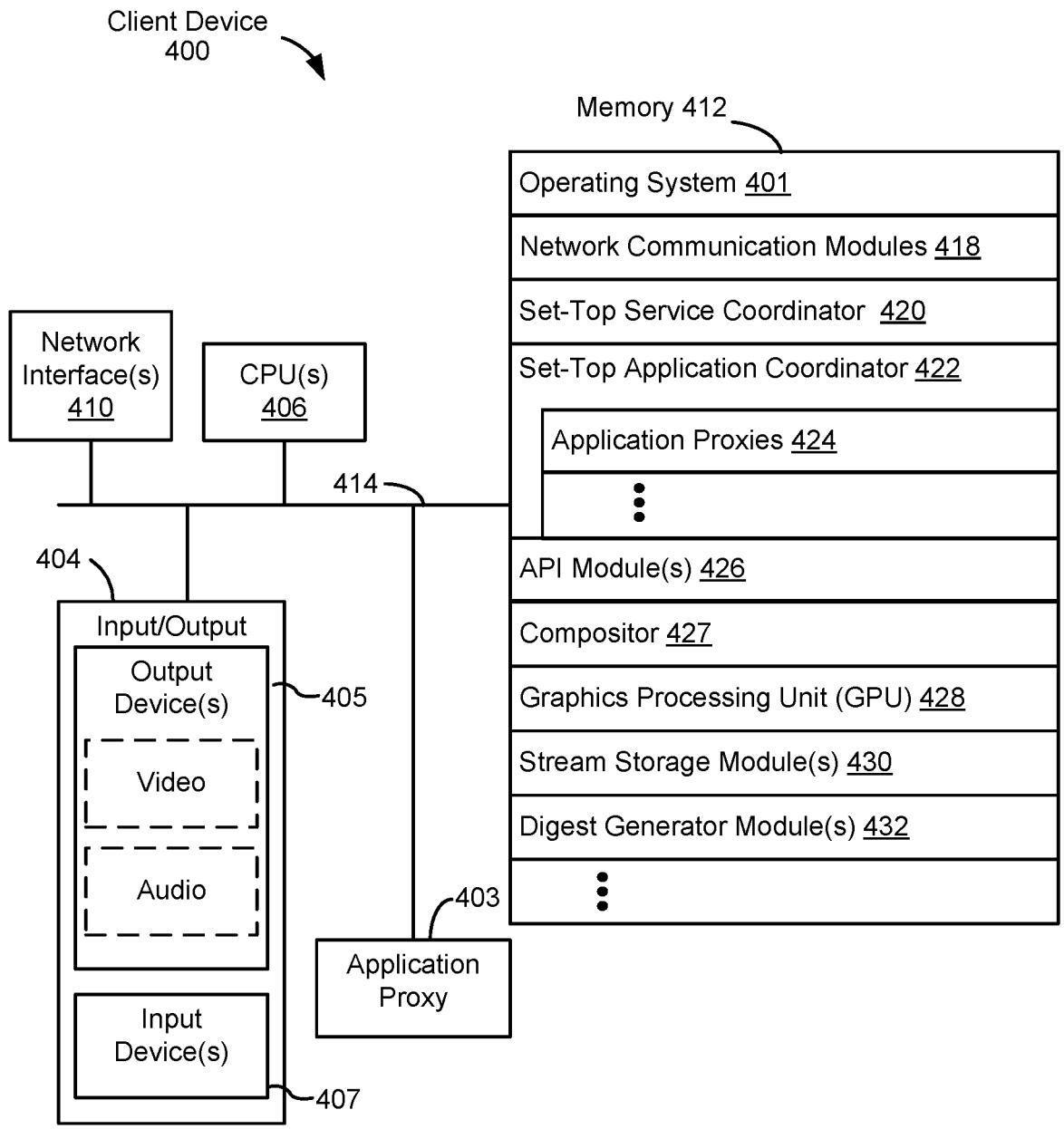
FIG. 4 is a block diagram of a client device, in accordance with some embodiments.

FIG. 4 is a block diagram illustrating an exemplary client device 400 (e.g., client device 110 of FIG. 1) in accordance with some implementations. The client device 400 typically includes one or more central processing units (CPU(s), e.g., processors or cores) 406, one or more network (or other communications) interfaces 410, memory 408, and one or more communication buses 414 for interconnecting these components. The communication buses 414 optionally include circuitry (sometimes called a chipset) that interconnects and controls communications between system components.

The client device includes input/output module 404, including output device(s) 405, such as video output and audio output, and input device(s) 407. In some implementations, the input devices 407 include a keyboard, a remote controller, or a track pad. For example, output device 405 is used for outputting video and/or audio content (e.g., to be reproduced by one or more displays and/or loudspeakers coupled with client device 400) and/or input device 407 is used for receiving user input (e.g., from a component of client device 400 (e.g., keyboard, mouse, and/or touchscreen) and/or a control coupled to client device 400 (e.g., a remote control)). Alternatively, or in addition, the client device includes (e.g., is coupled to) a display device (e.g., to display video output).

The client device includes application proxy 403 for communicating with third-party applications that are executing on the server system. For example, instead of storing and executing the application(s) on the client device, application proxy 403 receives commands (e.g., from a virtual machine in the server system) and, based on the received commands, instructs the client device to update the display accordingly.

In some implementations, the one or more network interfaces 410 include wireless and/or wired interfaces for receiving data from and/or transmitting data to other client devices 400, a server computer system 300, and/or other devices or systems. In some implementations, data communications are carried out using any of a variety of custom or standard wired protocols (e.g., USB, Firewire, Ethernet, etc.).

Memory 412 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 412 may optionally include one or more storage devices remotely located from the CPU(s) 406. Memory 412, or alternately, the non-volatile memory solid-state storage devices within memory 412, includes a non-transitory computer-readable storage medium. In some implementations, memory 412 or the non-transitory computer-readable storage medium of memory 412 stores the following programs, modules, and data structures, or a subset or superset thereof:

- an operating system 401 that includes procedures for handling various basic system services and for performing hardware dependent tasks;
- network communication module(s) 418 for connecting the client device 400 to other computing devices (e.g., client devices 110, server computer system 300, and/or other devices) via the one or more network interface(s) 410 (wired or wireless);
- a set-top service coordinator 420 for communicating with an operator data center, such as an orchestrator for handling content services provided to the client device (e.g., set-top box);
- a set-top application coordinator 422 for managing a plurality of third-party applications executing at the server system, the set-top application coordinator having additional module(s), including but not limited to:
    one or more application proxies 424 for communicating (e.g., graphical states) with third-party applications;
- API Module(s) 426 for managing a variety of APIs, including, for example, OpenGL and/or OpenMAX;
- Graphics Processing Unit (GPU) 428 for rendering graphical content, including frame buffering and display control;
- stream storage module(s) 430 (e.g., including one or more buffers) for storing original media content (e.g., from CDN 108), such as storing an original segment of a video stream; and
- digest generator module(s) 432 for generating respective digest segments for respective media stream segments and sending the digest segments to the server system.

Features of the present invention can be implemented in, using, or with the assistance of a computer program product, such as a storage medium (media) or computer readable storage medium (media) having instructions stored thereon/in which can be used to program a processing system to perform any of the features presented herein. The storage medium (e.g., the memory 306 and the memory 412) can include, but is not limited to, high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. In some embodiments, the memory 306 and the memory 412 include one or more storage devices remotely located from the CPU(s) 302 and 406. The memory 306 and the memory 412, or alternatively the non-volatile memory device(s) within these memories, comprises a non-transitory computer readable storage medium.

Figure 5A:
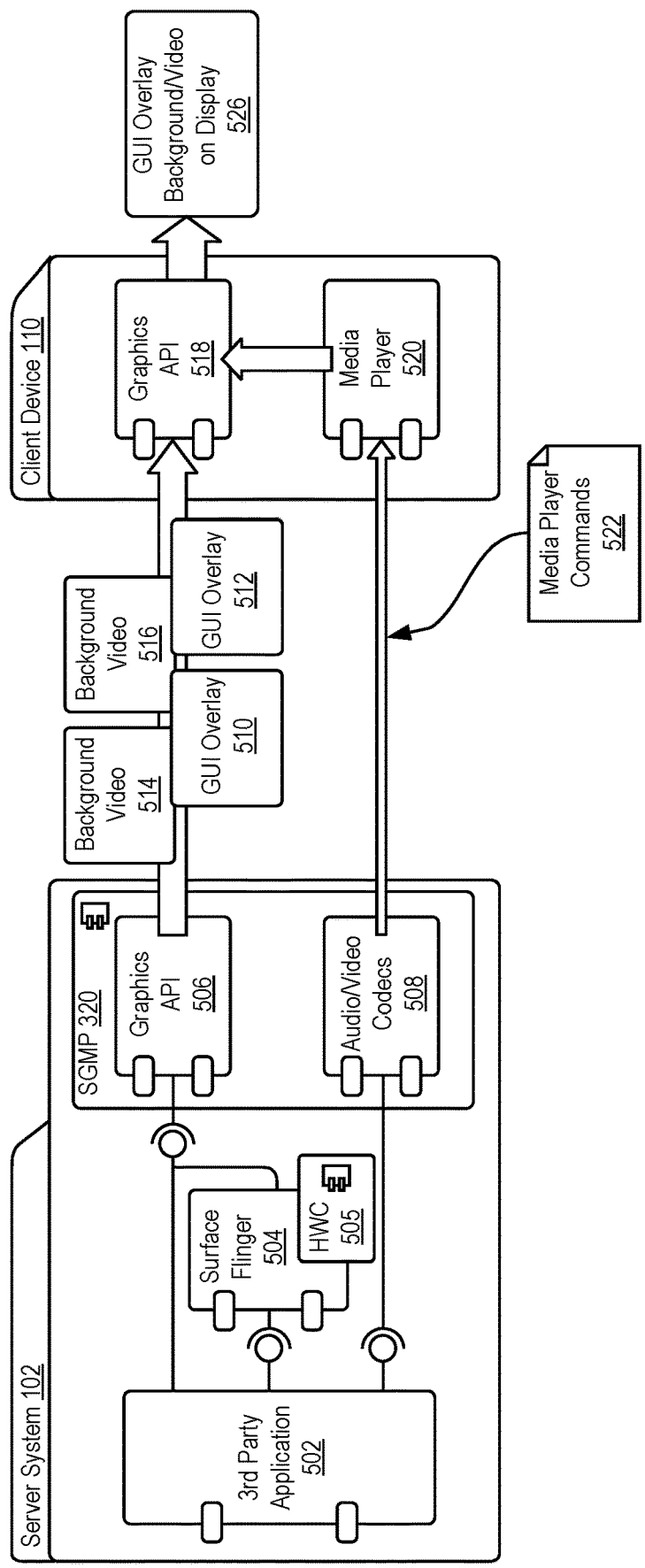
FIGS. 5A-5B are block diagrams of compositing graphical user interface overlays with video content, in accordance with some embodiments.
Figure 5B:
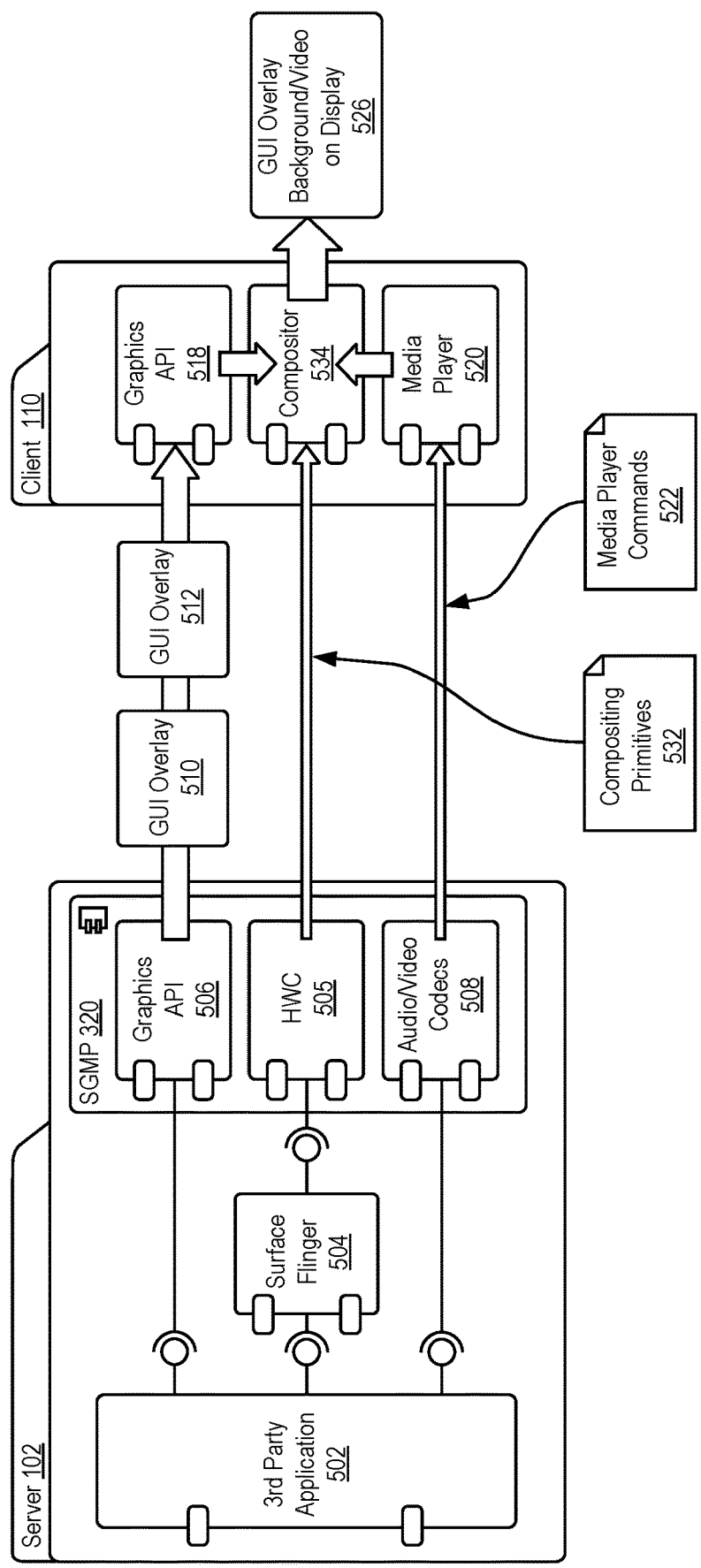

FIGS. 5A-5B illustrate block diagrams for compositing media content for an application executing at a virtual machine.

FIG. 5A illustrates a third-party application 502 (e.g., third-party application 105, FIG. 1), which is executing at a server system 102. In some embodiments, VCVM 104 is running an Android Operating System and includes a surface flinger 504 for combining a plurality of assets (e.g., combining different visual surfaces into a common stream) and sending the combination to a hardware composer (HWC) 505. FIG. 5A further illustrates a smart graphics media proxy (SGMP) 320 at the server system 102, including Graphics API 506 and Audio/Video Codecs 508.

In the system illustrated in FIG. 5A, third-party application 502 sends textures to graphics API 506. Graphics API 506 then forwards these textures to client device 110. Graphics API also sends instructions for rendering the textures (e.g., also referred to as GUI overlay instructions) to the client device 110 for each frame of a plurality of frames in a media stream segment. In some embodiments, these textures are sent by the server system 102 as (compressed) encoded images (PNG, JPEG, WebP, etc. . . . ) with the associated rendering instructions to the client device 110. For example, Graphics API 506 at server system 102 sends a background (e.g., a placeholder for video content) 514 and GUI overlay instructions 510 (e.g., rendering instructions) to the client device 110. For example, the background comprises a background or video layer that either displays a (black) background or a video and a GUI overlay is overlaid over the background or the video (e.g., GUI overlay instructions 510 for rendering a GUI overlay with background frame 514 and GUI overlay instructions 512 for rendering a GUI overlay with background frame 516). Client device 110 receives, from server system 102, the encoded images that represent the textures, decodes the images, and the GPU of the client device uses the decoded images and the rendering instructions to render and display the resulting graphical image (e.g., as if the application 502 had passed the textures directly to the GPU on the client device 110).

In some embodiments, textures provided by third-party application 502 are generic textures such that many of the textures can be reused by the client device 110 to render a GUI. For example, after a set of textures have been sent to the client device 110, the client device 110 does not need to receive the set of textures again (e.g., because the texture has already been decoded by the client device 110 and stored on the GPU of the client device). In some embodiments, the rendering instructions are compressed before sending from the server system 102 to the client device 110. Thus, in some embodiments, the GUI overlay instructions do not include the textures (e.g., the GUI overlay instructions only include the rendering instructions because the client device 110 already has the textures).

FIG. 5A also illustrates the server system 102 sending media player commands 522 from audio/video codecs 508 to media player 520 on the client device 110. For example, as described with reference to FIG. 1, the client device 110 receives media content for a media stream segment from CDN 108 (not shown in FIG. 5A). In some embodiments, the client device 110 generates a digest segment, as explained with reference to FIG. 2, and sends the digest segment to the server system 102. The server system 102 reconstructs the digest segment (e.g., using dummy data) and feeds the reconstructed segment to the third-party application (e.g., third-party application 502) that is executing in a virtual machine hosted on the server system 102. Upon determining (e.g., by the third-party application 502) that the media stream segment has been retrieved, the application sends a play command, via audio/video codecs 508 at the server system 102, to media player 520 at the client device. For example, the play command comprises an instruction for the client device 110 to initiate playback (e.g., display) of the media stream segment corresponding to the digest segment.

In response to receiving the play command at media player 520, the client device 110 retrieves (e.g., from a buffer at the client device) the original media stream segment that was received from the CDN 108 (e.g., which includes the video data) and combines, using Graphics API 518, a video frame from the original media stream segment with the rendered GUI overlay (e.g., that is rendered from the textures and the rendering instructions received from server system 102). Thus, the application at the server system continues to control playback of the media stream segment from a reconstructed digest segment (e.g., that does not include video data) and the client displays the original (e.g., unmodified) media stream segment in response to playback commands 522 received from the server.

Accordingly, even when the GUI overlay has not changed between successive frames, the server system 102 sends the textures received from third-party application 502 and/or rendering instructions (e.g., GUI overlay instructions) for each frame. The server system 102 thus also clocks the frames of the media stream segment. A disadvantage of clocking the frames at the server arises because latency on the network can cause jitter to the displayed frames at the client. If the connection between the client device 110 and the server system 102 is interrupted or delayed, the rendering instructions are at risk of arriving late and delaying the client device from rendering the next video frame. Also, more bandwidth is required to send the textures and rendering instructions for the textures for each frame of the media stream segment to the client device 110. For example, when video is playing (e.g., third-party application 502 sends instructions for rendering textures for each frame of a playing video) the amount of instruction the server system 102 sends to client device 110 becomes significant.

Therefore, it is beneficial to separate the background/video from the GUI overlays such that the client device 110 renders the video to an independent plane that is automatically composited in hardware with any overlaid GUI. For example, the client device 110 uses a "Compositor" component that receives compositing instructions from a virtualized implementation of the HWC 505, as illustrated in FIG. 5B.

FIG. 5B illustrates a system similar to the system illustrated in FIG. 5A, except that the hardware composer (HWC) 505 of the surface flinger 504 is virtualized in the SGMP 320 (e.g., which also includes Graphics API 506, HWC, and Audio/Video Codecs 508) at the server system 102. For example, instead of sending textures and rendering instructions for the textures for each frame of video, the HWC transmits compositing primitives 532 separately from the GUI overlay instructions 510 and 512 (e.g., also referred to herein as GPU overlay instructions and/or drawing instructions) sent by the Graphics API. For example, compositing primitives include orientation instructions for the client compositor on how to arrange the GPU overlay instructions on the display. In some embodiments, the compositing primitives (e.g., orientation instructions) comprise an indication of a location at which the graphics should be displayed and/or a transparency of the graphics to be displayed. Accordingly, the server system 102 sends compositing instructions that tell the compositor at the client device 110 how to construct a GUI from the received GUI overlay instructions on the client itself. Thus, the client device 110, using compositor 534, composites the frames locally and thus the GUI frames become asynchronous with respect to (e.g., are not clocked by) the video frames.

The client device 110 in FIG. 5B continues to receive video playback commands from Audio/Video codecs 508, such that the server system continues to control the video playback of the client device (e.g., by issuing a "play" command for a respective media stream segment). However, the server system 102 sends GUI overlay instructions as needed (e.g., when there is an update to the instructions) and need only send compositing primitives as needed (e.g., when there is an update). For example, GUI overlay instructions may or may not be sent from the server system 102 to client device 110 during any period of time and need not be tied to (e.g., clocked by) any particular video frame. For example, if there is no GUI overlaid (e.g., during playback of video content without user interaction), no GUI overlay instructions are sent. When a user interacts with the application (e.g., via a user input at client device 110), the application 502 generates an overlay to be rendered as a GUI (e.g., and the server system 102 sends GUI overlay instructions for drawing the textures), and the server system 102 sends the corresponding GUI overlay instructions.

In some embodiments, the server system sends a series of GUI overlay instructions at a particular frame rate in accordance with a determination that the series of GUI overlay instructions are for generating an animation to be displayed on client device 110. For example, although the GUI overlay instructions are sent by the server as needed (e.g., when there is an update to the graphics provided by the third-party application), such as in response to a user interaction (e.g., that cause volume controls, a scrub bar, information, subtitles, etc., to be overlaid with the media content) and/or when the GUI overlay instructions correspond to drawing textures that will be used for generating an animation, a stream of GUI overlay instructions (e.g., GUI frames) are sent by the server at a frame rate to make the animation appear smooth on the client device, as described with reference to FIGS. 6A-6E. In some embodiments, these short "bursts" of animations when changing (e.g., updating) display of something on the screen (e.g., a scrolling animation as the user scrolls through titles, where the animations may be as long as the user interaction).

FIGS. 6A-6E illustrate timelines for transmitting GUI frames from server system 102 to client device 110 in accordance with some embodiments. In some embodiments, the GUI Frames 602 illustrated in FIGS. 6A-6E are illustrated on different timelines, each timeline corresponding to when a respective GUI frame is processed at the third-party application, the server system, and/or the client device. For example "server timeline" refers to a timing of the GUI frames transmitted by the server system 102, "client timeline" refers to a timing of the GUI frames rendered by client device 110, and "application timeline" (FIGS. 6D-6E) refers to the application generating instructions (e.g., GUI overlay instructions) and/or sending the instructions GUI frames at the server system 102.

In some embodiments, the series of GUI Frames 602 (e.g., GUI Frame 602-1 through GUI Frame 602-7) at the server (e.g., server system 102) are sent to the client device 110 at a first frame rate (e.g., 30 frames per second, 60 frames per second, etc.). For example, the server system sends the GUI Frames 602 at the first frame rate in accordance with a determination that an animation is displayed at the client device (e.g., the server system sends a series of GUI frames 602 in accordance with an animation being displayed at the client device and/or as a result of a user interaction). When the client device 110 displays an animation, it is important that the client be able to render the GUI frames in a timely manner such that the animation (e.g., and/or other graphics) is displayed smoothly (e.g., without interruption).

In some embodiments, there is a network latency between the server system and the client device (e.g., represented by GUI frame 602-1 e.g., shifted to the right on the client timeline as compared to the server timeline). In addition, in some embodiments, the client device 110 requires more time to render the GUI frames 602 (e.g., the client device renders at a slower rate, such as 20 fps) than the server system expects (e.g., than the rate at which the server system generates and/or sends the GUI overlay instructions). The longer amount of time that the client device requires to process each frame is represented by the widths of the frames in the client timeline as compared to the server timeline. In some embodiments, the delay at the client device for rendering the GUI frames is a result of hardware limitations of the client device 110. Accordingly, as the server system continues generating and sending the series of GUI overlay instructions (e.g., represented as GUI frames 602-1 through 602-7), the client device falls further behind.

Figure 6A:
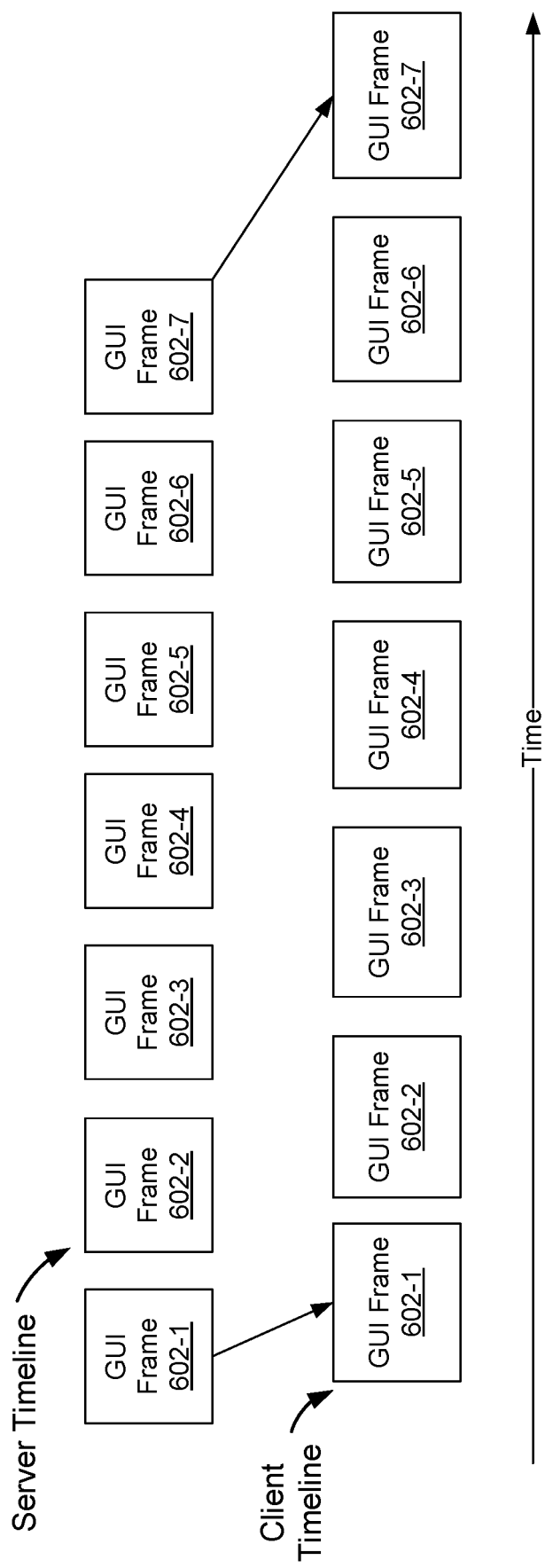
FIGS. 6A-6E are block diagrams of updating a GUI frame rate at a server in accordance with the timing for rendering the GUI frames at a client device, in accordance with some embodiments.
Figure 6B:
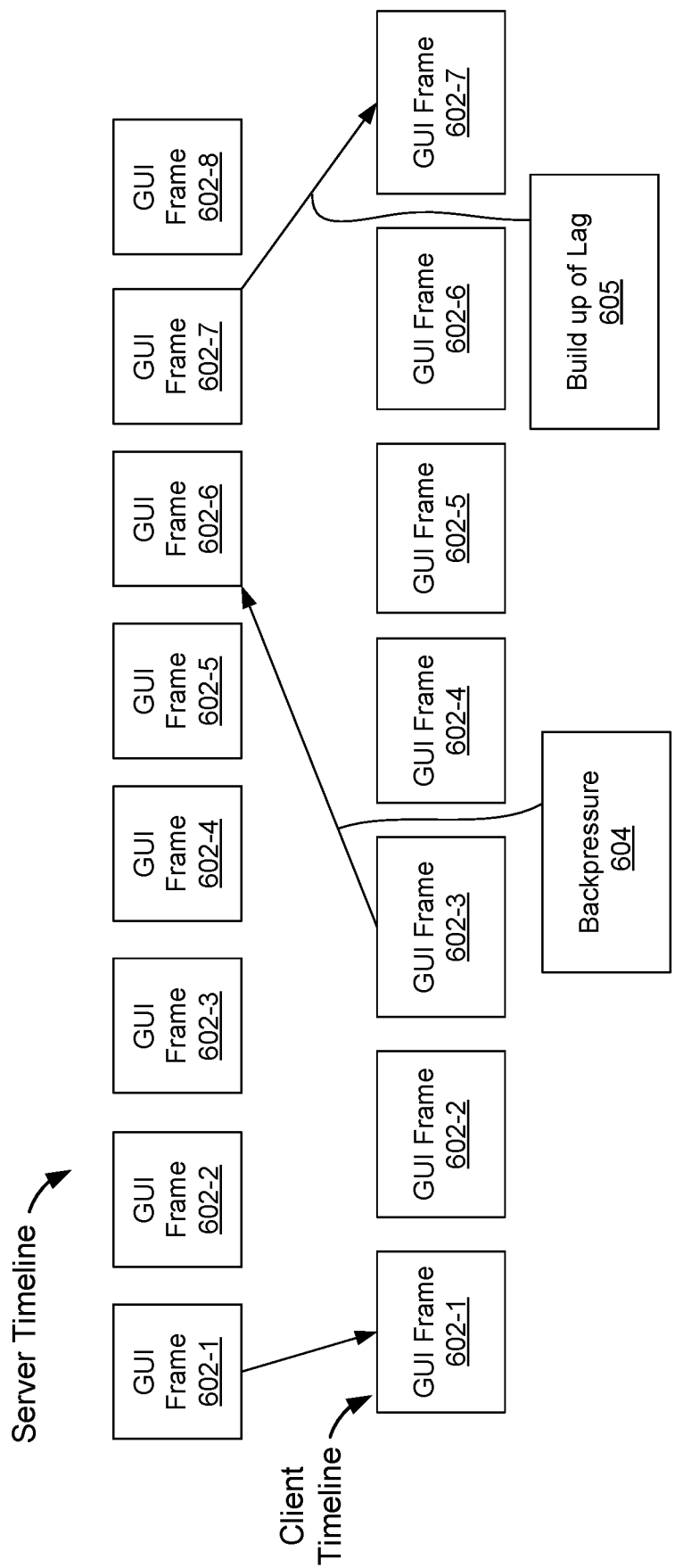

FIG. 6B illustrates the client device sending a backpressure signal 604-1 to the server system 102 to indicate that the client device is falling behind in rendering the GUI frames 602. In some embodiments, the backpressure signal 604 is indicative of when the client device has finished processing a respective frame. In some embodiments, the backpressure signal 604 comprises a time stamp indicating a time that the client displays (e.g., renders) a respective GUI frame. For example, backpressure signal 604 includes a timestamp and an identification of GUI Frame 602-3, such that the server system, based on the backpressure signal 604, determines a delay of rendering the GUI frames at the client device. In some embodiments, the backpressure signal is sent for every frame (e.g., a corresponding backpressure signal is sent when the client device finishes processing each respective frame). In some embodiments, the backpressure signal is sent periodically (e.g., every 3 frames, every 10 milliseconds, etc.). In some embodiments, the backpressure signal is sent in accordance with the client device determining that it is rendering the GUI frames at a slower rate than at which it is receiving GUI frames from the server (e.g., in response to the client device determining that it is behind). For example, the server system receives backpressure signal 604 indicating a timestamp that GUI frame 602-3 is rendered at the client device while server system is sending GUI frame 602-6. Accordingly, a build-up of lag 605 has occurred.

Figure 6C:
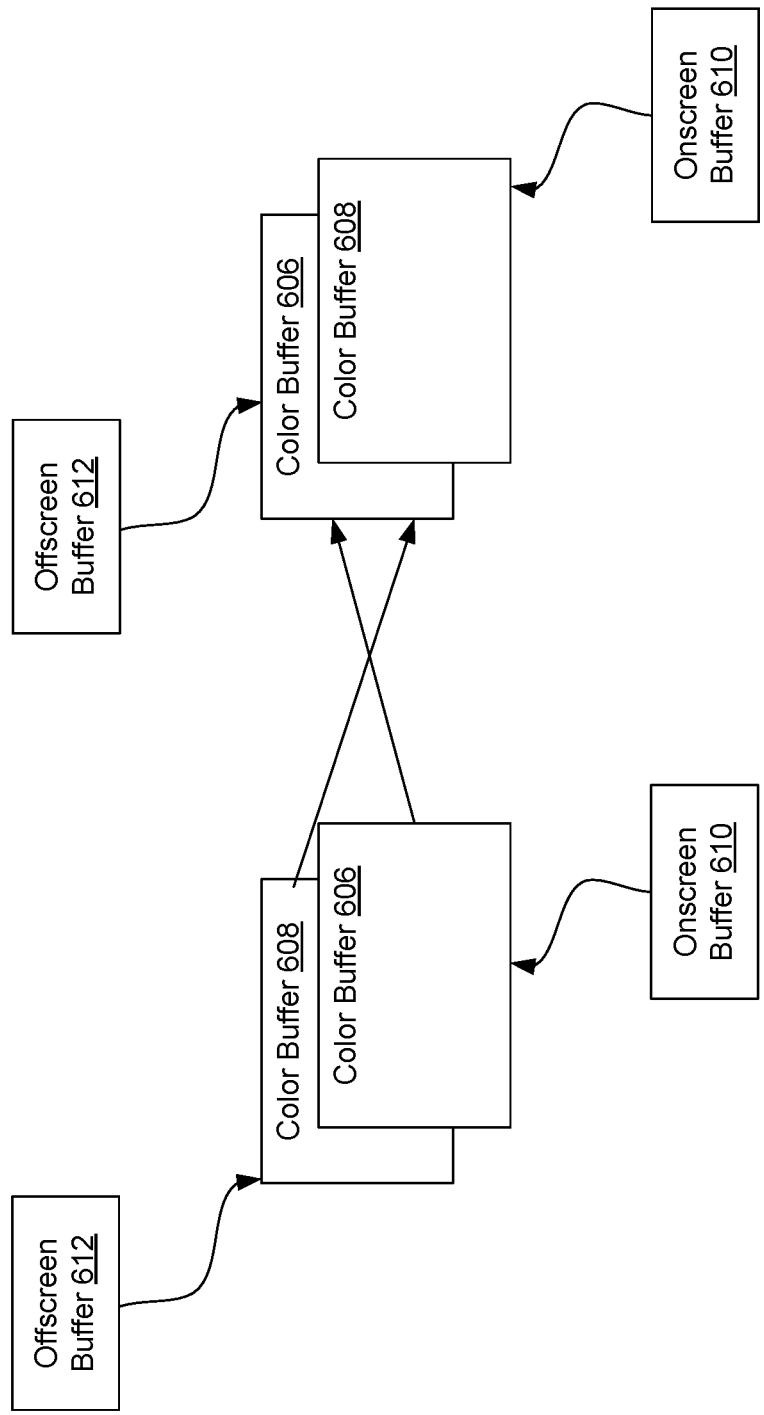

FIG. 6C illustrates an example of swapping buffers in accordance with some embodiments. In some embodiments, third-party application 105 uses two buffers to process and display content. For example, third-party application 105 loads color buffer 608 with content (e.g., which is not displayed and corresponds to offscreen buffer 612) while displaying content that was already loaded into color buffer 606 (e.g., which, while displayed, corresponds to onscreen buffer 610). To switch the displayed content, third-party application 105 issues (e.g., at the instruction of server system 102) a SwapBuffer command to switch the color buffers such that color buffer 606 becomes offscreen buffer 612 to be loaded with next content for display, while color buffer 608 (e.g., that was loaded with content while offscreen) becomes onscreen buffer 610. It will be understood that more than two buffers are used in some embodiments (e.g., alternating between three or more buffers).

Figure 6D:
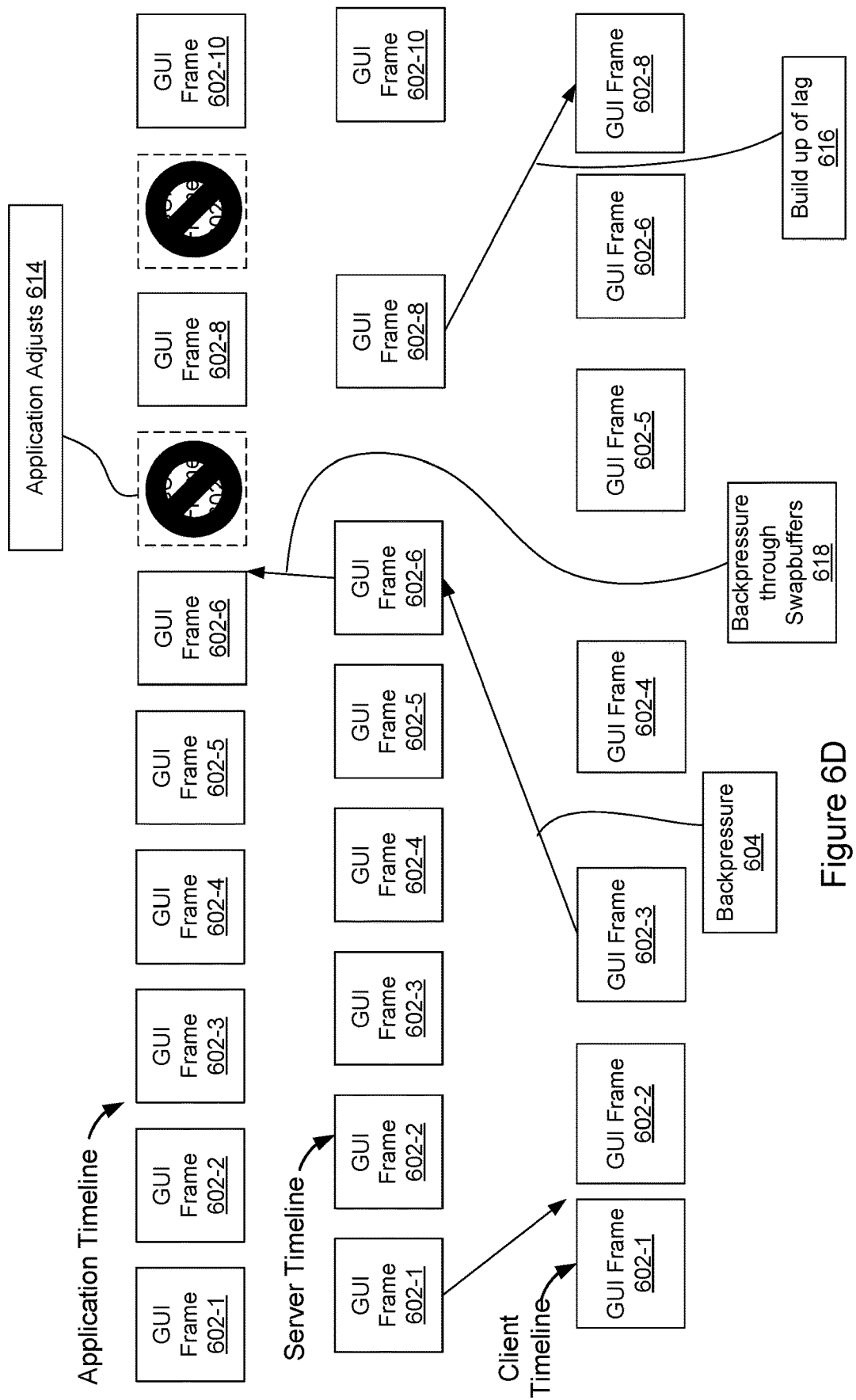

FIG. 6D illustrates an example of using a SwapBuffer command 618 to adjust (e.g., slow down) the application timeline for generating and/or transmitting GUI frames 602 (e.g., GUI overlay instructions). For example, in some embodiments, SwapBuffer command 618 is issued only in response to the server system 102 receiving an appropriate backpressure signal 604. For example, the server system may issue SwapBuffer command 618 for the nth frame upon receiving a backpressure signal for the (n−2)th frame (where the offset is due to latency in transmission, which does not contribute to build-up of lag). Thus, the server system withholds the SwapBuffer command 618 until it receives the appropriate backpressure signal. Accordingly, third-party application 105 is unable to switch buffers to move to the next frame. By slowing down (e.g., pausing) the SwapBuffer command, the frame rate of the GUI frames generated and/or sent by the application (e.g., at the application timeline) is effectively reduced. For example, instead of issuing the SwapBuffer command at the first rate (e.g., to achieve 60 fps), the SwapBuffer command is issued at a lower rate (e.g., to achieve 30 fps). In some embodiments, withholding the SwapBuffer command also causes the application to "skip" (e.g., not produce) a GUI frame (e.g., GUI frame 602-7 and GUI frame 602-9 are skipped, as illustrated in FIGS. 6D and 6E), because there is no buffer in which to put the GUI frame, and thus client device never receives an instruction to render the GUI frames (e.g., there is no GUI frame 602-7 shown on client timeline), which shortens the buildup of lag 616 (e.g., and/or prevents future buildup of lag) between the client timeline and the application and server timelines.

Figure 6E:
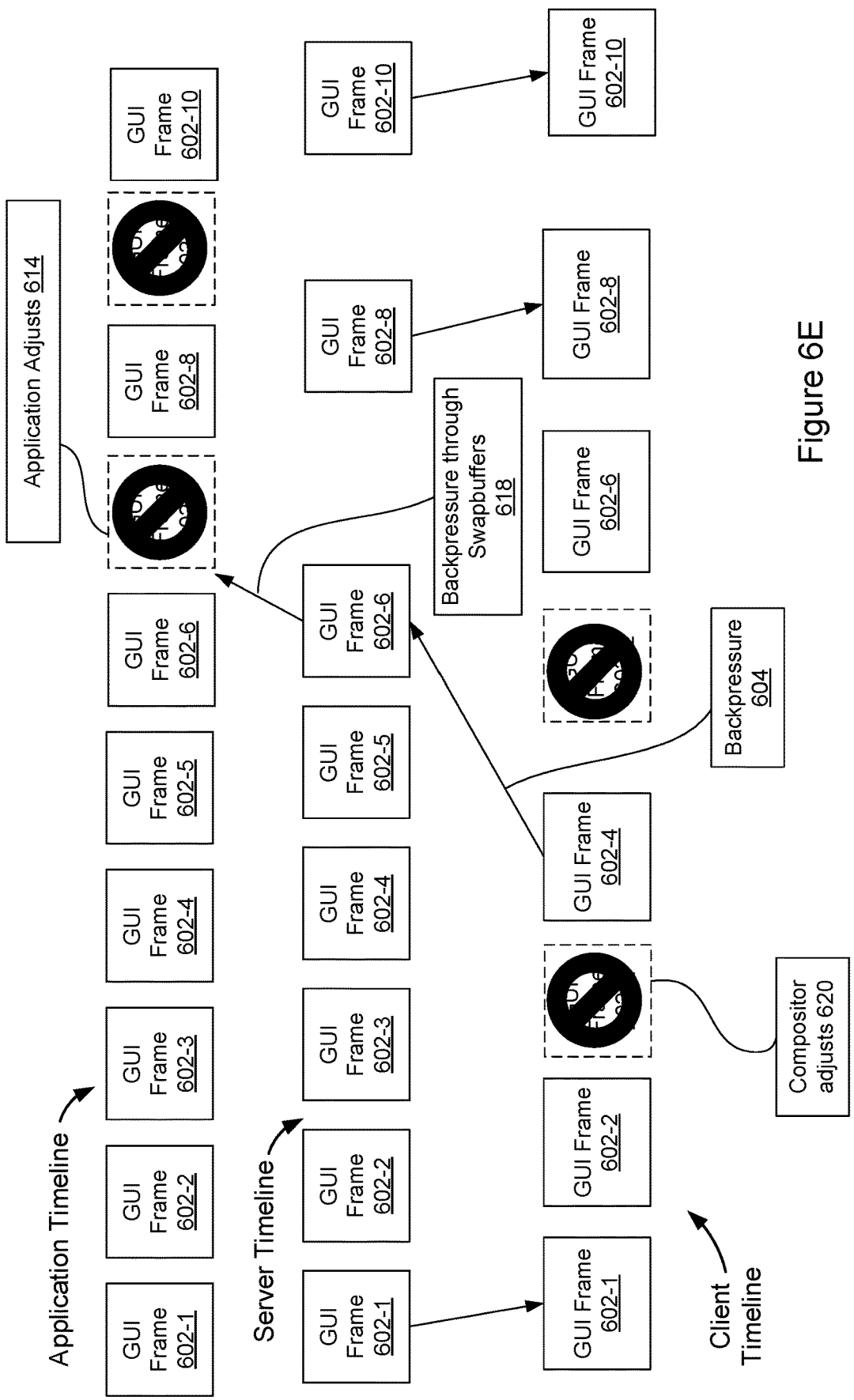

FIG. 6E illustrates client-side compositing (as described in FIG. 5B) and backpressure together, where GUI frames are tagged with a presentation timestamp so that the client-side compositor may drop frames that cannot be rendered in time. A backpressure signal 604 is used to reduce the frame rate transmitted by the server, and the application is forced to reduce its frame rate by withholding a SwapBuffer command (e.g., at application adjusts 614), as explained with reference to FIG. 6D. In addition, because the client is doing the compositing, the client device skips GUI frame 602-3 (e.g., at compositor adjusts 620) in order to try to keep up with rendering the GUI frames as they arrive from the server system (e.g., the instruction to render GUI frame 602-4 is received by the client device before the client device has rendered GUI frame 602-3 and thus the client device skips GUI frame 602-3). Accordingly, in some embodiments, the frame rate for rendering GUI frames at the client device is adjusted by the application (e.g., using SwapBuffer commands) and/or by the client device. As illustrated in FIG. 6E, the buildup of lag for GUI frame 602-8 is decreased further (e.g., the buildup is eliminated/prevented) when both the compositor at the client device 110 and the application adjust.

In some embodiments, the server system determines, based on the backpressure signal 604 (e.g., a time indication of when the client device has rendered/displayed a respective GUI frame), how much the application timeline needs to be adjusted (e.g., how long to withhold the SwapBuffer command(s)). In some embodiments, the server system iteratively adjusts an amount of time to withhold the Swap-Buffer commands (e.g., depending on whether the client device continues to be behind).

Figure 7A:
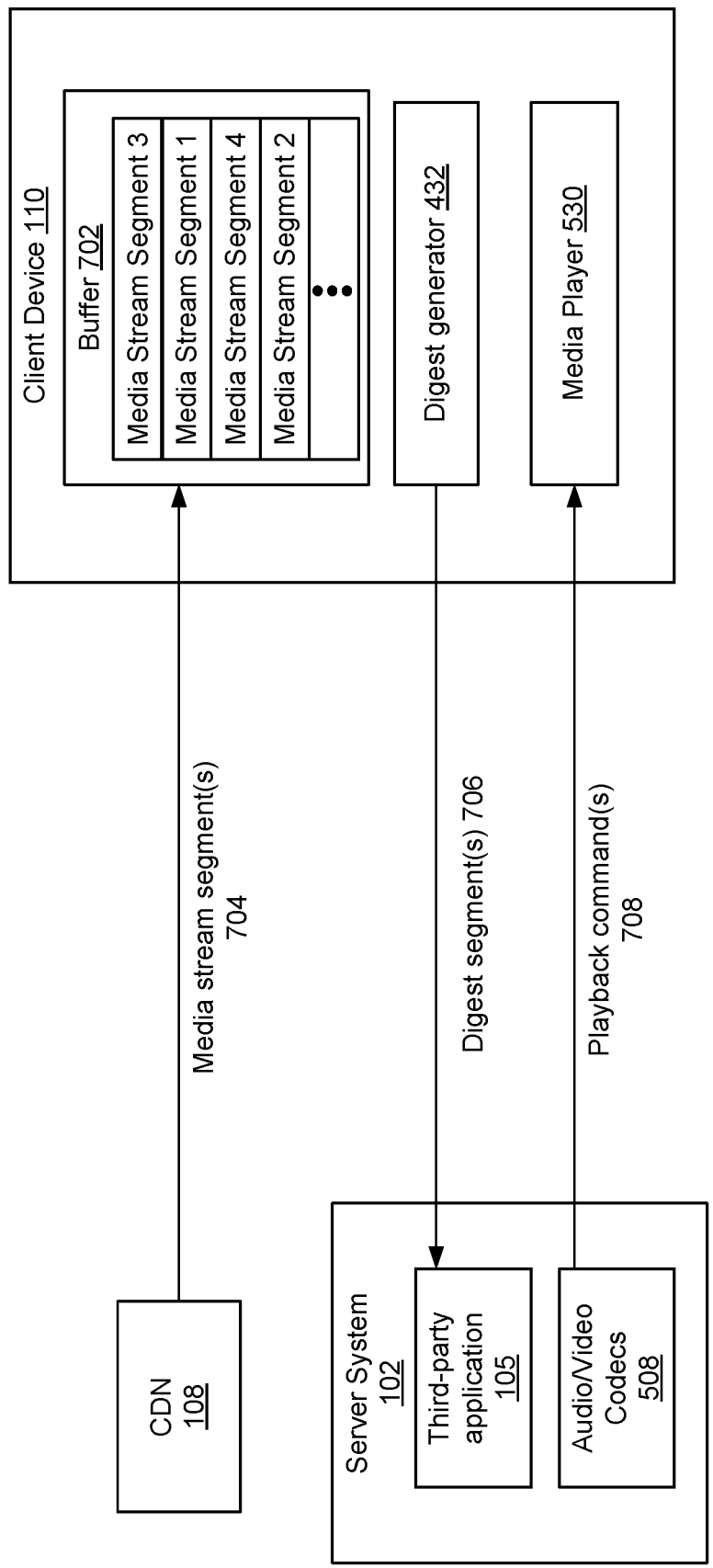
FIGS. 7A-7B are block diagrams illustrating a process for a client device maintaining playback of content without an instruction from a server, in accordance with some embodiments.

FIG. 7A illustrates a block diagram of client device 110 receiving media stream segment(s) 704 from CDN 108.

In some embodiments, a request (e.g., from client device 110) for a particular media content item is received at third-party application 105. In response to the request, the third-party application 105 instructs client device 110 to retrieve the requested media content item. In response to the instruction, client device 110 issues a request to the CDN 108 to retrieve the media content item. In some embodiments, the media content item is segmented (e.g., portioned) into a plurality of media stream segments, which, when played back in order, generate the full media content item (e.g., the media stream). In some embodiments, the client device receives a plurality of media stream segments 704 from the CDN and stores the media stream segments in a buffer 702.

A digest generator 432 of client device 110 generates a respective digest segment (as described with reference to FIG. 2) for each respective media segment 704 retrieved from CDN 108. The client device sends the digest segment(s) to the third-party application executing at the server system 102. As explained above, in response to receiving a respective digest segment, the server system reconstructs the digest segment into a reconstructed media stream segment, and the third-party application issues a playback command to playback the media stream segment (e.g., corresponding to the reconstructed media stream segment). The audio/video codecs of server system 102 send respective playback command(s) 708 for respective media stream segments to media player 530 at the client device.

In some embodiments, upon receiving the respective playback command 708 from the server system for a first media stream segment (e.g., "Media Segment 1" in buffer 702), the client retrieves the first media stream segment from the buffer 702 and displays the video data stored in the buffer (e.g., the client device initiates playback of Media Segment 1). In some embodiments, the client device expects to receive a respective playback command 708 within a threshold amount of time (e.g., periodically, such as every 2 or 3 seconds). In some embodiments, the client device 110 expects to receive a respective playback command for an upcoming segment before playback of the current segment is complete (e.g., the next playback command for the next media stream segment is received while playing back a current media stream segment).

In some circumstances, communication between the server system and the client device may be lost (e.g., temporarily). For example, a change in internet connectivity (e.g., switching WiFi networks) or other factors may result in a loss of communication between the server and the client. Without this communication, the client device 110 is unable to receive playback command(s) 708 sent by the server system 102. Accordingly, a method is provided in FIG. 7B for allowing the client device 110 to continue playback of the media content using the media stream segments that are stored in the buffer of the client device, even when the client device 110 has not received a playback command 708 instructing it to begin playback of the media stream segments.

Figure 7B:
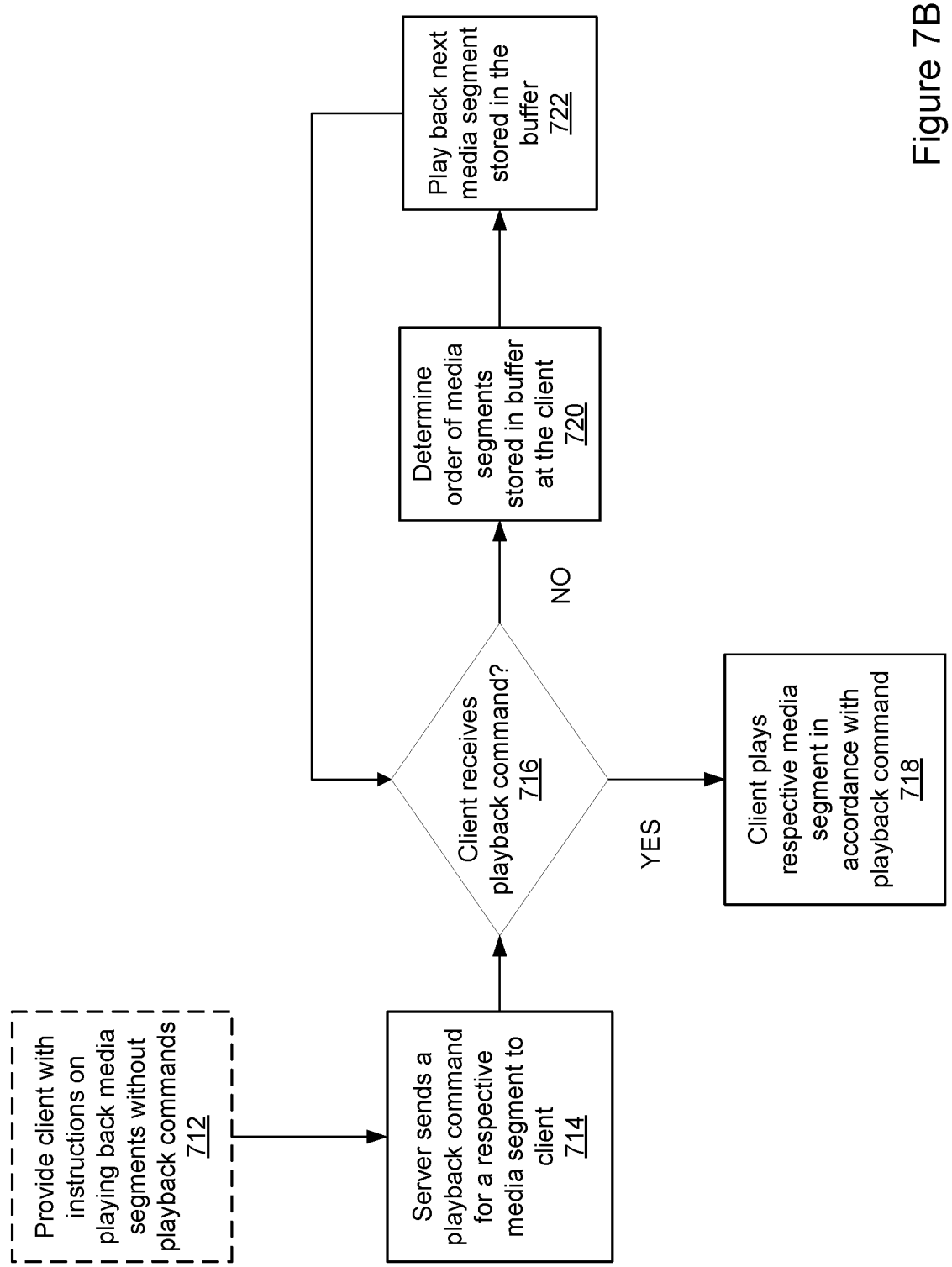

FIG. 7B illustrates a flow diagram for enabling a user to continue playback of media content after detecting a break in connection between the client and the server. As explained above with reference to FIG. 1, the server system 102 transmits a respective playback command for a respective media stream segment in accordance with the third-party application determining that the media stream segment has been retrieved (e.g., in response to the server system receiving the reconstructed digest segment at the server, while the client has retrieved the unmodified media stream segment with video data from the CDN). Accordingly, playback of media content is controlled by the server system as the client waits for a respective playback command before displaying (e.g., playing back) the respective media stream segment.

For example, in FIG. 7B, the server system 102 provides (712) client device 110 with instructions on how to continue playing back one or more media segments (e.g., that are stored in the buffer 702 of the client device). In some embodiments, the client device 110 is pre-loaded with instructions to be executed in accordance with a loss in communication between the server system 102 and the client device 110. For example, the instructions include instructions that enable the client to initiate playback of media stream segments in accordance with the loss in communication. In some embodiments, the client is typically not enabled to initiate playback media stream segments without receiving a playback command from the server system. Thus, the client is pre-loaded with instructions that enable the client to determine when there is a break in the communication between the client and the server (e.g., the client expects to receive a playback command but does not receive a playback command for a predetermined amount of time).

In some circumstances, as explained above with reference to FIG. 7A, the server system 102 sends a respective playback command (714) to the client device 110 to instruct the client device to initiate playback of the respective media segment at the client device.

The client device determines whether a playback command is received (716) from the server system. When there is no loss in communication, as described with reference to FIG. 7A, the client device receives the playback command successfully ("Yes") and the client device plays (718) the respective media segment in accordance with the playback command received from the client device.

In some circumstances, the client device 110 determines that it has not received a playback command ("No"). For example, in accordance with a determination that first criteria are satisfied (e.g., the first criteria including criteria that the client device has not received a playback command for a the server for a first predefined time period, or other criteria used by the client to determine that there is a loss in communication), the client device 110 determines that there has been a loss in communication between the client device 110 and the server system 102. Accordingly, based on the instructions provided at step 712, the client device 110 is enabled to initiate playback of media stream segments.

For example, the client device determines (720) an order of the media segments that are stored (e.g., available for display) in the buffer 702 at the client device 110. In some embodiments, the client device sorts the segments in an order according to their playback position. The client device 110 initiates playback (722) of a next media segment that is stored in the buffer. This process continues until a next media segment is not stored in the buffer (e.g., the buffer is empty) and/or until communication is re-established with the server system 102 such that the client receives playback commands from the server system.

In some embodiments, after re-establishing communication with the server system 102, the client device 110 is enabled to determine whether the playback commands are commands to play a media segment that the client device has already played (e.g., while the client was not receiving playback commands from the server system) and ignores the playback commands to avoid repeating playback of a media segment.

Figure 8:
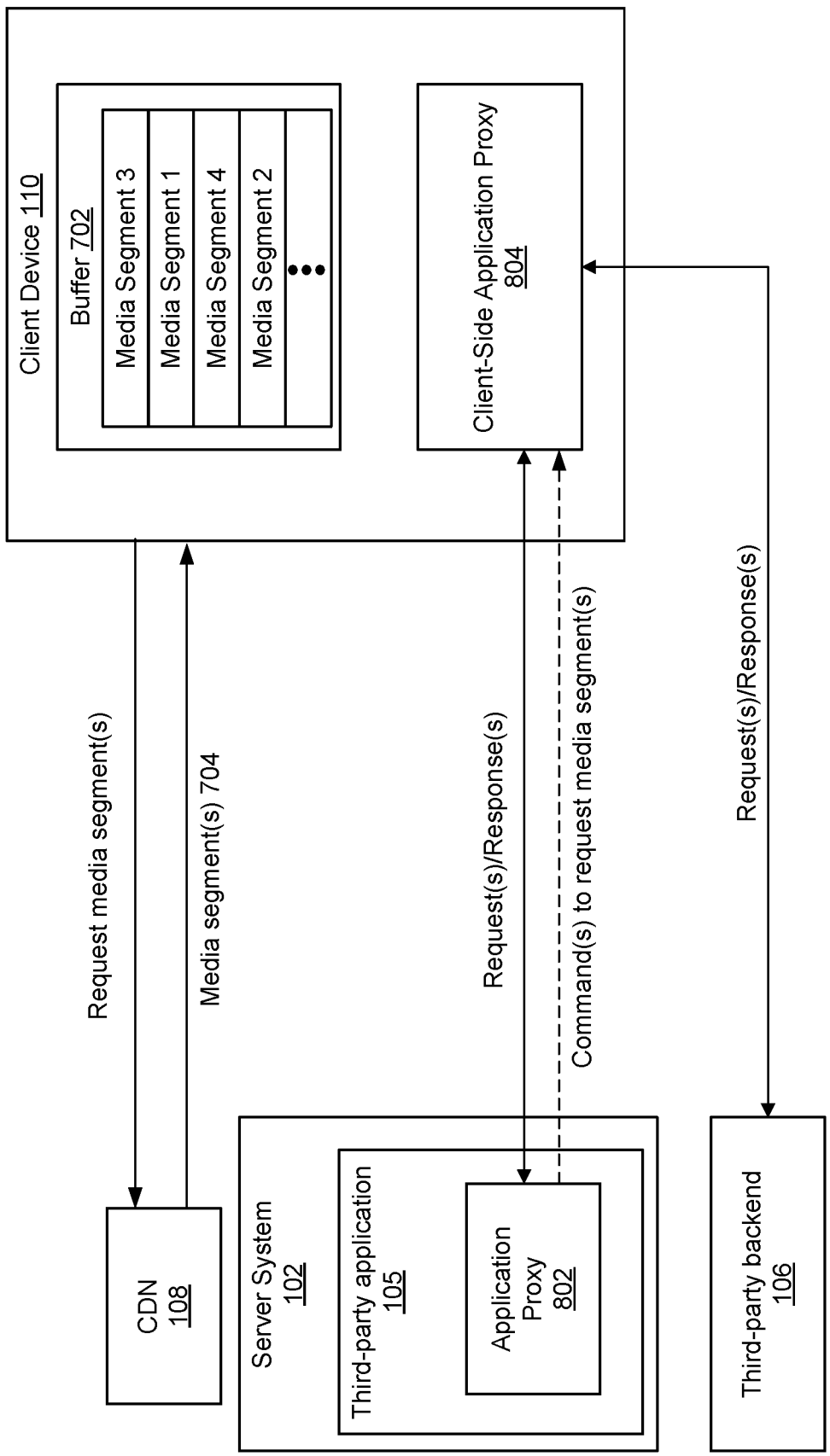
FIG. 8 is a block diagram of an application proxy receiving commands from a third-party backend, in accordance with some embodiments.

FIG. 8 illustrates a block diagram of an application proxy 802 (e.g., also referred to herein as SGMP 320) receiving a plurality of responses from third-party backend 106 at the server system 102 (e.g., via the client device 110). In some embodiments, third-party application 105 issues requests (e.g., using application proxy 802 of third-party application 105) to third-party backend 106 (e.g., requests to initiate and/or end a user session, requests to play media content, etc.). In some embodiments, in response to the requests(s), third-party backend 106 (e.g., as described with reference to FIG. 1) issues a plurality of responses to application proxy 802. In some embodiments, requests and responses sent between application proxy 802 and third-party backend 106 are routed through client 110 (e.g., via client-side application proxy 804). For example, because third-party backend 106 is unaware that third-party application 105 is executing at server system 102 (e.g., and not at client device 110), the requests from third-party application 105 are sent to third-party backend 106 via client device 110 such that third-party backend 106 receives the request from the client device 110 (e.g., and continues to operate as if third-party application 105 were operating at the client device 110 instead of server system 102).

In some embodiments, the application proxy 802 is implemented as an intercepting proxy. For example, the application proxy 802 is enabled to intercept requests (e.g., HTTP requests) that are transmitted over an end-to-end secure channel (e.g., Transport Layer Security (TLS)). For example, an intercepting port is used between the application proxy 802 (e.g., and/or the third-party backend) and the third-party application 105 (e.g., and/or CDN 108). In some embodiments, the application proxy 802 intercepts requests (e.g., traffic) that are transmitted on the secure channel through a network port redirect. For example, requests to port 80 (HTTP) and port 443 (HTTPS) are redirected to the application proxy 802. In some embodiments, the application proxy 802, in order to establish trust with the third-party application, needs to issue a certificate that is valid for the host (e.g., or domain) that being intercepted. In some embodiments, the certificate must be signed by a Certificate Authority (CA) that is trusted by the third-party application 105. As such, since the third-party application 105 determines what media content to download (e.g., and/or when to download the media content), the intercepting proxy (e.g., application proxy 802) intercepts download requests from the application and forwards the download requests back to client device 110 (e.g., so that the client device 110 can go download the assets directly).

For example, in response to a user (e.g., at client device 110) requesting a media content item, the third-party application 105 issues a request (e.g., via application proxy 802) to the third-party backend 106 and/or a request to the third-party CDN 108. In some embodiments, the request to the third-party backend 106 and/or the request to the third-party CDN 108 is routed through client-side application proxy 804 at client device 110. In response to receiving the request, the third-party backend 106 determines, for example, a location (e.g., URL) of where the requested asset is stored and issues a response that includes the location information of where to retrieve the asset to application proxy 802 (e.g., in some embodiments, application proxy 802 intercepts the response from the third-party backend 106 that is directed to the client device 110 and/or third-party application 105). In some embodiments, the application proxy 802, upon receiving the response, determines whether the third-party application 105 (e.g., which is executed on server system 102) and/or the client device 110 needs to receive the response. For example, responses for retrieving assets from a CDN 108 (e.g., "Command(s) to request media segment(s)" in FIG. 8) are forwarded (e.g., sent back) to the client device 110 such that the client device 110 can retrieve the media asset(s) (e.g., media stream segments 704) from CDN 108.

In some embodiments, application proxy 802 determines whether to forward client device 110 a respective command (e.g., command(s) to request media segment(s)) by determining whether the command references a file type that corresponds to a media asset. In some embodiments, determining whether the command references a file type comprises inspecting URLs included in the command. For example, the application proxy 802 determines whether the command from third-party backend 106 includes a reference to a file having a file extension of an image file and/or a video file (e.g., .jpeg, .png, .mp4, etc.).

In some embodiments, other types of commands (e.g., that are not commands for retrieving a media asset from CDN 108) are forwarded (e.g., via client-side application proxy 804 and/or via application poxy 802 at server system 102) to the third-party application 105 without sending the commands back to the client device 110. For example, a request for viewing a catalogue of media assets is only forwarded to the third-party application 105. Accordingly, client device 110 receives only commands that application proxy 802 determines the client device 110 needs in order to download a media asset. Because playback is controlled by third-party application 105 at the server system 102, the client device 110 does not need to receive other types of commands to the application (e.g., commands to initiate or end a user session).

In some embodiments, when respective commands that include instructions to obtain media assets are forwarded to client device 110, the respective commands are also forwarded to third-party application 105 (e.g., third-party application 105 receives all commands issued by third-party backend 106) via application proxy 802.

Figure 9A:
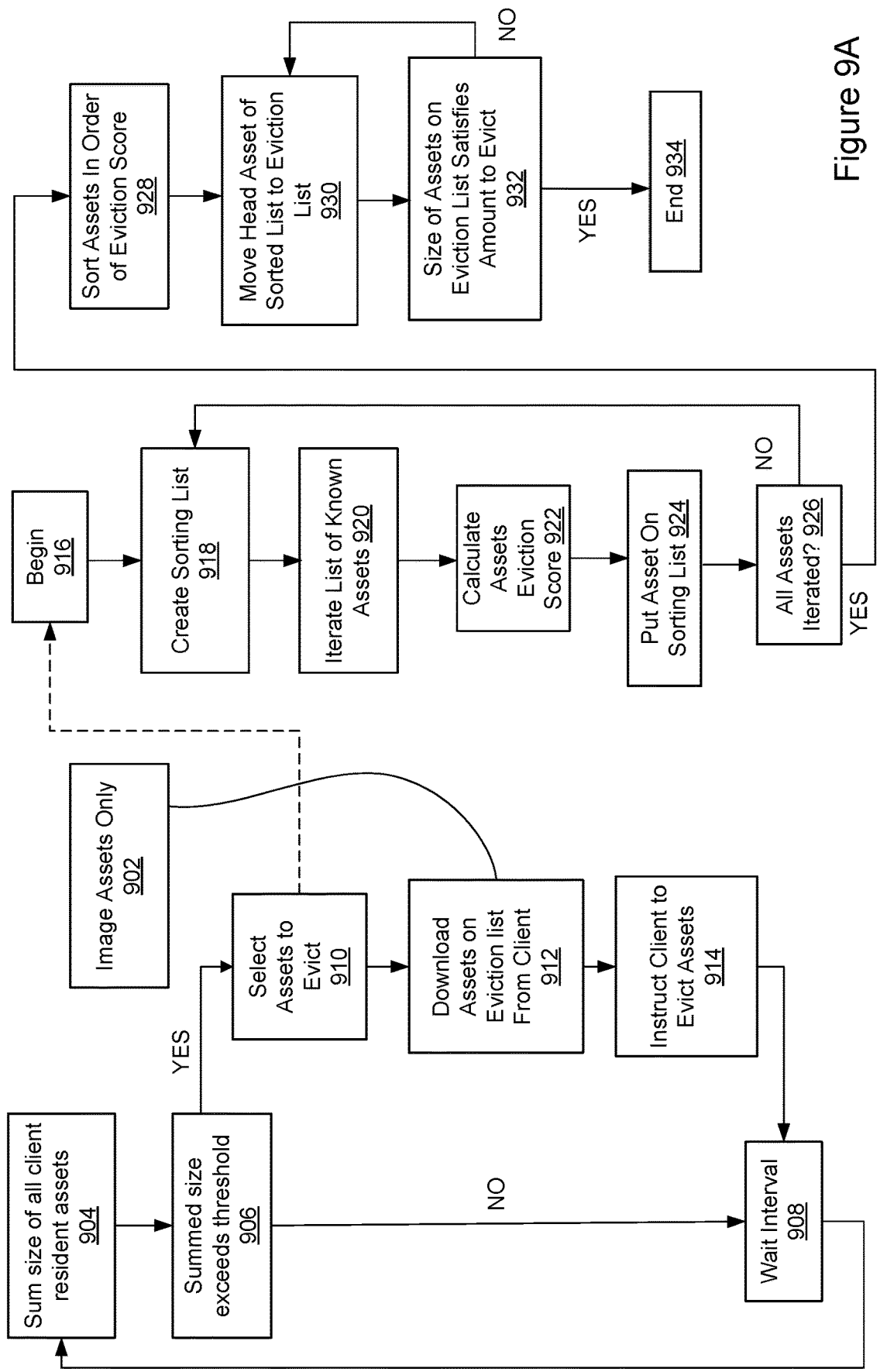
FIGS. 9A-9F are flow diagrams of processes for evicting and/or restoring media assets to a client device, in accordance with some embodiments.

FIGS. 9A-9E illustrate flow charts for a plurality of processes for determining media assets to evict from memory. It will be understood that a combination of two or more of the processes may be executed concurrently. For example, FIG. 9A illustrates a process performed at the server system 102 for determining when to evict an asset. In some embodiments, the server system 102 controls which assets the client device 110 needs to evict in order to make space for additional media assets to be stored by the client device. For example, when an application for providing media content (e.g., third-party application 105) is executed at a client device (e.g., instead of executing at the server system 102, as described herein), the application determines when particular media assets are no longer needed by the client, knows where the media assets are stored, and can generate commands for evicting media assets from the client device 110's memory. The unmodified application 105 is unaware it runs in a virtualized environment (e.g., at server system 102) where it manages reconstructed media assets instead of the actual segments on the client device (e.g., such that the application at the server system 102 does not evict the media stream segments that are stored at the client device 110). Further, the commands issued by third-party application 105 for evicting (reconstructed) media assets from memory are not exposed externally or only in a way that is impractical to implement.

Accordingly, there is a need for the server system 102 to identify (e.g., using heuristics) which media assets are not needed at the client device 110, and send the client device commands to evict the identified media assets. Because the third-party applications 105 typically use internal determinations (e.g., without an explicit API) for which assets to free (e.g., release from memory) and frees them from the client device when the application is executing on the client device, the server system is not aware of which assets the third-party application would instruct to be evicted (e.g., deleted). In some embodiments, the server system 102 tracks system calls and/or looks through the memory to determine which assets have been evicted (e.g., freed) by the application. However, tracking system calls and sorting through memory can be time consuming and expensive.

FIG. 9A begins by determining (904) a current total size (e.g., sum) of assets (e.g., including audio assets, video assets and/or image assets) that are stored at the client device 110. In some embodiments, audio and video data are combined into a same asset (e.g., a combined asset).

The server system determines if the summed size exceeds a threshold (906). For example, the threshold is determined according to an amount of memory of the client device that may be used to store media assets. In some embodiments, the threshold is a percentage of the total memory that the client device has allotted for media assets. If this threshold is not exceeded (no), the server system waits for an interval amount of time (908) before beginning the process again. For example, if the client device still has above the threshold amount of memory available to store media assets, the server system will not instruct the client to evict any assets.

If the threshold amount of memory used to store media assets at the client device exceeds the threshold (yes), the server system begins process 916 to select (910) assets to evict. For example, process 916 requires that the server system creates (918) a sorting list, which will be populated (e.g., at step 924) with the media assets (e.g., audio, video and/or image assets) that are stored at the client device (e.g., that the server system 102 is aware that the client device is storing). In some embodiments, server system 102 knows which assets the client has stored because the server system has issued the commands to the client to retrieve the assets from the CDN, and the server system tracks which assets the server system has previously instructed the client device to remove from the memory of client device 110.

The server system iterates (920) through the sorting list of media assets known to be stored at client device 110. For each media asset, the server system calculates (922) (e.g., determines) an asset eviction score. In some embodiments, the asset eviction score is determined using plurality of factors. For example, the server system makes a heuristic determination based on, for example, a least-recently used (LRU) criteria. In some embodiments, the heuristic determination includes determining: whether an asset is currently playing and/or a play position of an asset, an age of the asset, if the asset lies ahead in playback position (e.g., to be played in the future). In some embodiments, media assets with a larger score are determined to be better candidates for eviction. In some embodiments, media assets with a smaller score are determined to be better candidates for eviction (e.g., depending on the heuristics used to calculate the scores).

The media assets are put (924) onto the sorting list (e.g., including the respective eviction score for the media asset). The server system sorts (928) the media assets in order of eviction score (e.g., as explained above, the highest or lowest scores may correspond to assets that should be evicted). The server system iterates the sorting list and moves assets that are at the head of the eviction list (e.g., the top) to an eviction list (930) of media assets to instruct the client to evict. The server system continues adding media assets from the sorting list to the eviction list until the size of the assets on the eviction list has satisfied a threshold amount (932) (e.g., enough media assets have been evicted to create a predefined amount of space in the memory of the client device), at which point the process ends (934).

In some embodiments, when the media assets comprise image assets, the server system 102, after determining that one or more image assets are to be evicted from the client device 110, downloads (912) the image assets that were placed on the eviction list from the client device 110 and stores the image assets at the server system. For example, this process is explained in more detail in FIG. 9B.

Then, the server system instructs (914) the client device to evict the assets (e.g., both video assets and image assets) that are on the eviction list.

Figure 9B:
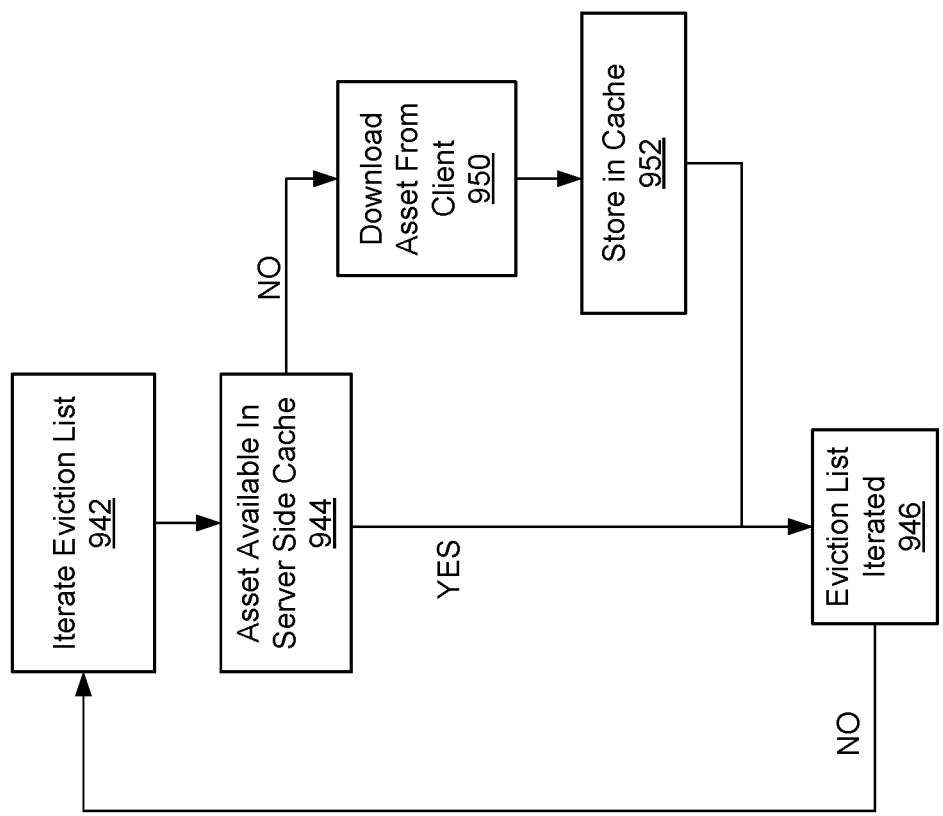

FIG. 9B provides a process for determining whether to download an image asset to the server system (e.g., as described in step 912 of FIG. 9A). For example, in some embodiments, the server system iterates (942) the eviction list (as described above with reference to FIG. 9A) and determines (944) whether the image asset is already available (e.g., stored) in a cache of the server system. If the image asset already exists in the cache of the server system (yes), then the server system continues to iterate 946 through the eviction list to make the determination 944 for each image asset on the eviction list (e.g., before evicting the assets in step 914 of FIG. 9A). In some embodiments, if the image asset is not available in the cache of the server system (no), the server system downloads the image asset from the client device (950) and stores the image asset (952) in the cache of the server system. Accordingly, the server system only downloads image assets (e.g., that are on the eviction list) in accordance with the determination that the server system does not already have the image asset stored (e.g., in the cache) to avoid wasting bandwidth required to download the image asset. For example, preventing downloading (e.g., re-downloading) saves bandwidth, especially when the cache is shared between servers or sessions.

In some embodiments, image assets are downloaded from the client device to the cache of the sever system because if the client device needs a respective image asset in the future it is faster and/or more deterministic to download the image asset from the server system 102 (e.g., a cache of server system 102) than to obtain the image asset from a CDN (e.g., redownloading from the CDN may fail due to network conditions). In some embodiments, as explained above, the server system 102 does not receive the video assets (e.g., the server system 102 receives a digest segment from the client device but not the original video asset), such that video assets are not stored at the server system. In some embodiments, a directory indicating where to retrieve video assets (that have been evicted from the memory of client device 110) such that, if the client device needs a video asset, the server system can instruct the client to retrieve the video asset from a particular location (e.g., within CDN 108) without requiring the third-party application to issue a request to third-party backend (e.g., where third-party backend typically provides an instruction with the location of storage of a media asset, as described above with reference to FIG. 8). For example, the server system stores a URL (e.g., an identification of where on CDN 108 a respective video asset is stored) for a video asset that is to be evicted from client device 110.

Figure 9D:
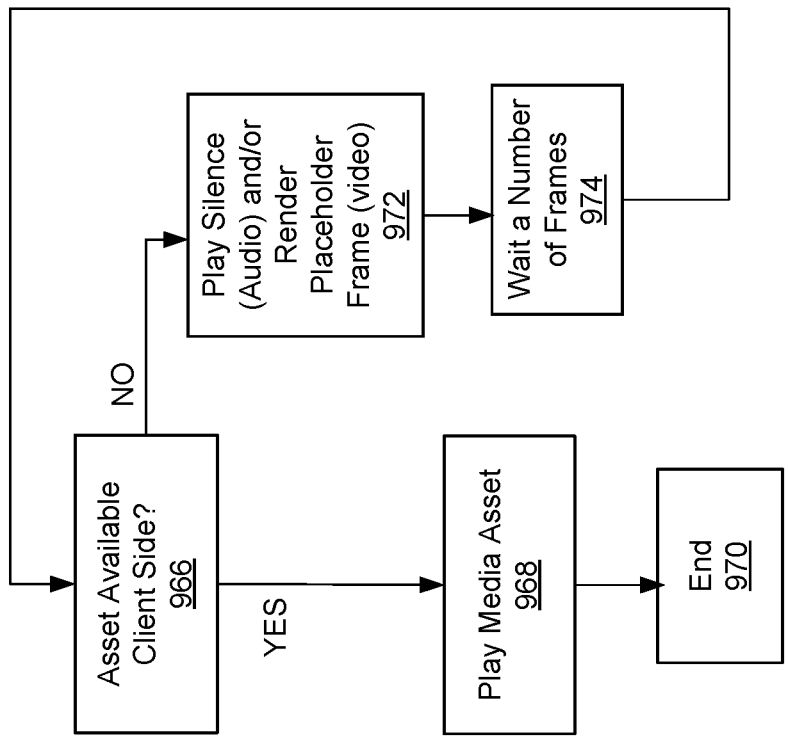
Figure 9C:
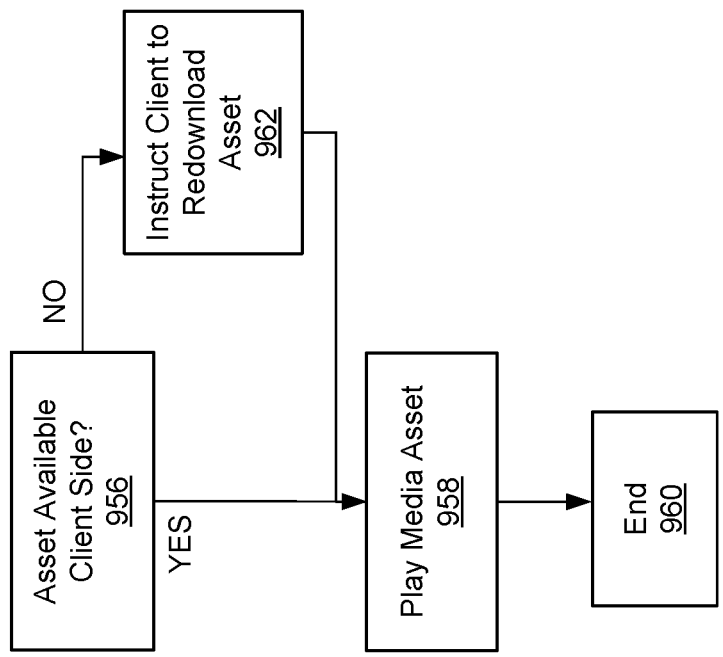

FIGS. 9C-9D illustrate processes for playing back media assets based on whether the media asset is available on the client device (e.g., or if the media asset has been evicted from the client device, as described with reference to FIG. 9A). For example, FIG. 9C illustrates a process performed by server system 102 in response to determining that a media asset is needed for display at the client device 110. For example, the server system 102 determines that the user has requested display (e.g., playback) of a respective media asset. The server system 102 determines (956) whether the media asset is available at the client device 110. If yes, the server system sends a playback command to the client device to play (958) the media asset. However, if the client device does not have the media asset available (no), for example, if the media asset has been evicted from the memory of client device 110, the server system instructs (962) the client device to redownload the media asset (962), for example, from CDN 108, before the process ends (960). In some embodiments, as explained above, the instruction from the server system includes information about where the media asset is stored (e.g., so that the client can retrieve the asset directly).

FIG. 9D illustrates a process performed by client device 110 for playing back a media asset that may or may not be available (966) at the client device. If the media asset is available (yes), the client device plays 968 the media asset (e.g., in accordance with the playback command received from the server system) before ending the process (970).

Figure 9E:
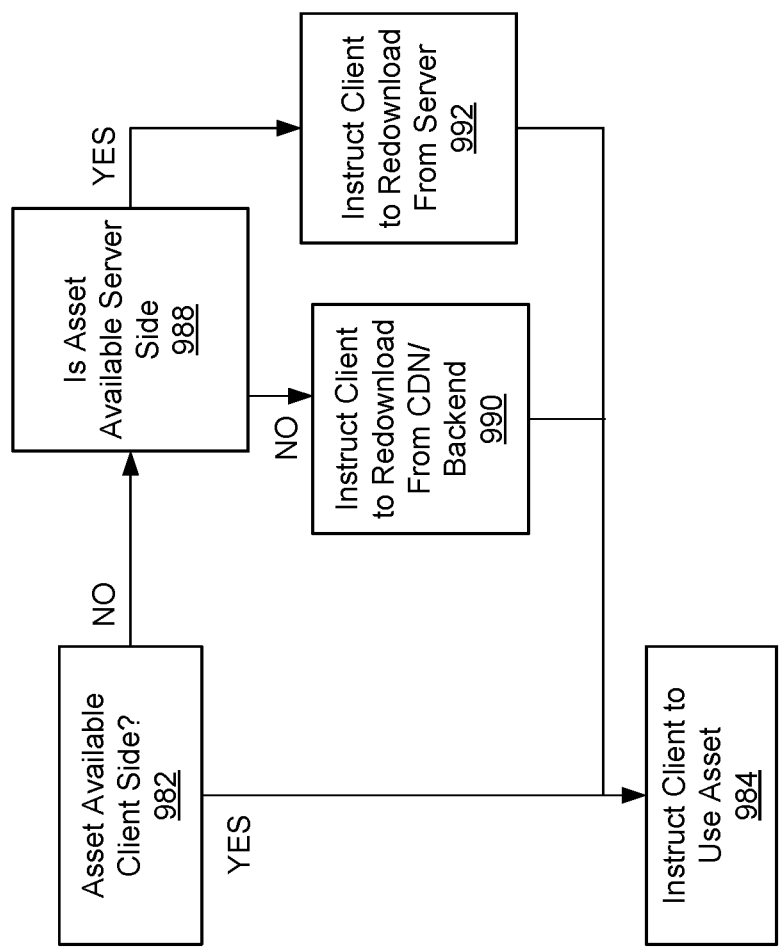

FIG. 9E illustrates a process performed by server system 102 for instructing client device 110 to use an asset that may or may not be available (982) on the client side or that may or may not be available (988) on the server side (e.g., after the asset has been evicted from the memory of the client device 110). If the media asset is available at client device 110 (*yes*), the server system 102 instructions the client device 110 to use (e.g., playback) the media asset. If the media asset is not available at the client device 110 (*no*), the server system determines (988) whether the media asset is available at the server (e.g., stored in the cache of the sever). If the asset is available at the server (yes), the server system instructions (992) the client device to redownload the asset from the server system. If the asset is not available at the server (no), the server system instructs the client to redownload the asset from the third-party CDN 108. Once the client device has redownloaded the asset, the server system 102 instructs (984) the client to use the redownloaded asset (e.g., for playback).

If the media asset is not available (e.g., has been evicted from the memory of client device 110) the client device plays (972) silence (e.g., in the case of a requested audio asset) and/or renders a placeholder frame (e.g., in the case of a requested video asset). In some embodiments, while playing silence and/or rending placeholder frame(s), the client device retrieves the requested media asset (e.g., from CDN 108). The client device waits a number of frames (974), or a predetermined amount of time, before determining whether the requested media asset is now available (966) at the client device. The client device 110 continues this process until enough of the media asset has been retrieved (e.g., in a progressive download) and is available at the client device for playback.

Figure 9F:
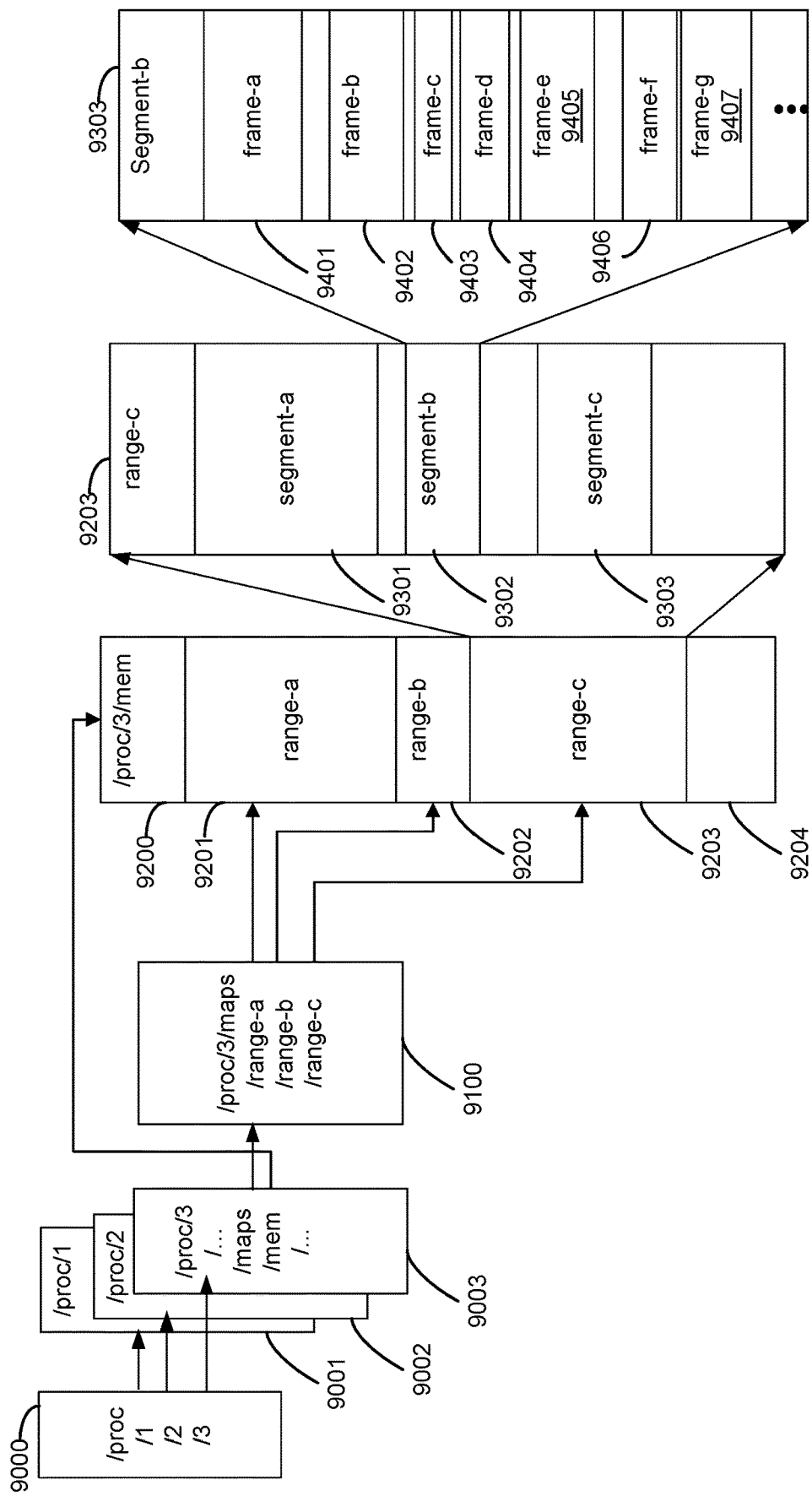

FIG. 9F illustrates a process for how the system sorts through the memory by using a Linux function that is called the process table. The process table 9000 stores per process information, such as which resources it uses. Amongst this information is a pseudo-file called "maps" 9100 that stores which physical memory locations are used by the process. Another pseudo-file is the "mem" 9200 file, which is a representation of the process's memory. These files are "pseudo-files" in the sense that the operating system only creates the content the moment they are being read by the process itself or another process. As such, they are a snapshot of the moment a process reads them. The "mem" 9200 is even more special in the sense that it is a sparse file representing the whole address space of the process. A process, however, rarely uses the complete address space. Therefore, the "maps" 9100 file describes which ranges are used for what purpose. Those ranges can be addressed and read by seeking to the offset in the "mem" file. Reading outside the process's available ranges yields an error.

In FIG. 9F, 9000 represents the process table stored under the "/proc" directory in the file-system. Linux uses an integer process identifier for each process. Suppose we have three processes: process 1, process 2 and process 3, each of them represented as a directory entry in the "/proc" directory, hence subdirectories 1, 2, 3. Each of these directories contains a number of files and directories, of which the "maps" and "mem" files are of relevant to this idea. The figure depicts hypothetical "/proc/3/maps" (9100) and "/proc/3/mem" (9200) files for process 3 (9003). In the figure the hypothetical maps file (9100) has 3 ranges; range-a (9201), range-b (9202), range-c (9203). Each of these ranges refers to ranges in the process's address space. In some embodiments, range 9204 is a range of the process's address space that is not mapped, in other words, it is unused. The contents of these ranges can be read through the/proc/3/mem file (9200), by seeking to the start address of the range and reading up to the end-address of the range.

In some embodiments, this range information is used to traverse the third-party application 105's address map and scan for fingerprints. In some embodiments, one or more fingerprints are stored at the server system 102 for each media segment (e.g., corresponding to a digest segment). For example, the server system 102 tracks media segments (and frames within the media segments) using the fingerprints.

For example, process 3 is a third-party application and its process identifier is 3. Then the third party application's process memory map 9100 can be read as/proc/3/maps and it provides a list of all memory ranges within the third party application's address space. Not all memory ranges are relevant, for example, range-a 9201 may be a range that contains the third party application's program code (e.g., which is stored separately from the third party application's other resources). In some embodiments, range-b 9202 may be the third party application's initialized data range or uninitialized data range. In some embodiments, the range type is also stored in the maps file 9100). Suppose range-c 9203 is the third party application's heap range, wherein within that range the third-party application may store audio/video media segment-a (9301), segment-b (9302) and segment-c (9303) and within such an audio/video media segment, such as segment-b (9302), there are frames a-g (9401-9407). In some embodiments, the data in these frames is fingerprinted.

In some embodiments, each fingerprint includes a 4 byte magic code word (e.g., 0xfa, 0xca, 0xde (façade) and a one byte xor pattern identifier). For example, the façade part allows for checking the fingerprint is indeed where we expect it to be. In some embodiments, the xor pattern byte is applied over the payload of the fingerprint by exclusive or'ing all bytes of fingerprint payload data. The pattern byte is chosen in such a way that it prevents the generation of escape sequences, such as 0x00 0x00 0x01 for AVC. For example, in some embodiments, the system avoids escape sequences as necessary for third-party applications that perform checking the elementary stream. In some embodiments, the fingerprint further includes a variable number of fingerprint payload data, for example, a frame decoding or presentation timestamp that uniquely identifies the frame within the asset, a media player instance that allows tracking of which media player requests to decode the frame, and/or a unique asset identifier.

In some embodiments, the process of determining whether a particular segment is still in memory (and hence should not be evicted from the client's memory) boils down to finding the third party application's heap range(s) (or in some embodiments also its uninitialized data range(s) in case the application has global arrays to store media data in) and scan these range(s) for the magic code word (e.g., 0xfa 0xca 0xde), and checking whether the data following that code word is valid. To make that validation process more robust we add a cyclic redundancy check (CRC) over the fingerprint and its payload data. If the magic code word is found and the CRC over the data is valid, then there is a chance that the application still keeps the frame in memory. When memory is freed it is (for efficiency reasons) not cleared, for example by filling it with zeros. Therefore, finding a valid fingerprint may be a false positive. In some embodiments, to determine whether an audio/video media segment is still resident with the third party application's heap, criteria must be satisfied, for example, criteria that at least a predefined number of subsequent frames (or a percentage of the segment's frames) are still valid. For example, in accordance with the criteria being satisfied, the server system 102 determines that the segment is still in use and should not be evicted. In some embodiments, the heap scan is performed as a background process. In some embodiments, the application's heap can be scanned periodically (e.g., every predefined number of seconds). In some embodiments, scanning the heap range works for assets and/or segments that have a binary fingerprint that can easily be detected by scanning the memory for a magic code word. For example, audio/video data is typically stored as-is, unprocessed or at most only converted to elementary stream (which keeps the fingerprint intact).

FIGS. 10A-10D-3 illustrate block diagrams for a system for managing containers booted at the server system. For example, in some embodiments, the one or more VCVMs at the server system comprise one or more Linux containers. Android is an Operating System built on top of the Linux kernel and nearly ubiquitous in mobile phones and many other consumer appliances from smart thermostats to lawn sprinkler control systems to smart TVs and Internet-connected set-top boxes. The systems and methods of the invention being disclosed execute the Android OS in a Linux container, which may be seen as a light-weight virtual machine where multiple containers share the same Linux kernel and the same Linux host system. Each Android Container (AC) executes one Android instance, which serves one user session at a time. Launching the containers, and directing session requests to them, is taken care of by Kubernetes which can be thought of as a manager of virtual machines. Many, up to hundreds, of Android containers may be running on the same physical or virtual machine, called the "host" or "worker node" in Kubernetes terminology.

In some embodiments, a plurality of containers are pre-booted (e.g., at least partially) by the server system before receiving a request from a user to initiate a user session. Thus, in response to a user request to initiate a user session, a pre-booted container is assigned to the user session and completes the booting of the container using user data associated with the user session. In some embodiments, by at least partially pre-booting the container before the user initiates a user session, a load time for initiating the container is reduced (e.g., as compared with initiating the booting of the container after the user initiates the session).

The systems illustrated in FIGS. 10A-10D-3 provide a method of operating a software-as-a-service (SAAS) system with a considerably reduced in size database for storing the many resources that are allocated on demand to each user of the system. The system also reduces the complexity of storing the software applications (apps) that are moved into the container which is allocated to a user session by utilizing a pre-installed software image of the app that can be copied into the user's virtual environment and then combined with needed resources to operate which includes the user's configuration and perhaps persistent data required by the app. Furthermore, the system provides more control by the system operator over which applications a user is able to launch, compared to an environment where a user can install and run arbitrary applications. Having control prevents cloud resources of the host system from being consumed for an application that does not contribute to the operator's revenue. The result of the systems and methods of this disclosure is a much more efficient system that is also considerably less costly to run due to the reduced database size and hence lower demand on centralized resources.

Figure 10A:
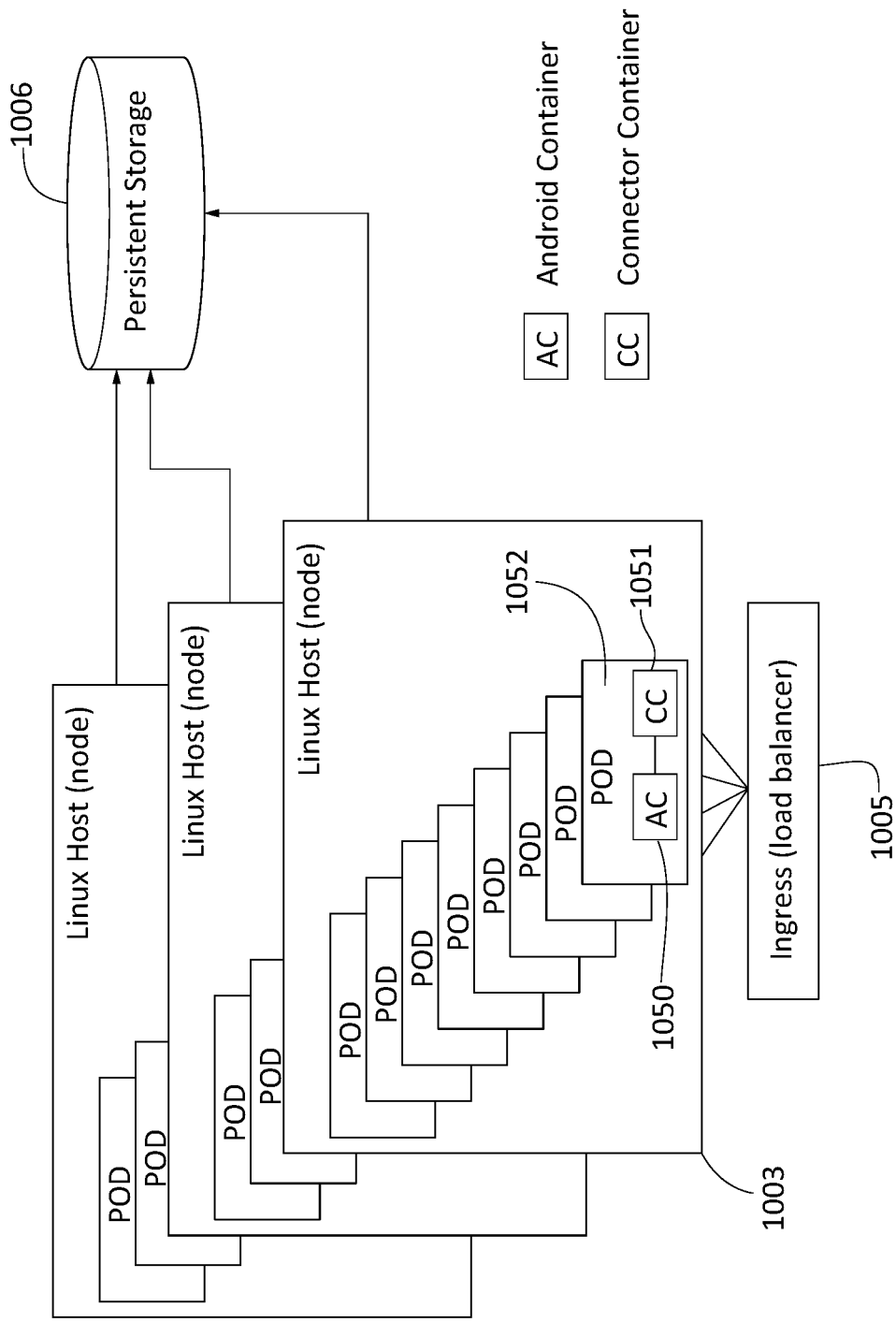
FIGS. 10A-10G are block diagrams illustrating a layered architecture for containers, in accordance with some embodiments.

FIG. 10A provides an architecture for a virtualized video app platform that delivers content from the world's most popular television and social media apps to almost any display device, regardless of the hardware capabilities or the operating system of the end-user device. Video applications are "installed" on a virtual set-top box in the cloud. These applications then reside on a cloud-based persistent storage, enabling personalization of the application such as building a history of recently viewed assets for example. The application uses the filesystem to store anything it needs to store as part of its operation, just as it would were it running on a physical set-top box. The video application may also store information in its own back-end cloud storage, so that a user is able to see their viewing history across all devices that are signed into their account. It is then up to the video application's discretion regarding what to store, and where. The platform taught in this disclosure simply stores the information as "blobs" (binary objects), without knowing what is inside, essentially in the same way that a computer hard drive does not "care" what data it is storing.

In one embodiment, for each session, the Android Container 1002 is accompanied by a "Connector Container" (CC) 1003 which manages communicating with the physical set-top box 1030. The Connector Container 1003 communicates with the Android Container 1002 through Unix Domain Sockets. The Android Container 1002 and the Connector Container 1003 run in a "pod" 1004, which is a Kubernetes concept that allows multiple inter-connected containers to run on the same host. A load balancer, or "Ingress" 1005 in the Kubernetes architecture, is responsible for sending a session request to one of the available pods 1004. FIG. 10A illustrates this architecture showing the primary structure of the system where the Linux host 1001 supports a plurality of Kubernetes "Pods" 1004 operating in the shared environment of the host 1001. Each host 1001 accesses user data from a common database 1006.

Android applications store their information persistently on a standard Linux filesystem (i.e., just files and folders). On a mobile phone, for example, this information would be stored in the device's (flash) memory. When running in a container, the files would be written to the host's hard drive. That is not desired, because it would require the next session of that user to be run on the same host—and that host may be busy or off-line. Therefore, the several embodiments taught in this disclosure stores the user data centrally using a cloud storage service. When a user's session is setup, the host serving the session will treat the cloud storage service as a network-attached storage (NAS). Files are read and written to the NAS on demand.

In one embodiment, inside the container, the Android OS perceives a single virtual large filesystem, which is what Android expects. However, outside the container, on the host system, the filesystem is composed of different filesystem layers or parts. The following is a simplified list of layers:
1. A read-only layer containing the base Android OS installation
2. A read-only layer for the vendor-specific Android porting layer
3. One or more layers for container specific changes to the first two layers
4. An APK installation layer for each APK
5. In some embodiments, an APK user data layer is used for each APK
6. In some embodiments, a single user data mount will contain user data for all APK's that a user wants to have access to and will mount in a single step. This reduces the number of mounts.

The OS installation and APK installation layers are shared between all containers running on the same node. This allows the Linux Operating System to share resources, and thus reduce the per-container memory footprint and filesystem usage. Any file that is attempted to be modified by Android will be written in the container-specific layer (Layer 3), and the filesystem layer driver will merge the layers to ensure that Android OS sees the proper file contents.

Figure 10B:
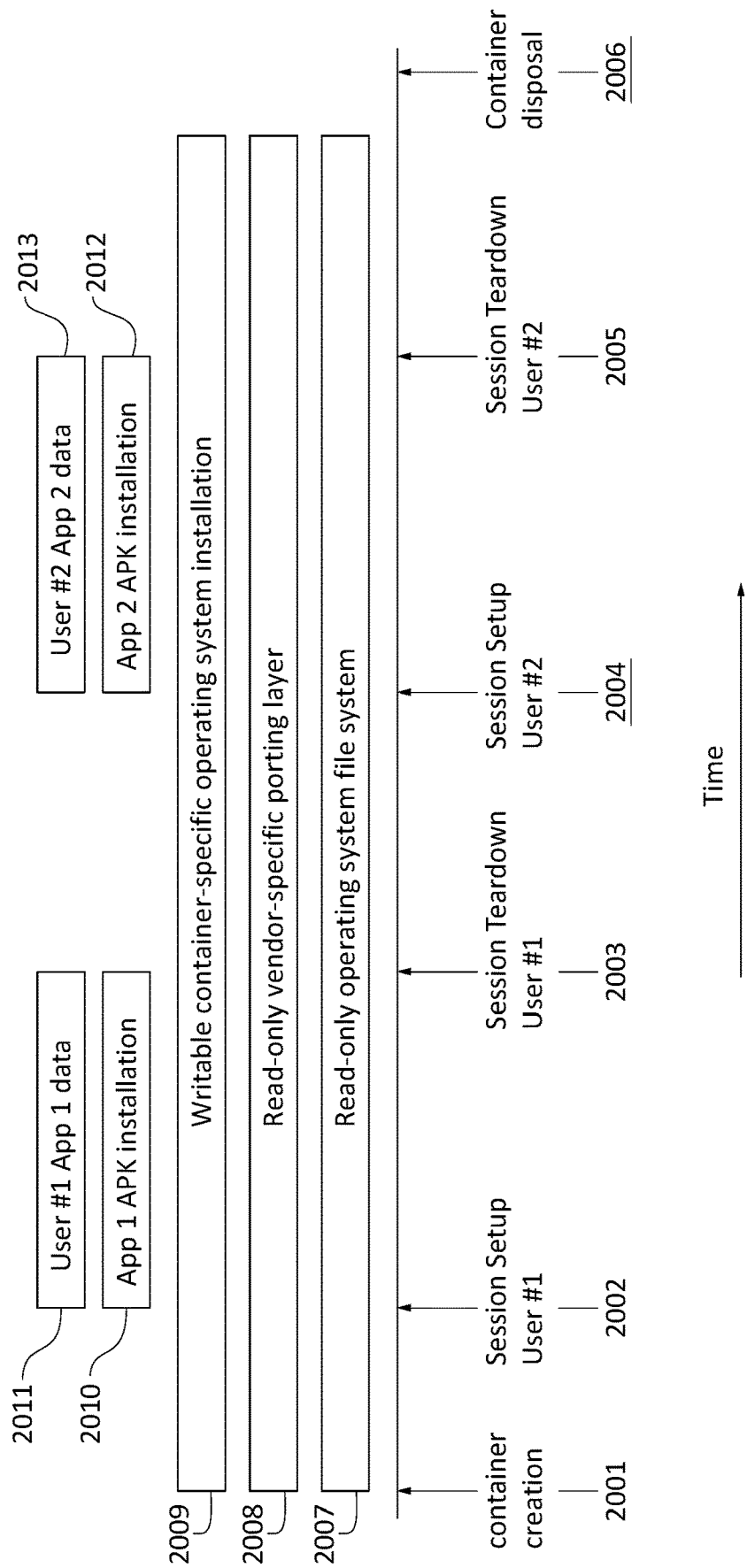

In some embodiments, the first three filesystem layers (2007, 2008 and 2009, FIG. 10B), containing the base OS install, are provided to the container at boot time (e.g., container creation 2001). Only after the OS is fully booted is it able to receive session requests; and only when a session request is received (e.g., session setup for user #1 at 2002), does it know which user data to attach. So, the APK- and user specific layers are attached at "session setup" time. For example, the session for user #1 requires APK installation 2010 for a first application (e.g., Amazon) and user #1's data 2011 for the first application. FIG. 10B illustrates how the filesystem layers change over time, during the lifecycle of a container.

In some embodiments, the user data directory is a filesystem on the Linux host, and it is of particular interest since there are many options regarding providing this filesystem. The simplest way is to use the host filesystem to store the user data files. However, this binds a user to a particular node, which would complicate load balancing. Therefore, the platform of this disclosure stores the user data files on a central cloud storage service. This allows the disclosed system to run the user session at any node that has sufficient resources to run the session. The cloud storage is "mounted" on the node's filesystem. Changes that are made to files are propagated to the cloud storage system immediately, so that the user data is saved even if the container (or even the host system) were to stop working unexpectedly.

This way, containers may be visualized as disposable vehicles used to execute an application, which helps in automatic scaling of resources to track increasing and decreasing load. After use, the container has nothing of value anymore and it is discarded.

In some embodiments, to control the mounting of cloud storage onto a node's filesystem, the Container Storage Interface (CSI) is used. This is an initiative to unify the storage interface of container orchestration systems such as Kubernetes or Docker Swarm. It enables the container orchestration system to use various Cloud Storage providers, such as AWS Elastic Block Storage, Ceph, Google Compute Engine's Persistent Disks, or NetApp to be used through a single interface. This also makes it easier to change to a different cloud storage provider. The CSI components interact with the Kubernetes 'kubelet' component, which is part of the Kubernetes control plane and which helps orchestrate Kubernetes functionality on the Linux host.

Figure 10C:
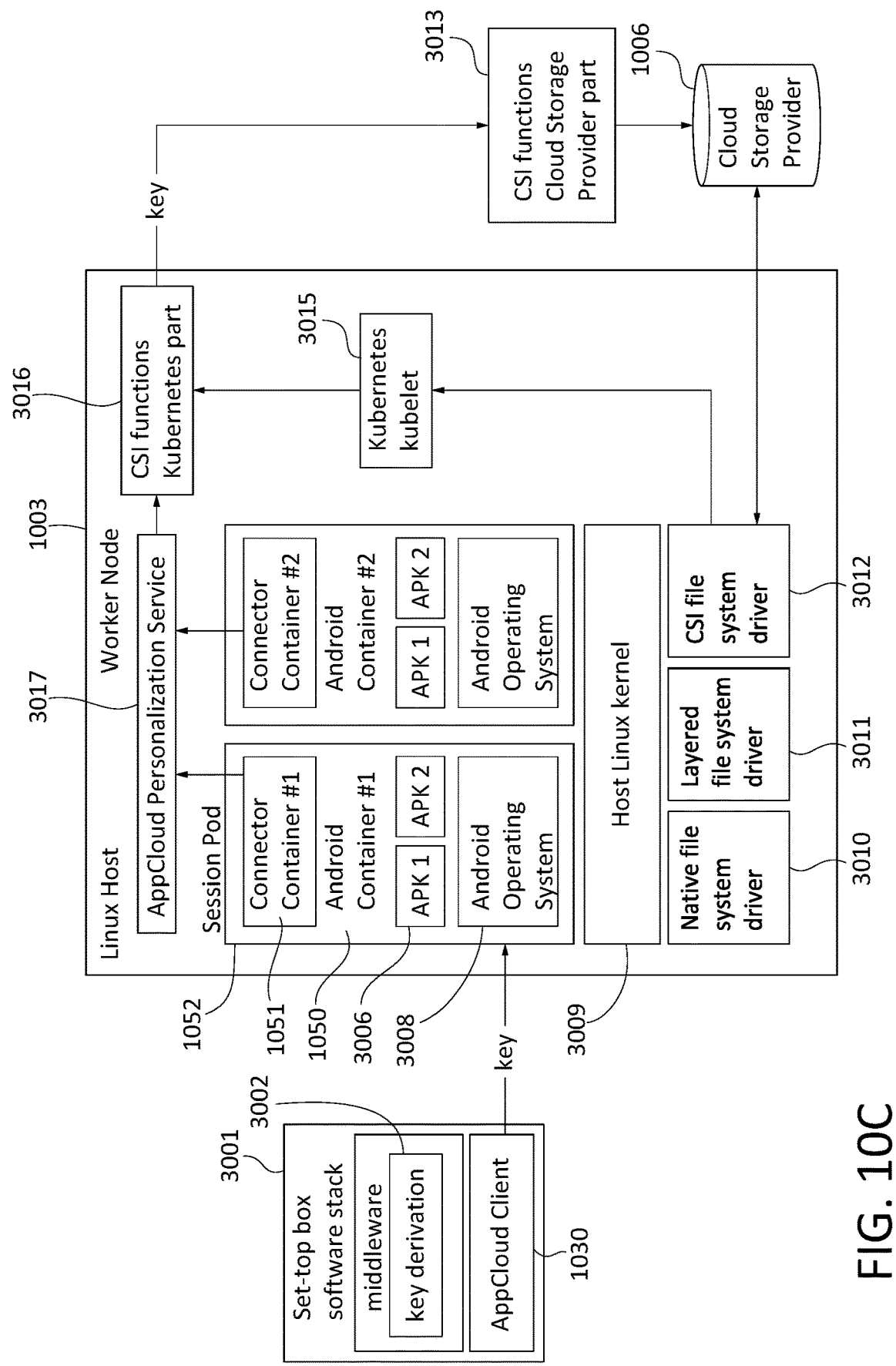

As illustrated in FIG. 10C, when a session request is received from a set-top box by a Connector Container 1051, it extracts the user identity parameter from the session setup request and the decryption key to use. The connector container 1051 then requests the Personalization Service 3017 to setup the user's data. The Personalization Service 3017 instructs the CSI functions 3016 to fetch the user data and passes the decryption key. The CSI functions then work with the Kubernetes 'kubelet' to add the required filesystem to the Linux host, and to expose this filesystem to the proper Android Container.

FIG. 10C illustrates this architecture from a high-level perspective. Several components in this architecture, such as the Personalization Service 3017 and some of the CSI functions 3016, are containers that are not specifically bound to a particular host. They can run on any available host, and in those cases the Container Orchestration will take care of running the container on a suitable host. The primary advantage of this architecture is that it supports any Cloud Storage Provider, and that the choice can be made at any time depending on economics, feature set, or other considerations.

Figures 1, 10D:
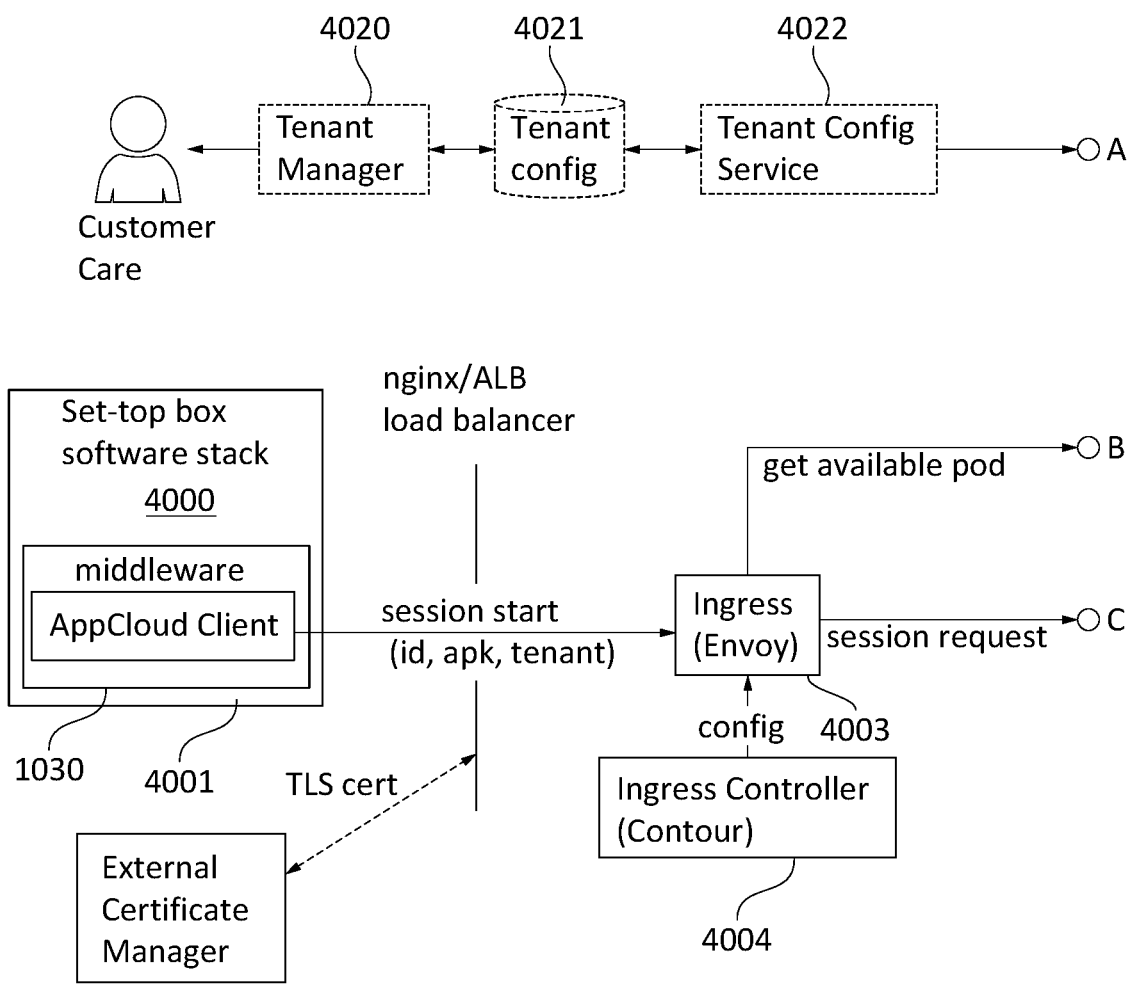
Figures 2, 10D:
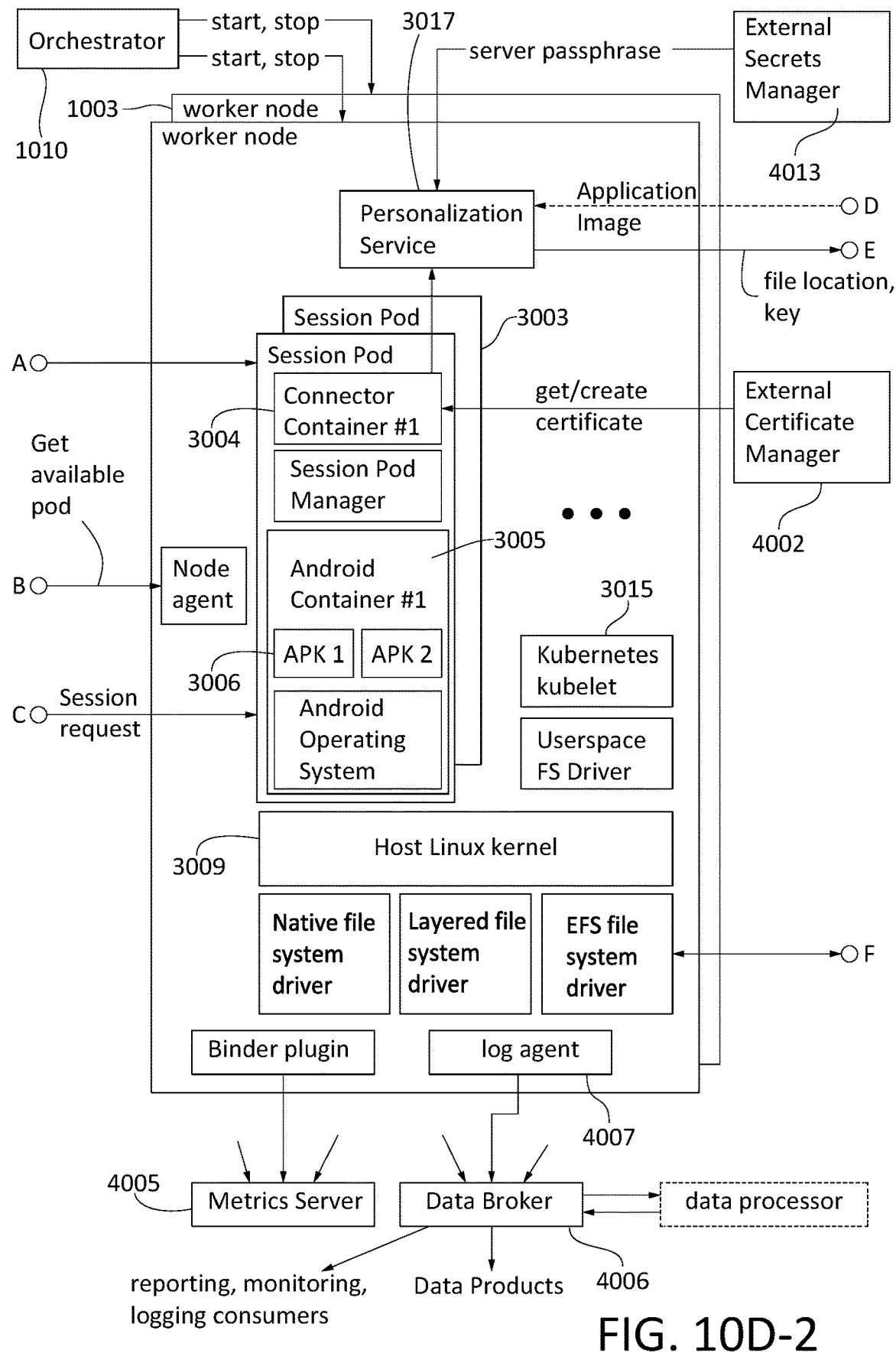
Figures 3, 10D:
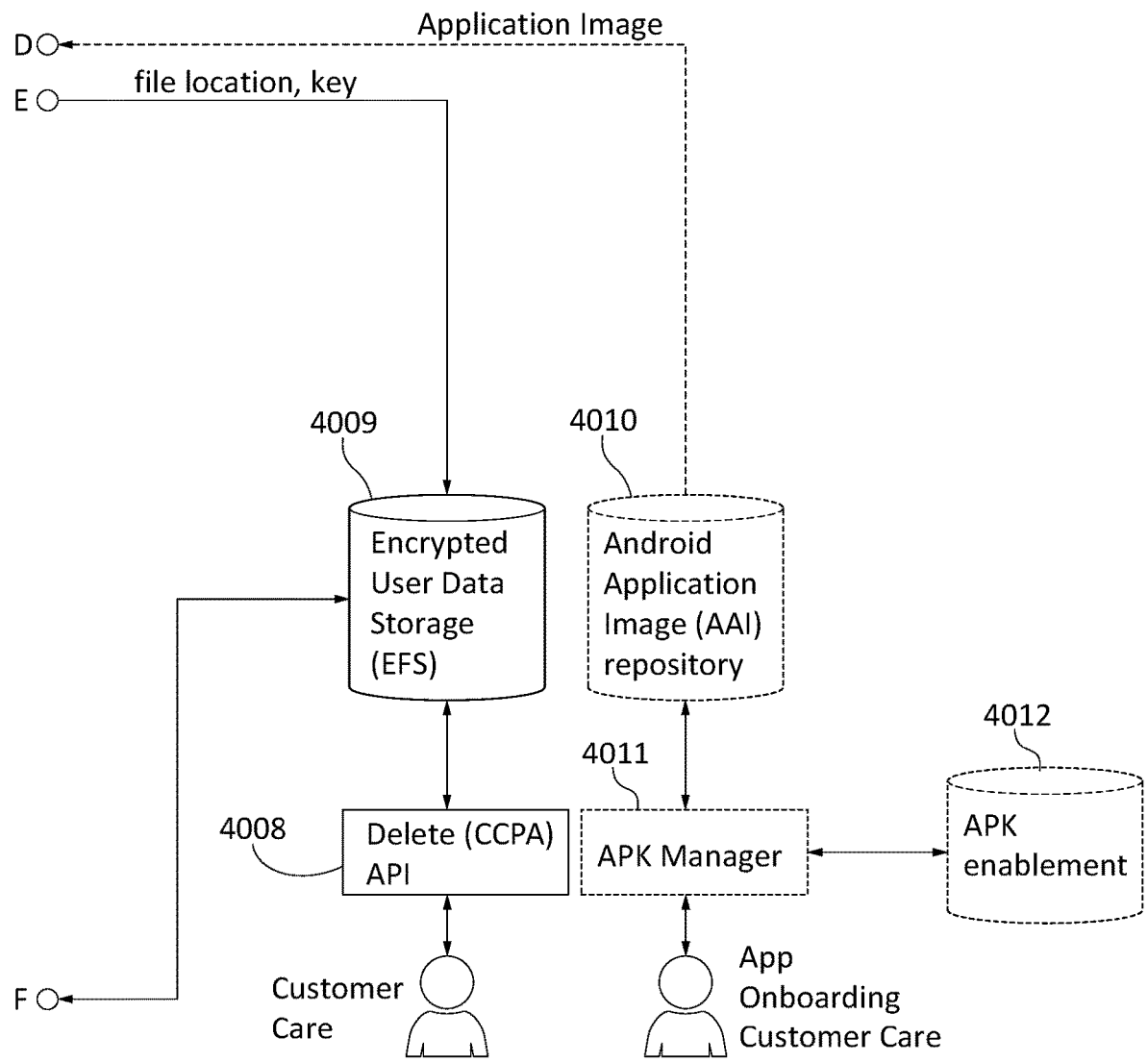
Figure 10E:
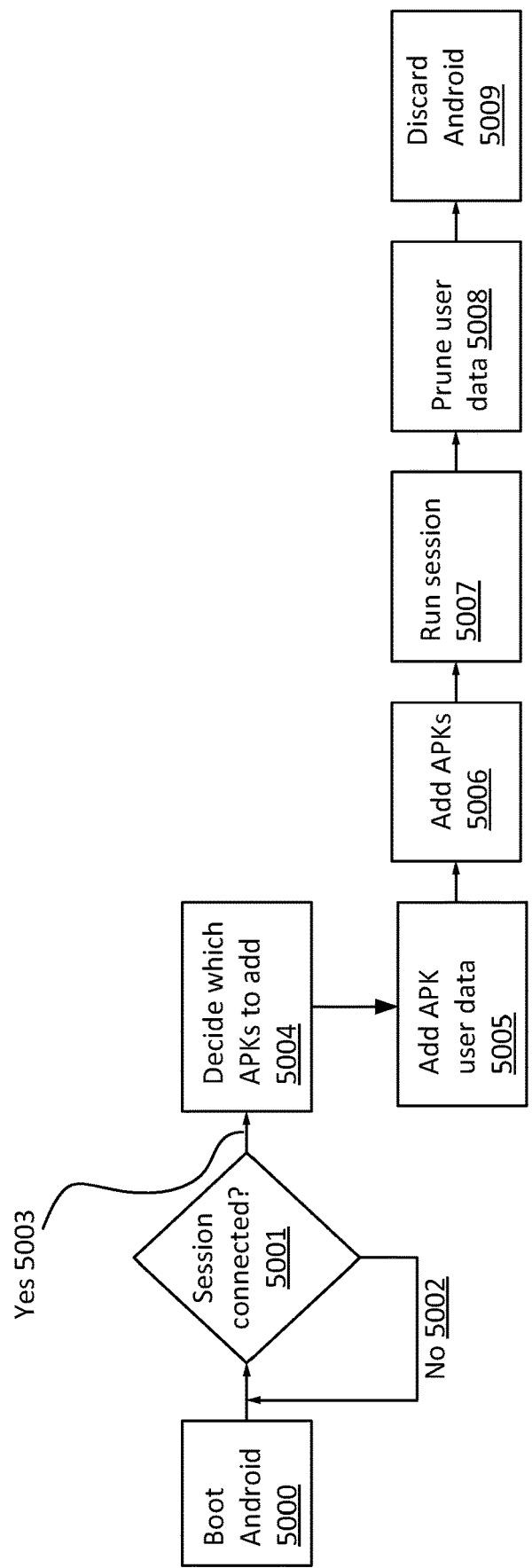
Figure 10F:
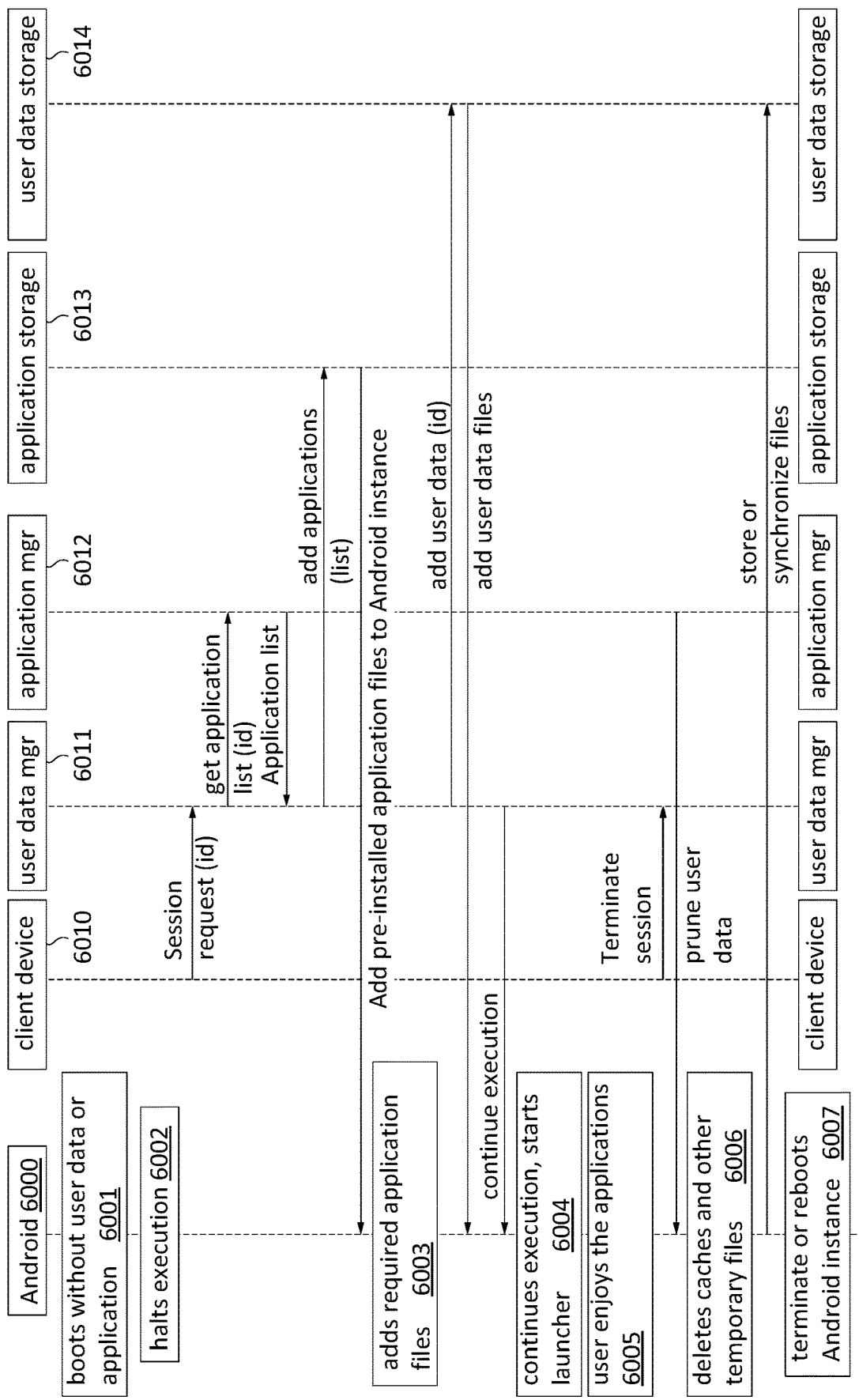

To ensure privacy and security of the data while in transit, the filesystem data is exchanged over TLS, as illustrated in FIGS. 10D-1 through 10D-3. The Cloud Storage Provider 4002 is responsible for encrypting the data while residing in the storage. The CSI infrastructure is responsible for the key exchange which also is protected by Transport Layer Security (TLS) while in transit. A standardized solution for key exchange and encryption is LUKS (Linux Unified Key Setup), which is supported by Ceph, Amazon Web Services (AWS) Elastic Block Store (EBS), and other cloud computing providers. This is a primary candidate to use for setting up the encryption keys though other technologies are expected to emerge.

The key for decryption will be provided by the set-top box or smart TV in certain applications. It is derived from the client device's 'keyladder', an APK identifier, and (potentially) a sequence number or nonce. This design has the following properties:

- Only this client device has the proper secrets in the 'keyladder' to generate a passphrase. For an attacker (someone wishing to exploit the Android instance or access users' private data), to derive the same passphrase requires knowing the set-top box's secrets.
- Different passphrases are used to protect user data for different APKs. Hence, when one APK's user data is compromised in the cloud, the other APKs' user data is still safe.
- The sequence number or nonce enables key rotation: to circumvent brute force attacks, the passphrase is rotated before a brute force attack can have guessed the key assuming practical CPU bounds.
- The passphrase is passed by the set-top box at session setup time. It is not stored by the server. So, when a session is not running, none of the cloud servers have a cleartext copy of the user data and the passphrase to decrypt the stored data is not available anywhere in the cloud.
- When a session is running, the user data is available in cleartext in the host's filesystem buffers and in the APK runtime memory. Here we have to rely on standard Linux Operating System level protection against arbitrary access to server memory.
- With LUKS, the Cloud Storage filesystem will generate the actual encryption key itself, and encrypt the key using the passphrase obtained from the set-top box. The encrypted key is stored on the encrypted filesystem. So, important to note that the passphrase that the STB generates is not the actual decryption key. In fact, the server hosting the app provides the other half of the passphrase. Both halves are then combined, usually by means of simple concatenation, followed by a hashing means such as SHA256.

The key derivation steps can be implemented in various ways but would likely involve hashing of the ingredients and performing a cryptographically secure one-way function.

In some embodiments, the above architecture will encrypt files in the Cloud Storage's file servers, while protecting data in transit through TLS. In principle it is possible to encrypt already on the host running the Android container, and keep it encrypted up to and including when 'at rest' in the Cloud Storage. This may be more secure, however, for several reasons: (1) it is not the default way of doing this so there may be risks attempting to add encryption to the layered container filesystem (2) there may be a performance penalty if the Cloud Storage servers are optimized for encryption (e.g., have better hardware support) than the hosts running the containers. The choice of implementation can remain flexible and utilize either encryption in the Cloud Storage or on the Android hosts based on available performance of each environment.

Since encryption happens on device layer level, clear-text data may be present in Operating System buffers prior to being written to disk. Although it may be possible to encrypt that information as well, it is futile because an intruder that has access to the Operating System buffers likely can also gain access to the Application memory pages where cleartext user information resides. It is also more costly to encrypt and decrypt upon every file access even when buffered. Therefore, the process of the disclosed invention does not aim to ensure data is encrypted in memory.

In some embodiments, other methods are used to manage installed applications for users. In some embodiments, a shared pre-installed APK database with on-demand "patching" of filesystem is provided. According to this method, pre-installed images per APK are generated. The APK image is added to an Android bare install image just prior to a session being started. It is an important element of this disclosure that the Android OS is booted before the user session starts, so that this long duration phase during startup is not part of the overall session startup delay. However, to boot Android before the user is known means booted Android instances are 'anonymous', that is, they are not user specific. Then, when the session for a particular user is started and the user is finally known, then the process proceeds with 'personalization' of the anonymous Android instance. In this embodiment, personalization means adding the APK's that need to be executable in this session (depending on user- and operator preferences) and adding the user's specific user data.

This is a core feature of the disclosure because: (1) due to being anonymous, all Android instances are identical and thus a single copy of each file in these containers can be shared across sessions on the same worker node. (2) due to separation of user data vs. execution/installed files, here too the installed files are all identical between users and can be shared. The only files that cannot be shared are the user-specific files in the user data partition. It is this data that is identical across sessions that enables the system of the disclosure to share files, and thus copies-of-files-in-memory, and thus achieve lower unique memory consumption per session.

When the user starts a next session with a different APK name as session start parameter, a different APK image is added to the Android bare install. As part of adding the pre-installed image, some XML files need to be patched. Multiple APK's may be added to the user, for example to provide a launcher with the choice of one or more applications to launch.

There are some scalability advantages, though: hundreds or thousands of pre-installed APK images can be prepared without needlessly increasing RAM size per session. When a session starts, just that one APK is in memory. All other APKs are not yet loaded. Also, since all session share the same pre-installed APK image, this image exists on the host system only once (but is being used potentially by hundreds of containers). Same for the base operating system (OS) image. Linux would load the static libraries also only once in memory (copy-on-write mechanism) because on OS level, it is the same file across containers.

New versions of supported APK's are first tested and certified before being allowed to run on the invention (users will not be allowed to install their own APK's or have new versions of an app install itself). Once an app had been certified for operation, a pre-install image will be created and then the images will be added to the database of pre-installed APK's. The user will not notice anything about the new install, except maybe new buttons or new features appear. Any installation choices request by the APK during installation will be answered by system operators and not the end-user. If the APK needs to convert stored user data to a new format, then this may fail with this first method and may require the deletion of user data. This would likely only affect data such as login tokens or local device settings. Viewing history, recommendations, or other user data is usually stored on the service provider's backend support system to ensure that this data is reliably updated by viewing history across devices (phone, STB, desktop, phone #2, laptop, etc.)

In some embodiments, unique user specific filesystem image provides a method that avoids the complexities in patching an Android Open Source Project (AOSP) by just adding all APK's that a user could possibly start to the Android image which could still be split between bare OS and data. Installing a new APK for a user would simply be done in the context of the session (e.g. —when the user first starts a session for that APK. The installed files would be stored as part of the user data. These could still be kept separately so that they would not be encrypted, and lower layer storage facilities could de-duplicate for storage optimization. However, since the user data comprises different files, they would exist in RAM multiple times and the memory footprint would be larger than in. Also, since all APKs are present in virtual memory (although they would be disabled if not running) the memory footprint would also be large. Supporting multiple APK versions does introduce additional complexity due to having different boot images that fragment the free session pod pool due to the presence of multiple pools.

In some embodiments, methods to add files to a container after booting the Android OS are provided. For example, the system in FIG. 10A desires to boot Android containers in advance of their use. This avoids the user having to wait until Android has booted as part of session setup. This means that the Android instance boots without knowing for whom it will run. It does not know which applications should be available, nor does it have the user's personal files (those modified by the application for a particular user). Once the Android instance has been associated with a new session that desires to run applications, it is "personalized." The proper applications are added to the Android instance's filesystem, as well as the user data for those applications. When the user is done with the session, the user data is pruned where temporary files such as caches are deleted—to avoid them being stored as part of the user data as storage costs money and they are dummy files such as digests of video and audio played by the client. Also, clearing of the cache is necessary to re-trigger a download when used again for by the client (for remoting purposes). The flowchart of FIG. illustrates this sequence and note that in the step to add APK's separately, it is not shown the separation of AOSP image and APK images.

In Android, adding user data and application data is fairly simple: all user data files (files modified by an application as part of its execution) are stored in /data/data/ caches are stored in/data/data/cache all pre-installed application files for an application are stored in /data/ So the 'only thing' we have to do is add the user data files (from user data storage) to /data/data/, and to add applications that need to be available to /data/.

In some embodiments, the system needs to add files (pre-installed applications, user data) to a container that is already running. Kubernetes are employed, and Kubernetes uses Docker as Container Runtime (although other options are available). Docker normally sets up the full container filesystem prior to starting the container. Adding files to the host on which the container is running is not technically possible, because the container can only 'see' the files that are part of its 'chroot' environment (a chroot environment is a Linux filesystem construct to isolate a runtime environment from other branches of a filesystem of which it is a part. This establishes the base of the designated 'chroot' directory and its attached branches as the 'root' of this isolated area.)

Several embodiments can be thought of each with their own advantages and disadvantages. Some solutions involve the mounting of volumes, which can be implemented in different ways such as using CSI (a generic Container Storage Interface that is available in almost all cloud environments) as it is used e.g., by Ceph, mounting an EFS or EBS volume, etcetera. One embodiment might employ Kubernetes emptyDir where the 'emptyDir' is an empty scratchpad directory created by Kubernetes when a pod 1052 is created (AppCloud uses a session pod containing the Android container, Connector Container, and Pod Session Manager). Kubernetes makes sure there is one emptyDir for each pod on a host. All files added to this directory (including volumes that are mounted inside it) are exposed to all containers in the pod. Hence, this is a good solution to add files to a pre-mounted environment. This, however, adds a new problem: Kubernetes clears out the directory when the container is terminated. If the volumes inside the directory are not unmounted before Kubernetes' clear-out activity, all user data is deleted. That obviously is not desired. So, care has to be taken to unmount all volumes inside emptyDir before Kubernetes clears out the volume. Especially with network mounts, there can be significant delays in unmounting a volume. Also, if Android may keep files in use until it is shut down, which prevents unmounting files. This all increases the probability that a volume is still present when Kubernetes deletes the contents of the directory.

In some embodiments, the user data and application data volumes are mounted or obtained from within Android. A software agent can be provisioned inside the Android container that receives commands from the Personalizer, and that mounts the required volumes. The drawback of this is that the Android container needs to be given a rich set of permissions (it needs to be a privileged container) which increases security risks, for example, for an Android container to access files belonging to a different user or accessing host devices that are not of Android's interest. If (an application running on) Android gets compromised, the door is wide open to unauthorized access of other information or software vulnerabilities on the host. Since Android is a very complex software system, there is a large attack surface with potential vulnerabilities.

In some embodiments, the system of the disclosure can download from within the Android container (e.g., the third method in Table 1). To avoid the privilege problem, the Android container could download the user data from an HTTP server (for example, the Amazon Web Serves S3 storage service) and copy the files to the correct location. The challenge of this approach is (1) permissions need to be setup so that the Android container can only download the user data for the session that it is executing, and (2) when the container crashes, updates to the user data is lost. A beneficial property of the EFS approach in other solutions is that changes are immediately written to the network storage, so a container crash does not lead to loss of user data.

In some embodiments, the Container Storage Interface (CSI) interface is employed (e.g., the fourth method in Table 1) where the CSI is a set of API's that is standardized across multiple cloud storage provider environments, and is well-integrated into Kubernetes. Using this set of API's, it is easier to mount- and unmount a volume. However, it is an elaborate set of API's, since it allows the implementation of a complete cloud storage solution, even though the service only needs better control of mounting and unmounting volumes.

Table 1, below, includes several possible methods for mounting and/or unmounting volumes to/from a container:

the appropriate information into the Pod 1052 thus avoiding mount/unmount delays and locks that occur when using Ceph and CSI.

The first step is introduced with the acknowledgement that it does not scale well, hence the need for step 2&3. In this step, before Android is started, the user's '/data' directory 7003 is mounted as an encfs mount off the AWS EFS mount that the AWS EC2 instance already has. Importantly, in some embodiments, the filenames are NOT to be encrypted (see below). When Android shuts down, the data is automatically synced back to the local EFS mount. Should Android terminate for some reason, the latest changes may not be sent back to the EFS mount, hence the user only loses the last changes but not all their data. Also, this does not block when by accident the user is logged in twice (something that most likely will happen more for testers than for users), as diagrammed in the top Android Image 7001 in

TABLE 1

| alternative | pro's | con's |
| --- | --- | --- |
| Use Kubernetes emptyDir | Makes use of existing Kubernetes mechanism to setup a unique per-container directory that you can easily mount volumes Into. Keeps Android do-privileged. | Only works with Kubernetes. Race conditions exist, Kubernetes may delete the contents before the volumes are unmounted |
| Mount from within Android | We have full control over what Android mounts and unmounts. No hassle with mounts or mappings from host to container. When Android is killed, unmount happens automatically. | Android container runs in privileged mode. |
| Download from within Android | No hassle with mounts or mappings from host to container. Keeps Android de-privileged. | No immediate saving/synchronization of user data updates to network storage. |
| Use CSI Interface | Mora Kubarnetes-native solution. | High implementation load to implement a full GSI APL Not a very familiar area. so lots of opportunities to introduce bugs. |

In some embodiments, the first method (to use emptyDir) is implemented. When the volume to unmount is found busy, the system of the disclosure waits for a predetermined period and retries in the hopes that the volume can be unmounted before Kubernetes clears out the directory.

In some embodiments, a personalizer method (e.g., "Mount from within Android") is provided in order to obtain several advantages, including: no blocking; graceful handling should a user be logged in twice; encrypted user-specific data; affordable storage costs; supports multi-site deployment; rapid user experience; architecture principle: simple & isolated.

The purpose of the personalizer method of the disclosure is to provide the user with their data each time they log in. The data is created & changed by apps on a per-user basis. It is known that part of this data is generic and a portion of the data is personally sensitive which is difficult as storing the full "/data/data" directory is economically unattractive.

Figure 10G:
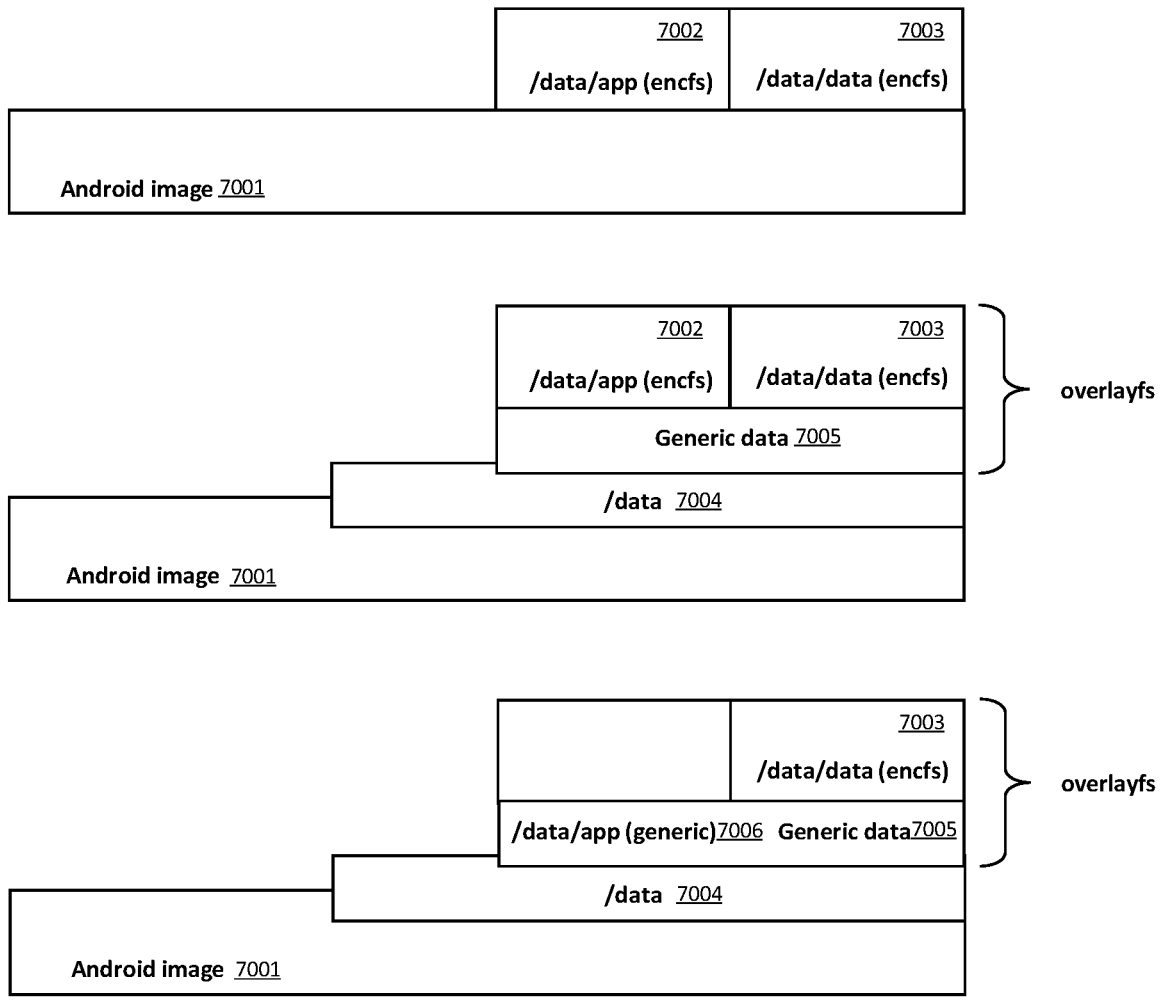

As illustrated in FIG. 10G, in an Android environment, the apps create and manage the user data in a file directory named "/data/". As apps are installed, the data is created, when an app is updated, the user data can be updated to work with the new version of the app. This makes upgrading an app a one-way event. Users may sign up to be among the first to get the new version of an app, and their apps will be upgraded to the latest when they start up a session with the app.

Provided below is a three-step process by which a robust and scalable solution is provided based upon the concept of large filesystem mounts of static system data and encrypted (per) user data. In some embodiments, a method is provided to mount the big volumes on the Amazon Web Services (AWS) EC2 instance when it starts up (boots) and only map FIG. 10G. This step has the advantage of simplicity. The embodiment is only assigning the user to the POD 1052. The personalizer role in this case is a simple mount of the encfs '/data' 7004 which can be a script (text instructions) in the android container, just prior to advancing Android forward. The disadvantage is that '/data' 7004 can easily be over 200 million bytes in size, which does not scale well but provides a useful starting point for the process.

Step 2 performs the de-duplication of '/data/apk', which mounts the applications with the option of the user choosing the latest versions of the app or the stable versions. In Step 3 below, the process of de-duplication of '/data/data' 7003 is performed, this step is used to discover which files are generic as they are shared by many users and which are personal which are unique to the user.

As a first step of this embodiment, de-duplication of the user data is performed. The process provides a discovery method to measure the amount of data in '/data/data' 7003 which is unique by traversing the file system and compares each file's hash value with the generic data on file. In other embodiments, a software process will receive from a process that runs in parallel with or after the Android container and delivers a list of files and their hashes. Once the user session is terminated and the '/data/data' directory 7003 is unmounted, any matching files are removed from the users' encfs' filesystem. This process provides the benefit of causing the files from the generic data partition to now appear when '/data/data' 7003 is mounted over generic data 7005.

The process for this removal can execute at a relatively unconstrained rate when the android session was terminated. Hence, this processing will not delay the user experience of a rapidly available application ready for interaction on the user's display device. It will also automatically reduce the amount of data to be stored to the minimum, and hence the cost to a minimum, as diagrammed in FIG. 10G. This approach works well (also for the '/data/app' 7003 directory) until a new version of an app is introduced. As the number of apps available to a user increases, the limitation of introducing app upgrades is expected to rise substantially and a process to improve efficiency is introduced below.

In some embodiments, an upgraded app should be executed when Android starts. This will overwrite existing '/data/app' files 7002 and update the '/data/data' files 7003 where needed. At this point the user's unique (and encrypted) data will rise again. De-duplication at this instance needs to be against the files for that version of the app. It is therefore important for the system to know the version of each app and when the user has been detected upgrading the app, a method of the system can replace the user's, for example only, '/data/app/comfoobar.app' with the generic version for that app. A method of the system will also deduplicate the user's '/data/data/com.foobar.app' directory against the 'generic data' 7005 for that version, as illustrated in the bottom Android image 7001 of FIG. 10G. A requirement of this method is to hard link each of the apps (=directories under '/data/app/' 7003) the user's particular version over which the enfcs can be mounted. Hence, this system and method of the disclosure becomes a dynamic system that optimizes the disk usage with the user's desire to interact with the latest app. Another advantage of this embodiment is to be introduced on a system that is practicing Step 1, before more complex software systems are introduced.

FIG. 11 illustrates a method 1100 for transmitting a GUI overlay instruction (e.g., a GPU overlay instruction to draw a GUI frame) for a client to composite a GPU overlay with a video frame. In some embodiments, the method 1100 is performed by a server computer system 300 that hosts (1102) one or more virtual client device (e.g., VCVM), each virtual client device corresponding to a remote physical client device that plays back video content received from a content server, as shown in FIG. 1. For example, instructions for performing the method are stored in the memory 306 and executed by the processor(s) 302 of the server computer system 300. Some operations described with regard to the process 1100 are, optionally, combined and/or the order of some operations is, optionally, changed. The server computer system (e.g., a server computing device) has one or more processors and memory storing one or more programs for execution by the one or more processors. In some embodiments, each physical client device is a thin client programmed to remote into a server-based computing environment.

In some embodiments, the server system receives (1104), from a respective remote physical client device, a digest of a segment of video content received by the respective remote physical client device, the segment of video content including a plurality of frames of video content. In response to receiving the digest (1106), the server system sends (1108) a playback command to the respective remote physical device to playback one or more of the plurality of frames of video content in the segment. The plurality of frames of video content in the segment have a frame rate. In some embodiments, the playback command comprises a command to decode video content that the client device already has stored (e.g., and retrieved from the third-party CDN). In some embodiments, the server system also sends a playback command for each segment (e.g., "video player commands" illustrated in FIG. 5B).

The server system determines (1110) a graphical processing unit (GPU) overlay instruction (e.g., a GUI overlay instruction) for overlaying content (e.g., content of a frame buffer, wherein a texture is rendered to the frame buffer based upon the GPU overlay instruction) with a respective portion of the segment of video content. For example, the GPU overlay instruction comprises an instruction for the client to draw GUI overlays in a texture.

The server system sends (1112), asynchronously from the frame rate of the plurality of frames of video content, the GPU overlay instruction to the respective remote physical client device. In some embodiments, the GPU overlay instructions comprises an OpenGL primitive that includes the instructions for rendering a texture into the frame buffer.

In some embodiments, the GPU overlay instruction also includes a texture or a set of textures (e.g., within a texture atlas). For example, the client device needs to be provided with the textures at least once (e.g., in a first GPU overlay instruction), such that subsequent GPU overlay instructions do not need to include the textures, but instead only need to include references to the texture(s) that the client device 110 has already received from server system 102 (e.g., from the texture atlas). For example, after the client device has the textures, the GPU overlay instructions include an identifier of a particular texture from the set of textures, and an instruction of a vertex to place the texture. Accordingly, after the server system has sent the client device a texture atlas, future GPU overlay instructions can reference textures in the texture atlas without requiring the server system to re-send the texture atlas. This reduces the amount of bandwidth required in sending GPU overlay instructions from the server system to the client device, by only sending references to the textures in a texture atlas that the client has already stored.

In some embodiments, the server system determines a frame in which there is a change in an overlay instruction from an overlay instruction of a previous frame, wherein sending the GPU overlay instruction is performed in response to determining there is a change in the overlay instruction. For example, the server system only sends a GPU overlay when there is a change detected, such as updates to the subtitles. In some embodiments, a GPU overlay instruction is not sent in accordance with a determination that it is a new segment (e.g., the GPU overlay instructions are segment-independent).

In some embodiments, the server system sends an orientation instruction to the client device. For example, the orientation instruction instructs the client where to display graphics (and/or video frames) on the display. For example, the orientation instructions correspond to the "compositing primitives" as explained with reference to FIG. 5B. In some embodiments, the orientation instruction is sent separately from the GPU overlay instruction. For example, as illustrated in FIG. 5B, the GUI overlay is sent separately from compositing primitives (e.g., using separate (distinct) channels). In some embodiments, the GPU overlay instruction is directed to the GPU of the client and the orientation instruction is directed to the compositor of the client. In some embodiments, the orientation instruction is determined using the virtualized hardware composer (HWC) at the server system.

In some embodiments, the orientation instruction is sent asynchronously from the frame rate of the plurality of frames of video content and/or from the GPU overlay instruction. For example, a single orientation instruction may be provided for a plurality of GPU overlay instructions (e.g., GUI frames), such that the orientation instructions are only sent as needed to provide the client device 110 with instructions on how to arrange a respective texture rendered to the frame buffer with the respective portion of the segment of video content on the display.

In some embodiments, the client device uses the GPU overlay instruction and the orientation instruction to composite the content of the frame buffer (e.g., the texture) with the respective portion of the segment of video content.

In some embodiments, the GPU overlay instruction comprises an identification of each frame in the portion of the segment of the video content in which the content of the frame buffer (e.g., texture) is overlaid. For example, the server system 102 does not send a GPU overlay instruction for each frame in the segment of video content. Instead, GPU overlay instructions are only sent as needed (e.g., to update the texture). In some embodiments, a first GPU overlay instruction identifies a plurality of frames (e.g., each frame in a first respective portion of the segment of video content) and a second GPU overlay instruction is sent for a second respective portion of the segment of video content.

In some embodiments, the respective portion of the segment of the video content comprises a frame of the video content. For example, as described with reference to FIGS. 6A-6, in some embodiments, a series of GPU overlay instructions is sent in a "burst mode" where a GPU overlay instruction (e.g., for a GUI frame) is sent with each frame in a sequence of frames to generate an animation on the display.

In some embodiments, the respective portion of the segment of the video content comprises a plurality of frames of the video content (e.g., the same overlay instruction applies to a plurality of frames).

In some embodiments, the server system does not transmit the plurality of frames of video content. For example, the server system does not clock the frames (e.g., because the server system does not render each frame as a GPU primitive, the client performs the clocking).

In some embodiments, the GPU overlay instruction comprises an openGL command (e.g., primitive). In some embodiments, the openGL primitive does not include a background frame (e.g., as described with reference to FIG. 5A).

In some embodiments, the server system determines a second GPU overlay instruction for overlaying a second content (e.g., from the frame buffer) with a second respective portion of the segment of video content and sends, asynchronously from the frame rate of the plurality of frames of video content, the second GPU overlay instruction to the respective remote physical client device.

In some embodiments, the second respective portion of the segment of video content is a different length than the respective portion of the segment of video content. For example, GPU overlay instructions are not segment-based and are only sent as needed and identify which frames to overlay the texture.

Figure 12:
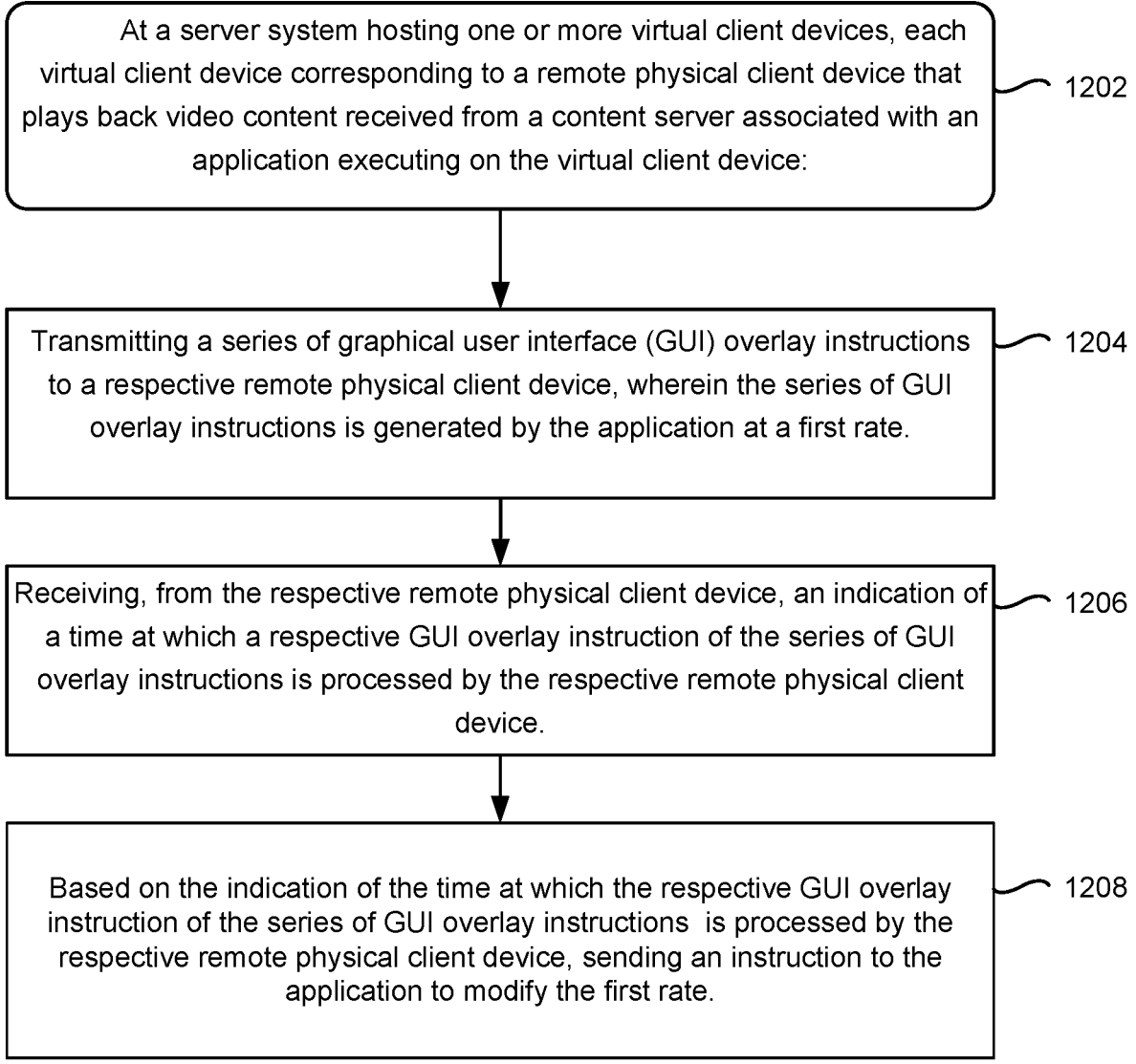
FIG. 12 is a flowchart for a method of modifying a frame rate for transmitting GUI frames, in accordance with some embodiments.

FIG. 12 illustrates a method 1200 for adjusting an application rate of transmission of GUI overlay instructions in response to receiving a backpressure signal from a client device. In some embodiments, the method 1200 is performed by a server computer system 300 (e.g., server system 102) that hosts (1202) one or more virtual client device (e.g., VCVM 104), each virtual client device corresponding to a remote physical client device that plays back video content received from a content server, as shown in FIG. 1. For example, instructions for performing the method are stored in the memory 306 and executed by the processor(s) 302 of the server computer system 300. Some operations described with regard to the process 1200 are, optionally, combined and/or the order of some operations is, optionally, changed.

The server computer system (e.g., a server computing device) has one or more processors and memory storing one or more programs for execution by the one or more processors. In some embodiments, each physical client device is a thin client programmed to remote into a server-based computing environment.

In some embodiments, the server system transmits (1204) a series of graphical user interface (GUI) frames (e.g., wherein a GUI frame comprises a GUI overlay instruction (e.g., to draw a texture) and optionally includes texture data compressed in an image format (e.g., as a texture atlas)) to a respective remote physical client device, wherein the series of GUI frames is generated by the application at a first frame rate. For example, the application timeline illustrated in FIG. 6D displays a series of GUI frames transmitted at a first frame rate.

The server system receives (1206), from the respective remote physical client device, an indication of a time at which a respective GUI frame of the series of GUI frames is processed (e.g., rendered) by the respective remote physical client device. For example, the backpressure signal (e.g., as described with reference to FIGS. 6B-6E) includes the indication of time. In some embodiments, the indication of the time is an indication of how long the frames too to render at the client device. In some embodiments, the indication of the time accounts for a latency of a network connection between the server system 102 and client device 110 (e.g., the indication of time is adjusted based on a known or calculated latency).

Based on the indication of the time at which the respective GUI overlay instruction of the series of GUI overlay instructions is processed by the respective remote physical client device, the server system sends (1208) an instruction to the application to modify the first rate.

In some embodiments, the indication of the time at which the respective frame of the series of GUI frames is processed by the respective remote physical client device is an indication of a time at which the respective frame is rendered for display (e.g., displayed) by the respective remote physical client device.

In some embodiments, the instruction to the application to modify the first frame rate is a swap buffer command. For example, the instruction to decrease comprises withholding a Swap Buffer command of the virtualized application. In some embodiments, a length of time for withholding the Swap Buffer command is based on a difference in the frame rate at the client and the first frame rate.

In some embodiments, the instruction to the application is not an explicit instruction to modify the first frame rate, but rather an implicit instruction that results in modification of the first frame rate. For example, the instruction causes the SwapBuffer command to be withheld, which causes a decrease in the frame rate, without directly instructing third-party application 105 to decrease the frame rate of the GUI frames.

In some embodiments, the server system compares the average frame rate of the client with a frame rate of transmission of the GUI frames by the sever (e.g., and/or the application). For example, as described with reference to FIGS. 6D-6E, the application timeline for sending GUI frames is adjusted in accordance with a backpressure signal from client device 110 (e.g., indicating a frame rate at which client device 110 is rendering the GUI frames).

In some embodiments, decreasing the first rate comprises dropping (e.g., not transmitting) one or more frames.

In some embodiments, the indication of the frame rate comprises a time stamp from the client. For example, the time stamp is a time that the client device rendered a respective frame.

In some embodiments, the indication of time at which the respective GUI overlay instruction is processed by the respective remove physical client device comprises an average frame rate for the client device to render the series of GUI frames.

In some embodiments, the server system does not send the client device content and the client device 110 renders the GUI frame to a frame buffer and composites content from the frame buffer with content that is received from a third-party content server.

Figure 13:
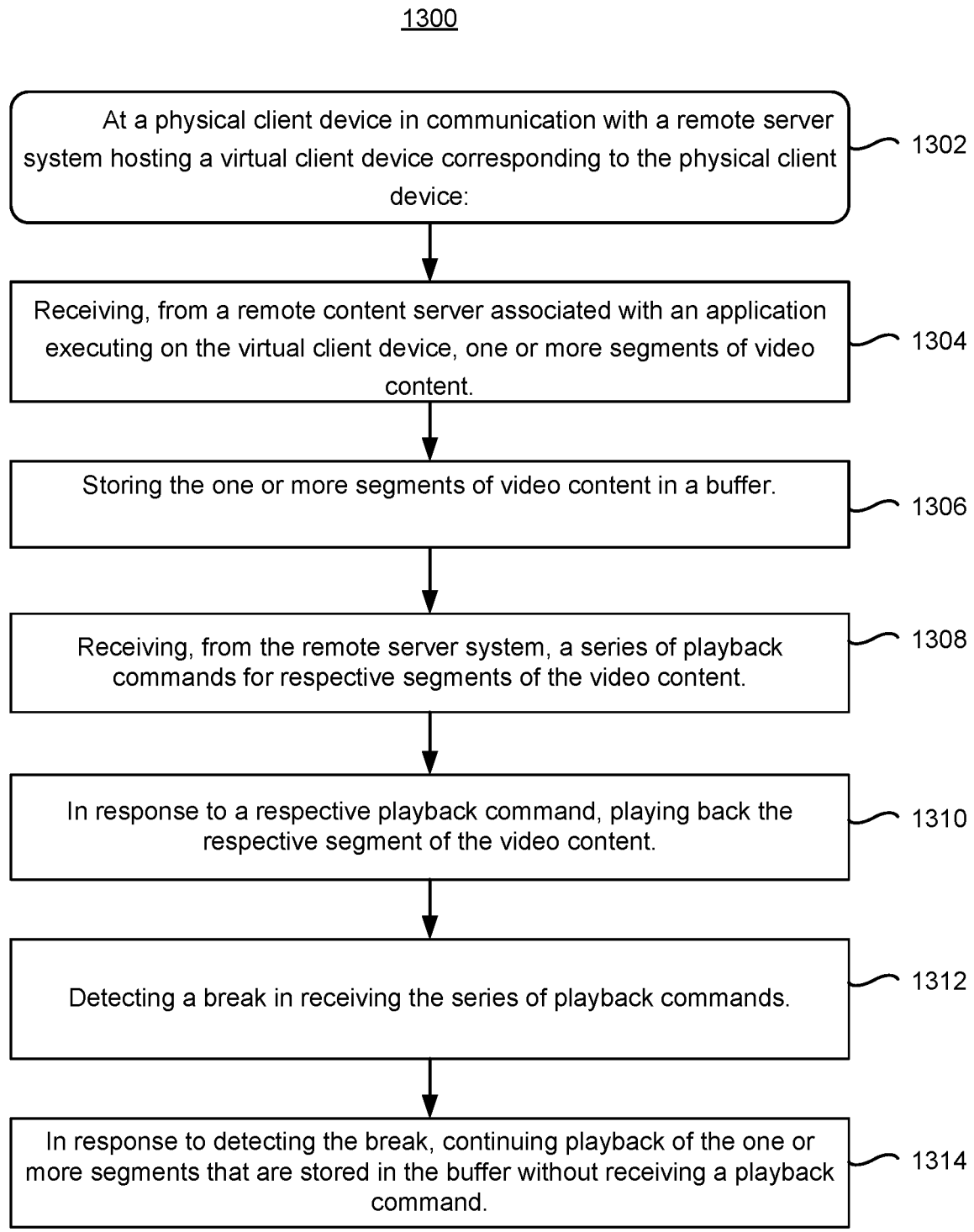
FIG. 13 is a flowchart for a method of continuing playback of video content at a client device, in accordance with some embodiments.

FIG. 13 illustrates a method 1300 for a client device continuing playback of media content after losing connection with a server system that provides the playback instructions. In some embodiments, the method 1300 is performed by a physical client device 400 (e.g., client device 110) that is in communication with (1302) a remote server system (e.g., server system 102) hosting a virtual client device (e.g., VCVM 104) corresponding to the physical client device. For example, instructions for performing the method are stored in the memory 412 and executed by the processor(s) 406 of the client device 400. Some operations described with regard to the process 1300 are, optionally, combined and/or the order of some operations is, optionally, changed. The client device has one or more processors and memory storing one or more programs for execution by the one or more processors. In some embodiments, each physical client device is a thin client programmed to remote into a server-based computing environment.

In some embodiments, the client device receives (1304), from a remote content server associated with an application executing on the virtual client device, one or more segments of video content. For example, each segment includes a plurality of frames of video data for a same video content.

The client device stores (1306) the one or more segments of video content in a buffer at the client device. For example, as described with reference to FIG. 7A, client device 110 receives media stream segments 704 and stores them in buffer 702. In some embodiments, the client device generates a digest (e.g., as described with reference to FIG. 2) and transmits the digest to the server system.

The client device receives (1308), from the remote server system, a series of playback commands for respective segments of the video content.

In response to a respective playback command, the client device plays back (1310) the respective segment of the video content.

The client device detects (1312) a break in receiving the series of playback commands. For example, the client device determines that a predetermined period of time has passed in which no playback command is received from the server. In some embodiments, in response to determining that no playback command is received within the predetermined period of time, the client device determines (e.g., assumes) a lost connection between the client device and the server system.

The client device, in response to detecting the break, continues (1314) playback of the one or more segments that are stored in the buffer without receiving a playback command. In some embodiments, the client determines an order of the segments that are stored in the buffer to determine a next/upcoming segment. For example, the client determines a playback order of the segments without instructions from the server system.

In some embodiments, detecting the break comprises detecting a loss (e.g., a temporary loss) of communication between the server system and the client device.

In some embodiments, after detecting the break, the client device receives an additional playback command from the server system for a next segment of video content. In some embodiments, in response to receiving the additional playback command, the client device determines whether the next segment of video content has been played back during the detected break. In accordance with a determination that the next segment of video content has already been played back, the client device forgoes playback of the next segment of video content identified by the additional playback command (e.g., and waits for a next playback command). In accordance with a determination that the next segment of video content has not been played back during the break, the client device plays back the next segment of video content in accordance with the additional playback command.

In some embodiments, the playback command comprises a command to decode the segments of the video content that are stored in the buffer.

In some embodiments, continuing playback of the one or more segments comprises determining an order for playing back the one or more segments of the video content that are stored in the buffer, and playing back the one or more segments of the video content in the determined order.

In some embodiments, each playback command includes an identification of which media segment to play from the buffer.

In some embodiments, the client device continues to detect the break (e.g., the client does not receive a playback command for at least the predetermined time period and continues to not receive a playback command). In some embodiments, in response to continuing to detect the break, the client device continues to playback the one or more segments until the buffer is empty (e.g., and/or until communication with the server has been re-established).

Figure 14:
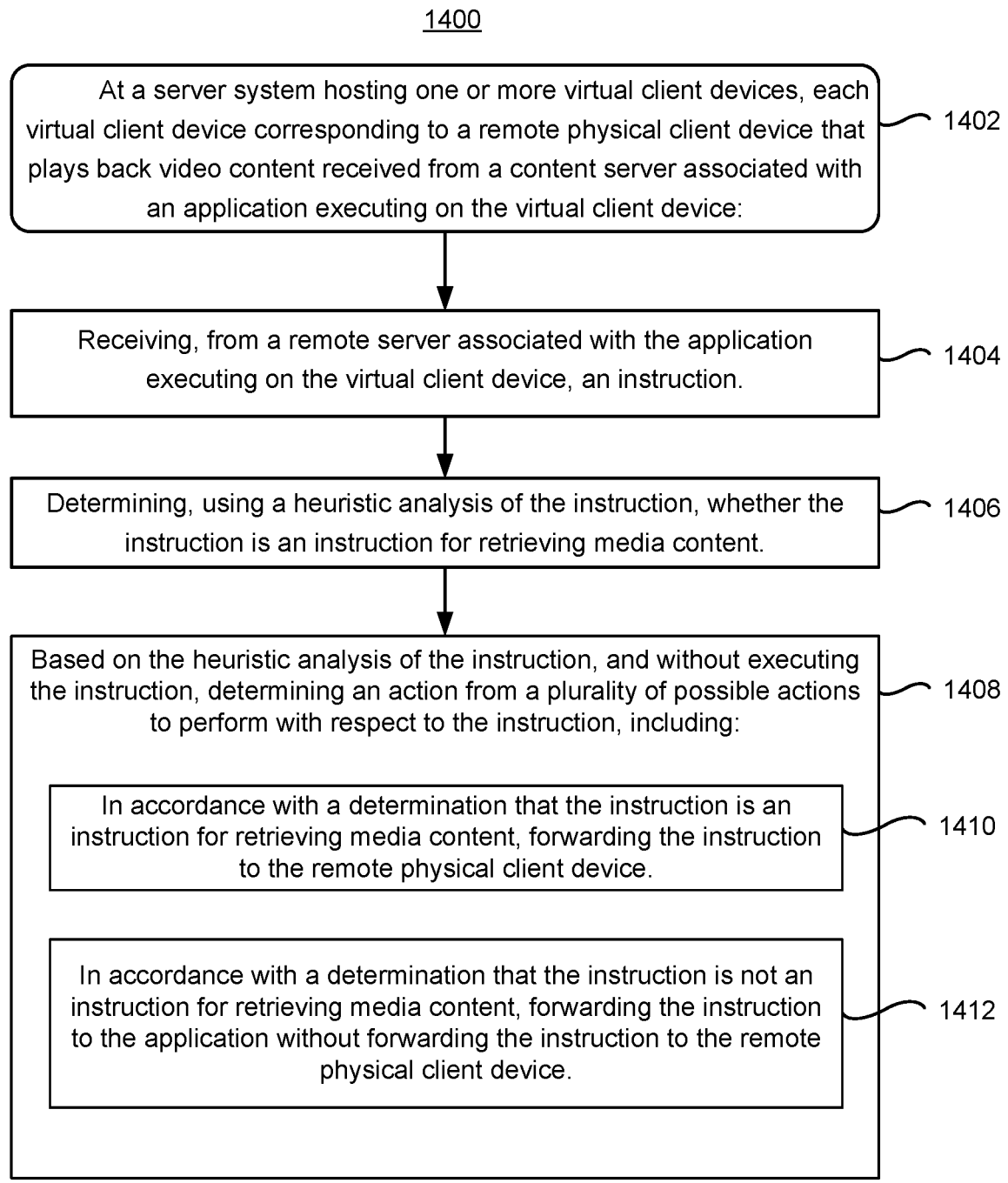
FIG. 14 is a flowchart for a method of forwarding commands to an application executing in a server system and a client device, in accordance with some embodiments.

FIG. 14 illustrates a method 1400 for determining where to forward commands received from a third-party application backend. In some embodiments, the method 1400 is performed by a server computer system 300 (e.g., server system 102) that hosts (1402) one or more virtual client device (e.g., VCVM 104), each virtual client device corresponding to a remote physical client device that plays back video content received from a content server, as shown in FIG. 1. For example, instructions for performing the method are stored in the memory 306 and executed by the processor(s) 302 of the server computer system 300. Some operations described with regard to the process 1400 are, optionally, combined and/or the order of some operations is, optionally, changed. The server computer system (e.g., a server computing device) has one or more processors and memory storing one or more programs for execution by the one or more processors. In some embodiments, each physical client device is a thin client programmed to remote into a server-based computing environment.

The server system receives (1404), from a remote server associated with the application executing on the virtual client device, an instruction.

The server system determines (1406), using a heuristic analysis of the instruction, whether the instruction is an instruction for retrieving media content.

The server system, based on the heuristic analysis of the instruction, and without executing the instruction, determines (1408) an action from a plurality of possible actions to perform with respect to the instruction, including, in accordance with a determination that the instruction is an instruction for retrieving media content, forwarding (1410) the instruction to the remote physical client device and in accordance with a determination that the instruction is not an instruction for retrieving media content, forwarding (1412) the instruction to the application without forwarding the instruction to the remote physical client device.

In some embodiments, as described with reference to FIG. 8, the server system 102 includes application proxy 802, and the application proxy 802 determines whether the instruction should be forwarded to client device 110.

In some embodiments, determining that the instruction is an instruction for retrieving media content comprises determining that the instruction references a video or an image file. In some embodiments, determining that the instruction references a video or an image file comprises determining a file extension of the file referenced by the instruction.

In some embodiments, the server system, in accordance with the determination that the instruction is an instruction for retrieving media content, also forwards the instruction to the application.

In some embodiments, the heuristic analysis of the instruction comprises determining whether the instruction references a manifest file of the application. For example, instructions that reference the manifest file of the application are forwarded to client device 110.

Figure 15:
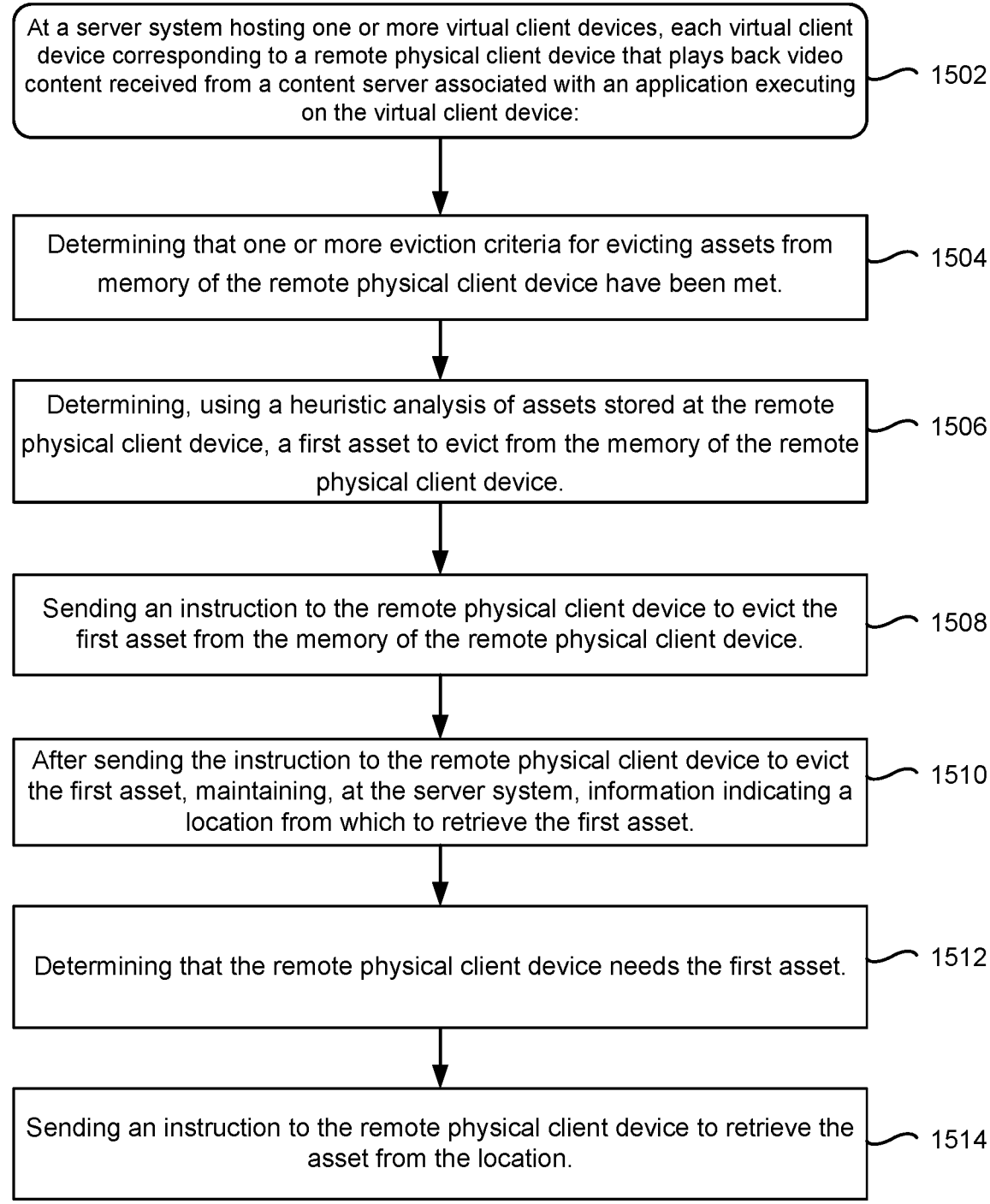
FIG. 15 is a flowchart for a method of evicting media assets from a client device, in accordance with some embodiments.

FIG. 15 illustrates a method 1500 for using a server system to manage eviction and retrieval of media assets on a physical client device. In some embodiments, the method 1500 is performed by a server computer system 300 (e.g., server system 102) that hosts (1502) one or more virtual client device (e.g., VCVM 104), each virtual client device corresponding to a remote physical client device that plays back video content received from a content server, as shown in FIG. 1. For example, instructions for performing the method are stored in the memory 306 and executed by the processor(s) 302 of the server computer system 300. Some operations described with regard to the process 1500 are, optionally, combined and/or the order of some operations is, optionally, changed. The server computer system (e.g., a server computing device) has one or more processors and memory storing one or more programs for execution by the one or more processors. In some embodiments, each physical client device is a thin client programmed to remote into a server-based computing environment.

The server system determines (1504) that one or more eviction criteria for evicting assets from memory of the remote physical client device have been met. For example, FIG. 9A illustrates that at step 906, server system 102 determines whether a summed size of media assets at the client device exceeds a threshold.

The server system determines (1506), using a heuristic analysis of assets stored at the remote physical client device, a first asset to evict from the memory of the remote physical client device.

The server system sends (1508) an instruction to the remote physical client device to evict the first asset from the memory of the remote physical client device.

The server system, after sending the instruction to the remote physical client device to evict the first asset, maintains (1510) information indicating a location from which to retrieve the first asset;

The server system determines (1512) that the remote physical client device needs the first asset.

The server system sends (1514) an instruction to the remote physical client device to retrieve the asset from the location. In some embodiments, the client displays black and/or blank frames while the client is retrieving the asset.

In some embodiments, the heuristic analysis of assets includes a least recently used (LRU) criterion.

In some embodiments, the heuristic analysis of assets includes determining whether an asset is currently playing and/or a play position of an asset, an age of the asset, if the asset lies ahead in playback position.

In some embodiments, in accordance with a determination that the first asset is an image asset: the server system receives (e.g., retrieves) the image asset from the client device; and stores, at the server system, the image asset that is evicted from the remote physical client device. For example, FIG. 9B illustrates a process for the server system 102 storing image assets that are on the eviction list for client device 110 to evict.

In some embodiments, in accordance with a determination that the remote physical client device needs the image asset, sending the image asset to the client device. For example, when the client device 110 needs an asset that the server system has stored in the cache (e.g., the location is the server system), the server system sends the image asset directly to the client (e.g., rather than having the client retrieve the image asset from CDN 108).

In some embodiments, determining that the remote physical client device needs the first asset comprises receiving a request, from the client device, to display media content that corresponds to the first asset. For example, the server system determines that the client device 110 needs access to a media asset (e.g., media content) in accordance with receiving a request to play media content (e.g., a video segment) and/or a request to fast forward or rewind media content.

In some embodiments, the first asset comprises a segment of video content and the instruction is an instruction to retrieve the segment of video content from a third-party server distinct from the server system (e.g., CDN 108).

In some embodiments, the server system performs a lookup to determine the information indicating the location from which the client retrieves the first asset. For example, if the server system has the image asset stored locally, the location is the server system. If the server system has deleted the image asset, the location is the CDN 108. If the asset is a video asset, the server system determines a particular server to go retrieve the video asset (e.g., a location within CDN 108 for the client device 110 to retrieve the video stream segment).

Figure 16:
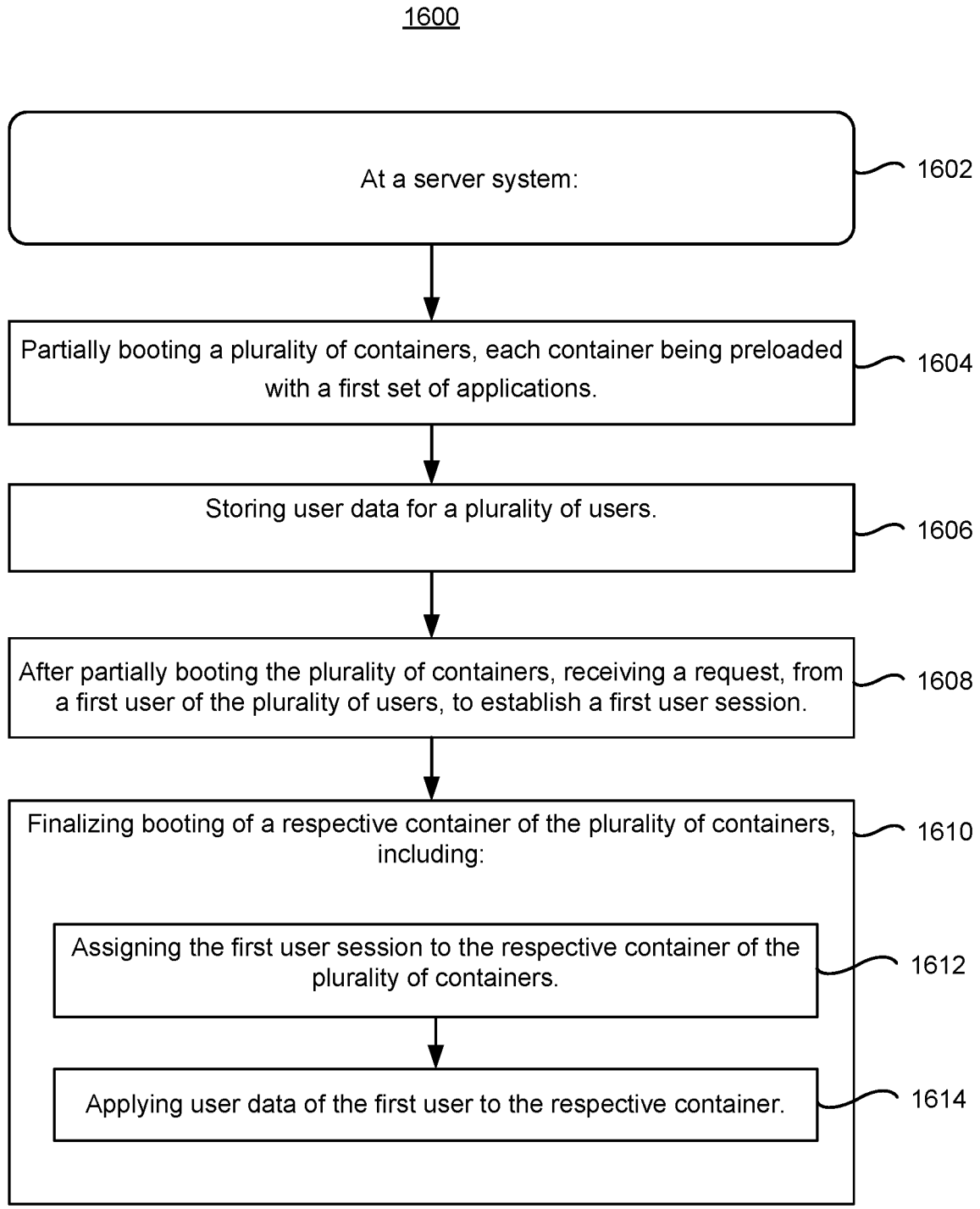
FIG. 16 is a flowchart for a method of booting containers before applying user data for a user session, in accordance with some embodiments.

FIG. 16 illustrates a method 1600 for partially booting a container before initiating a user session at the container. In some embodiments, the method 1600 is performed by a server computer system 300 (e.g., server system 102). In some embodiments, the server system hosts one or more virtual client devices (e.g., VCVM 104), corresponding to a node (e.g., a Linux host). In some embodiments, each node includes a plurality of containers. In some embodiments, a respective remote physical client device that plays back video content received from a content server is assigned to a respective container of the plurality of containers (e.g., in the node). For example, instructions for performing the method are stored in the memory 306 and executed by the processor(s) 302 of the server computer system 300. Some operations described with regard to the process 1600 are, optionally, combined and/or the order of some operations is, optionally, changed. The server computer system (e.g., a server computing device) has one or more processors and memory storing one or more programs for execution by the one or more processors. In some embodiments, each physical client device is a thin client programmed to remote into a server-based computing environment.

The server system partially boots (1604) a plurality of containers (e.g., a virtual client device that is not yet associated with or assigned to a remote physical client device), each container being preloaded with a first set of applications.

The server system stores (1606) user data for a plurality of users (e.g., the user data includes one or more of: cookies, login tokens, cached video assets, an operator identifier, etc.).

The server system, after partially booting the plurality of containers, receives (1608) a request, from a first user of the plurality of users, to establish a first user session.

The server system finalizes (1610) booting of a respective container of the plurality of containers, including: assigning (1612) the first user session to the respective container of the plurality of containers and applying (1614) user data of the first user to the respective container.

In some embodiments, applying the user data of the first user to the respective container comprises identifying one or more applications of the first set of applications to include in the user session.

In some embodiments, applying the user data of the first user to the respective container comprises identifying a service provider of the first user, wherein the user data is determined in accordance with the service provider. For example, different providers allow access to different applications.

In some embodiments, a subset of the preloaded first set of applications are displayed to the user.

In some embodiments, each application in the first set of applications has a corresponding image (e.g., a disk/application image). In some embodiments, the server system further executes instructions to display images for a subset of the first set of applications in accordance with the user data.

In some embodiments, while the user session is active in the respective container, the server system stores data for the user session in a cache.

In some embodiments, the server system receives an indication to end the first user session. In response to receiving the indication, the server system removes the user data of the first user from the respective container (e.g., by unmounting the volumes (e.g., to depersonalize the container)). In some embodiments, the server system updates the user data that is stored at the server system and discards (at least a portion of) the data that is stored in the cache (e.g., cached content, digest, etc.). For example, some data is stored between sessions and other data is discarded between sessions.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method comprising:
   at a server system hosting one or more virtual client devices, each virtual client device corresponding to a remote physical client device that plays back video content received from a content server:
   receiving, from a respective remote physical client device, a digest of a segment of video content received by the respective remote physical client device, the segment of video content including a plurality of frames of video content;
   in response to receiving the digest:
      sending a playback command to the respective remote physical device to play back one or more of the plurality of frames of video content in the segment, wherein the plurality of frames of video content in the segment have a frame rate;
      determining a graphical processing unit (GPU) overlay instruction for overlaying content with a respective portion of the segment of video content; and
      sending the GPU overlay instruction to the respective remote physical client device, wherein a frame rate of the overlayed content is sent at a frame rate independent of the frame rate of the plurality of frames of video content and is variably determined by the server system.

2. The method of claim 1, further comprising determining a frame in which there is a change in an overlay instruction from an overlay instruction of a previous frame, wherein sending the GPU overlay instruction is performed in response to determining there is a change in the overlay instruction.

3. The method of claim 1, wherein the GPU overlay instruction for overlaying content is a GPU overlay instruction for overlaying content of a frame buffer.

4. The method of claim 1, further comprising, sending, to the client device, an orientation instruction for arranging the content on a display.

5. The method of claim 4, wherein the orientation instruction is sent separately from the GPU overlay instruction.

6. The method of claim 4, wherein the client device uses the GPU overlay instruction and the orientation instruction to composite the content with the respective portion of the segment of video content.

7. The method of claim 1, wherein the GPU overlay instruction comprises an identification of each frame in the portion of the segment of the video content over which the content is overlaid.

8. The method of claim 1, wherein the respective portion of the segment of the video content comprises a frame of the video content.

9. The method of claim 1, wherein the respective portion of the segment of the video content comprises a plurality of frames of the video content.

10. The method of claim 1, wherein the server system does not transmit, to the client device, the plurality of frames of video content.

11. The method of claim 1, wherein the GPU overlay instruction comprises an openGL command.

12. The method of claim 1, further comprising, determining a second GPU overlay instruction for overlaying second content with a second respective portion of the segment of video content; and sending, asynchronously from the frame rate of the plurality of frames of video content, the second GPU overlay instruction to the respective remote physical client device.

13. The method of claim 12, wherein the second respective portion of the segment of video content is a different length than the respective portion of the segment of video content.

14. A non-transitory computer readable storage medium storing one or more programs for execution by one or more processors of a server system hosting one or more virtual client devices, each virtual client device corresponding to a remote physical client device that plays back video content received from a content server, the one or more programs including instructions for: receiving, from a respective remote physical client device, a digest of a segment of video content received by the respective remote physical client device, the segment of video content including a plurality of frames of video content; in response to receiving the digest: sending a playback command to the respective remote physical device to playback one or more of the plurality of frames of video content in the segment, wherein the plurality of frames of video content in the segment have a frame rate; determining a graphical processing unit (GPU) overlay instruction for overlaying content with a respective portion of the segment of video content; and sending the GPU overlay instruction to the respective remote physical client device, wherein a frame rate of the overlayed content is sent at a frame rate independent of the frame rate of the plurality of frames of video content and is variably determined by the server system.

15. A server system hosting one or more virtual client devices, each virtual client device corresponding to a remote physical client device that plays back video content received from a content server, the server system comprising one or more processors and memory storing one or more programs for execution by the one or more processors, the one or more programs including instructions for:

receiving, from a respective remote physical client device, a digest of a segment of video content received by the respective remote physical client device, the segment of video content including a plurality of frames of video content;

in response to receiving the digest:
sending a playback command to the respective remote physical device to playback one or more of the plurality of frames of video content in the segment, wherein the plurality of frames of video content in the segment have a frame rate;
determining a graphical processing unit (GPU) overlay instruction for overlaying content with a respective portion of the segment of video content; and
sending the GPU overlay instruction to the respective remote physical client device, wherein a frame rate of the overlayed content is sent at a frame rate independent of the frame rate of the plurality of frames of video content and is variably determined by the server system.

* * * * *